(12) United States Patent
Atlas et al.

(10) Patent No.: US 9,013,976 B2
(45) Date of Patent: Apr. 21, 2015

(54) RAPID ALTERNATE PATHS FOR NETWORK DESTINATIONS

(75) Inventors: Alia Karin Atlas, Arlington, MA (US); Raveendra Torvi, Nashua, NH (US)

(73) Assignee: Futurewei Technologies, Inc., Plano, TX (US)

( * ) Notice: Subject to any disclaimer, the term of this patent is extended or adjusted under 35 U.S.C. 154(b) by 696 days.

(21) Appl. No.: 12/878,520

(22) Filed: Sep. 9, 2010

(65) Prior Publication Data

US 2011/0007629 A1 Jan. 13, 2011

Related U.S. Application Data

(63) Continuation of application No. 10/993,025, filed on Nov. 19, 2004, now Pat. No. 7,830,786, which is a continuation of application No. PCT/US2004/032386, filed on Oct. 1, 2004, which is a continuation-in-part of application No. 10/774,069, filed on Feb. 6, 2004, now abandoned.

(60) Provisional application No. 60/508,766, filed on Oct. 3, 2003, provisional application No. 60/542,555, filed on Feb. 6, 2004.

(51) Int. Cl.
| | |
|---|---|
| *G01R 31/08* | (2006.01) |
| *H04L 12/703* | (2013.01) |
| *H04L 12/701* | (2013.01) |
| *H04L 12/721* | (2013.01) |
| *H04L 12/707* | (2013.01) |
| *H04L 12/723* | (2013.01) |

(52) U.S. Cl.
CPC ............... *H04L 45/28* (2013.01); *H04L 45/00* (2013.01); *H04L 45/12* (2013.01); *H04L 45/22* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 5,253,248 | A | 10/1993 | Dravida et al. |
| 5,265,092 | A | 11/1993 | Soloway et al. |
| 5,754,543 | A | 5/1998 | Seid |
| 5,881,243 | A | 3/1999 | Zaumen et al. |
| 5,923,646 | A | 7/1999 | Mandhyan |
| 6,098,107 | A | 8/2000 | Narvaez-Guarnieri et al. |
| 6,385,649 | B1 | 5/2002 | Draves et al. |

(Continued)

FOREIGN PATENT DOCUMENTS

| | | |
|---|---|---|
| EP | 1 111 860 A2 | 6/2001 |
| WO | WO 00/59240 A1 | 10/2000 |

(Continued)

OTHER PUBLICATIONS

Cormen, Thomas H., et al., "Introduction to Algorithms," 25.2 Dijkstra's Algorithm, The MIT Press, Cambridge, Massachusetts, pp. 527-531 (1990).

(Continued)

*Primary Examiner* — Gregory Sefcheck
*Assistant Examiner* — Joshua Smith
(74) *Attorney, Agent, or Firm* — Conley Rose, P.C.; Grant Rodolph; Nicholas K. Beaulieu

(57) ABSTRACT

Network traffic is sent via alternate paths in cases of network link or node failure. An alternate node responds to U-Turn traffic from a primary neighbor to select a further alternate. An algorithm for determining the alternate paths is provided to select loop-free neighbors.

17 Claims, 24 Drawing Sheets

(56) References Cited

U.S. PATENT DOCUMENTS

| | | | |
|---|---|---|---|
| 6,564,145 B2 | 5/2003 | Kim et al. | |
| 6,671,819 B1* | 12/2003 | Passman et al. | 370/400 |
| 6,785,277 B1 | 8/2004 | Sundling et al. | |
| 6,813,242 B1* | 11/2004 | Haskin et al. | 370/238 |
| 6,928,484 B1 | 8/2005 | Huai et al. | |
| 7,035,227 B2 | 4/2006 | Garcia-Luna-Aceves et al. | |
| 7,058,016 B1 | 6/2006 | Harper | |
| 7,093,027 B1* | 8/2006 | Shabtay et al. | 370/216 |
| 7,099,286 B1 | 8/2006 | Swallow | |
| 7,126,921 B2 | 10/2006 | Mark et al. | |
| 7,127,523 B2 | 10/2006 | Kotser | |
| 7,188,280 B2* | 3/2007 | Shinomiya et al. | 370/225 |
| 7,295,510 B2 | 11/2007 | Johri | |
| 7,345,991 B1* | 3/2008 | Shabtay et al. | 370/221 |
| 7,362,709 B1 | 4/2008 | Hui et al. | |
| 7,385,917 B1 | 6/2008 | Mo et al. | |
| 7,430,164 B2 | 9/2008 | Bare | |
| 7,500,013 B2 | 3/2009 | Dziong et al. | |
| 2002/0110119 A1 | 8/2002 | Fredette et al. | |
| 2002/0112072 A1 | 8/2002 | Jain | |
| 2002/0131424 A1 | 9/2002 | Suemura | |
| 2002/0176363 A1 | 11/2002 | Durinovic-Johri et al. | |
| 2002/0186652 A1* | 12/2002 | Popovich | 370/218 |
| 2002/0186665 A1 | 12/2002 | Chaffee et al. | |
| 2003/0027570 A1* | 2/2003 | Yang et al. | 455/432 |
| 2003/0043798 A1 | 3/2003 | Pugel | |
| 2003/0091043 A1 | 5/2003 | Mehrotra et al. | |
| 2003/0095500 A1 | 5/2003 | Cao | |
| 2003/0193898 A1 | 10/2003 | Wong et al. | |
| 2003/0193959 A1 | 10/2003 | Lui et al. | |
| 2003/0223413 A1* | 12/2003 | Guerrero | 370/389 |
| 2004/0004938 A1* | 1/2004 | Buddhikot et al. | 370/238 |
| 2004/0042402 A1* | 3/2004 | Galand et al. | 370/216 |
| 2004/0052207 A1* | 3/2004 | Charny et al. | 370/216 |
| 2004/0114513 A1 | 6/2004 | Badt, Jr. | |
| 2005/0088965 A1 | 4/2005 | Atlas et al. | |
| 2006/0067330 A1 | 3/2006 | Schollmeier et al. | |
| 2007/0038767 A1* | 2/2007 | Miles et al. | 709/230 |

FOREIGN PATENT DOCUMENTS

| | | |
|---|---|---|
| WO | WO 01/06807 A1 | 1/2001 |
| WO | WO 02/23832 A2 | 3/2002 |

OTHER PUBLICATIONS

Kini, Sriganesh, et al., "Traffic Restoration in Link State Protocols Using Neighbor's Shortest Path," Internet Draft, www.watersprings.org/pub/id/draft-kini-traf-restore-nsp-00.txt, 8 pgs., (2002).

Demetrescu, Camil, et al., "Oracles for Distances Avoiding a Link-failure," http://citeseer.ist.psu.edu/ demetrescu02oracles.html, pp. 1-10 (2002).

Thorup, Mikkel, "Fortifying OSPF/IS-IS Against Link-Failure,"AT&T Labs-Research, pp. 1-10 (2001).

Alaettinoglu, Cengiz, et al., "IGP Fast Reroute," http://www.packetdesign.com/publications, IETF Routing Area, Atlanta, pp. 1-14 (2002).

Katz, Dave, "Why Are We Scared of SPF? IGP Scaling and Stability," Juniper Networks, Inc., http://www.nanog.org/mtg-0206/ppt/katz/sld001.htm, pp. 1-22 (2002).

Filsfils, Clarence, et al., "Engineering a Multiservice IP Backbone to Support Tight SLAs," *Computer Networks*, Jun. 2002 NANOG25 Meeting, http://www.nanog.org/mtg-0206/filsfils.html, pp. 1-15 (2002).

Narvéez, Paolo, et al., "Fault-Tolerant Routing in the Internet without Flooding," Proceedings of the 1999 IEEE Workshop on Fault-Tolerant Parallel and Distributed Systems, San Juan, Puerto Rico, Apr. 1999, pp. 1-13, http://perth.mit.edu/~pnarvaez/publications.html.

Narváez, Paolo, et al., "Local Restoration Algorithm for Link-State Routing Protocols," *Proceedings of the 1999 IEEE International Conference on Computer Communications and Networks*, Boston, Massachusetts, Oct. 1999, 6 pgs., http://perth.mit.edu/~pnarvaez/publications.html.

Narváez, Paolo, et al., "Efficient Algorithms for Multi-Path Link-State Routing," *Proceedings of the 1999 International Symposium on Communications*, Kaohsiung, Taiwan, Nov. 1999, 5 pgs., http://perth.mit.edu/~pnarvaez/publications.html.

Anderson, L., et al., "LDP Specification," RFC 3036, [online] Jan. 2001 [retrieved on Apr. 1, 2009]. Retrieved from the Internet URL:http://www.ietf.org/rfc/rfc3036.txt.

Awduche, D., et al., "RSVP-TE: Extensions to RSVP for LSP Tunnels," RFC 3209, [online] Dec. 2001 [retrieved on Apr. 1, 2009]. Retrieved from the Internet URL:http://www.ietf.org/rfc/rfc3209.txt.

Retana, A., et al., "OSPF Stub Router Advertisement,"RFC 3137, [online] Jun. 2001 [retrieved on Apr. 1, 2009]. Retrieved from the Internet URL:http://tools.ietf.org/html/rfc3137.

McPherson, D, "Intermediate System to Intermediate System (IS-IS) Transient Blackhole Advoidance," RFC 3277, [online] Apr. 2002 [retrieved on Apr. 1, 2009]. Retrieved from the Internet URL:http://www.ietf.org/rfc/rfc3277.txt.

Callon, R., "Use of OSI IS-IS for Routing in TCP/IP and Dual Environments," RFC 1195, [online] Dec. 1990. [retrieved on Apr. 1, 2009]. Retrieved from the Internet URL:http://www.ietf.org/rfc/rfc1195.txt.

Li, T., et al., "Domain-wide Prefix Distribution with Two-Level IS-IS," RFC 2966, [oneline] Oct. 2000 [retrieved on Apr. 1, 2009]. Retrieved from the Internet URL:http://www.ietf.org/rfc/rfc2966.txt.

Coltun, R., "The OSPF Opaque LSA Option," RFC 2370, [online] Jul. 2008. [retrieved on Apr. 1, 2009]. Retrieved from the Internet URL:http://www.ietf.org/rfc/rfc2370.txt.

Moy, J., Abstract, *OSPF Version 2*, Network Working Group, Standards Track, pp. 160-179, (1998).

Invitation to Pay Additional Fees, PCT/US2004/032386, mailed Jan. 26, 2005.

Notification of Transmittal of the International Search Report (ISR) and the Written Opinion (WO) of the International Searching Authority, or the Declaration, with the ISR andWO, PCT/US2004/032386, mailed May 4, 2005.

Notification Concerning Transmittal of International Preliminary Report on Patentability (IPRP) with IPRP, PCT/US2004/032386, mailed Apr. 13, 2006.

Notice of Allowance dated Jan. 27, 2010, 9 pages, U.S. Appl. No. 10/993,978, filed Nov. 19, 2004.

Andersson, L., et al., "LDP Specification," RFC 3036, Jan. 2001, 132 pages.

Rosen, E., et al., "Multiprotocol Label Switching Architecture," RFC 3031, Jan. 2001, 65 pages.

Almquist, P., et al., "Type of Service in the Internet Protocol Suite," RFC 1349, Jul. 1992, 28 pages.

"DARPA Internet Program Protocol Specification," Internet Protocol, RFC 791, Sep. 1981, 49 pages.

Lindem, A., et al., "Extensions to IS-IS for Advertising Optional Router Capabilities," draft-raggarwa-isis-cap-00.txt, Nov. 2003, 7 pages.

Lindem, A., et al., "Extensions to OSPF for Advertising Optional Router Capabilities," draft-ietf-ospf-cap-01.txt, Apr. 2004, 9 pages.

Kompella, K., Ed., et al., "IS-IS Extensions in Support of Generalized Multi-Protocol Label Switching," draft-ietf-isis-gmpls-extensions-19.txt, Oct. 2003, 12 pages.

Kompella, K, Ed., et al., "OSPF Extensions in Support of Generalized Multi-Protocol Label Switching," draft-ietf-ccamp-ospf-gmpls-extensions-12.txt, Oct. 2003, 12 pages.

* cited by examiner

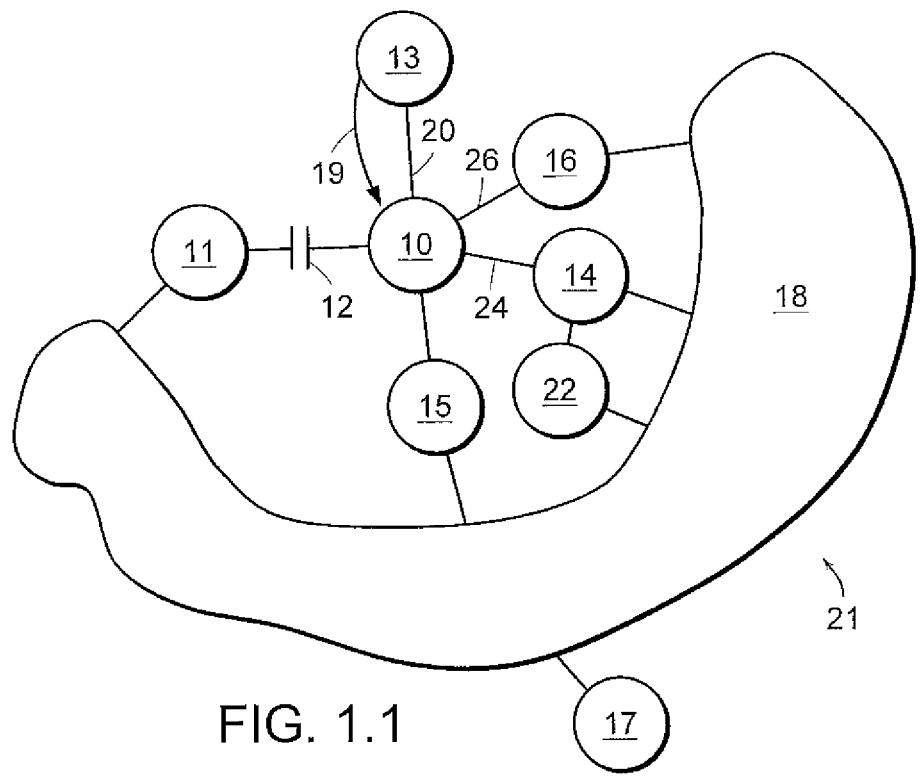
FIG. 1.1
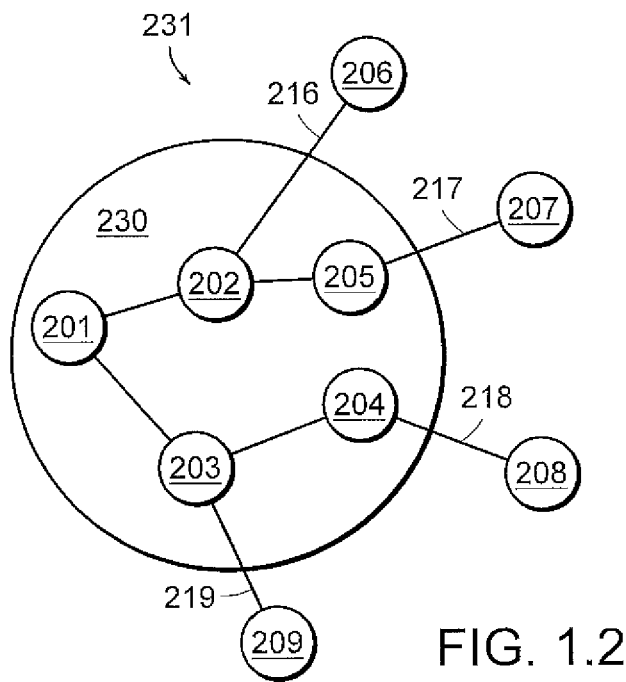
FIG. 1.2

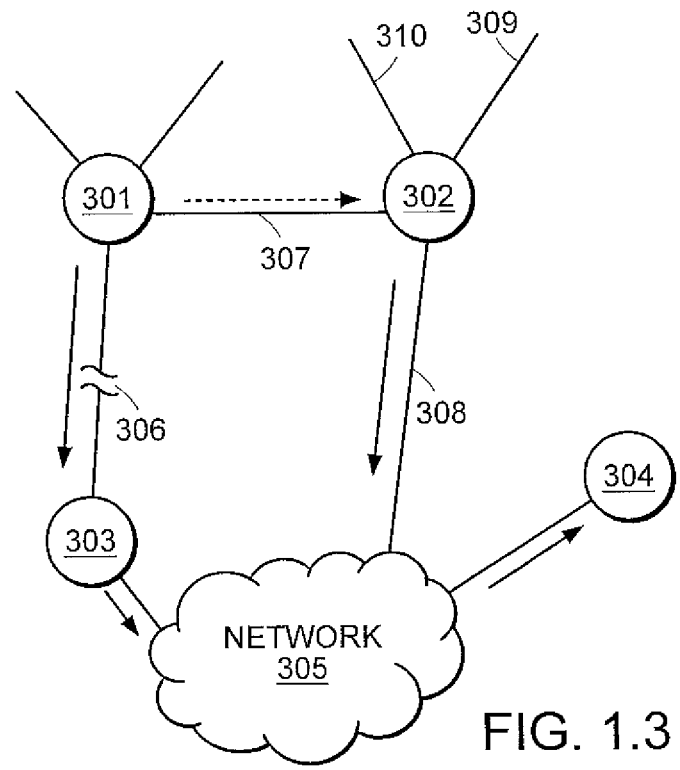
FIG. 1.3
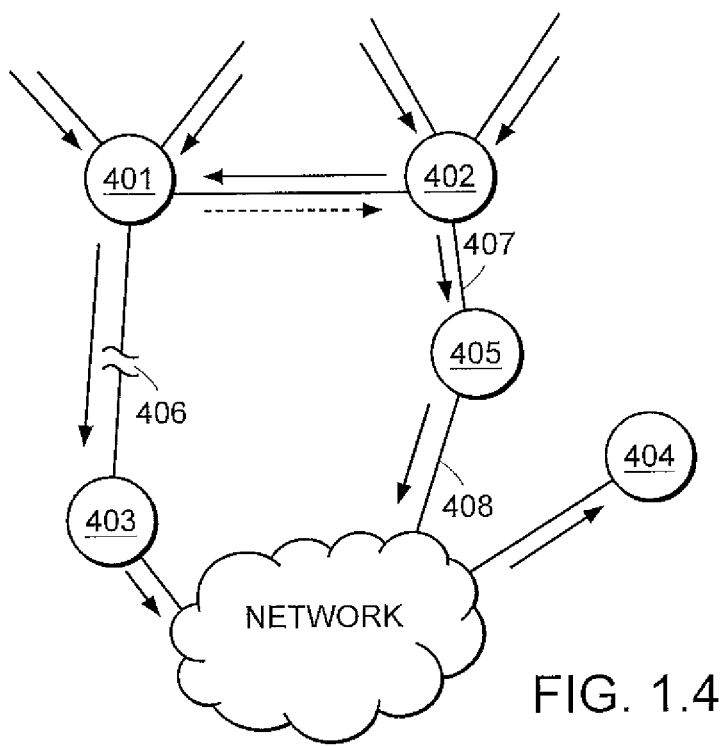
FIG. 1.4

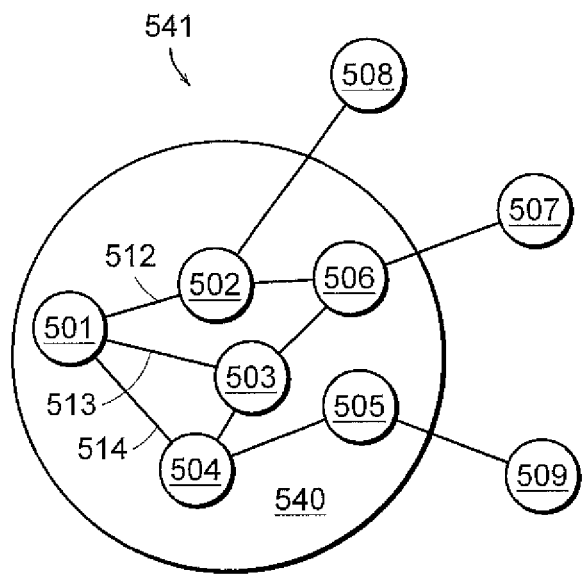
FIG. 1.5
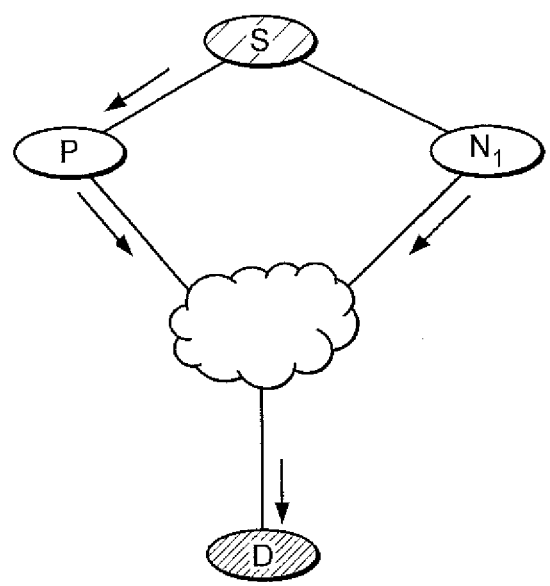
FIG. 2.1

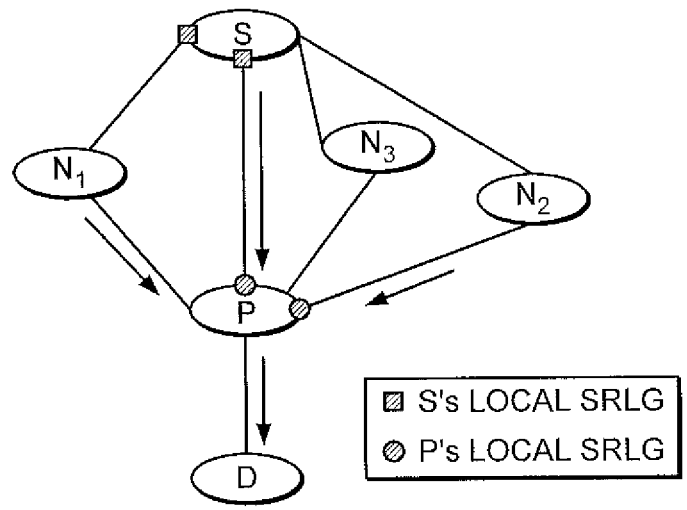
FIG. 2.2
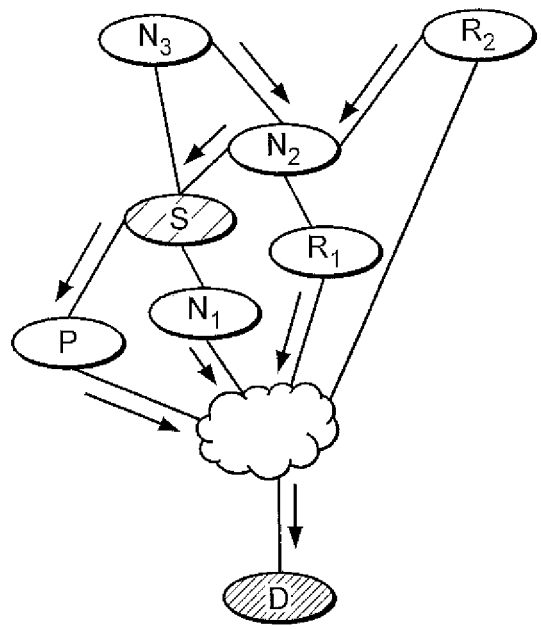
FIG. 2.3

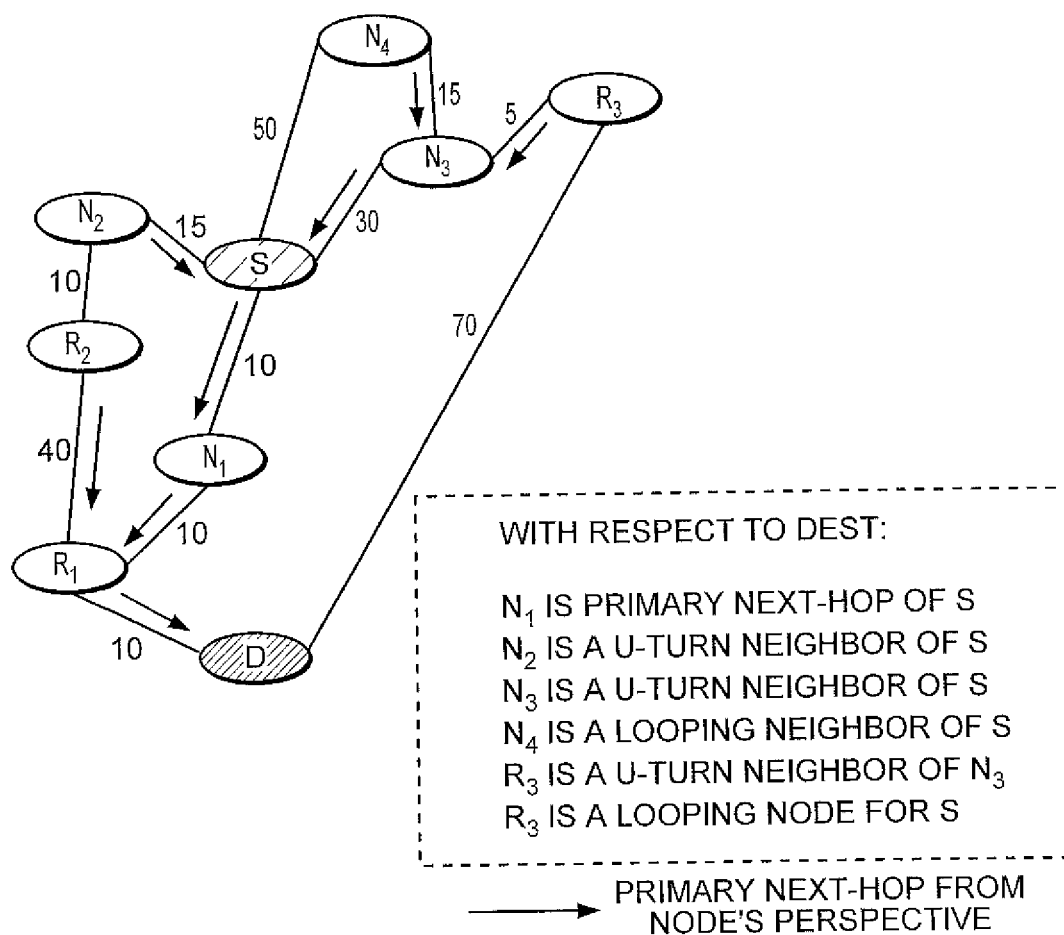
FIG. 2.4

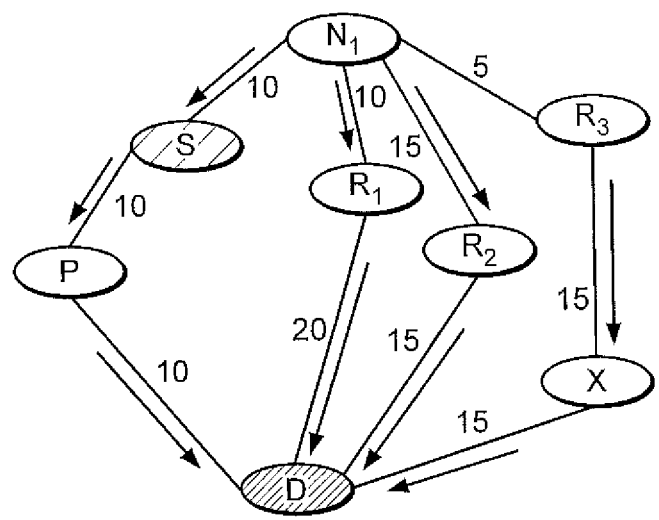
FIG. 2.5
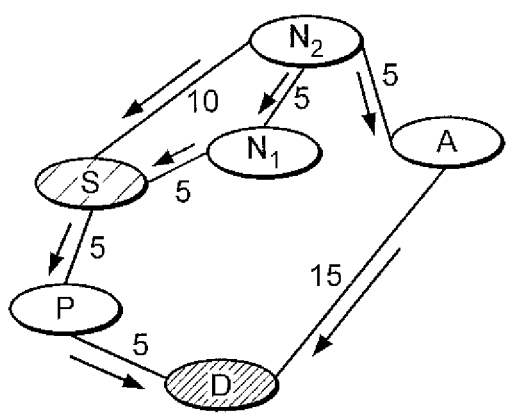
FIG. 2.6

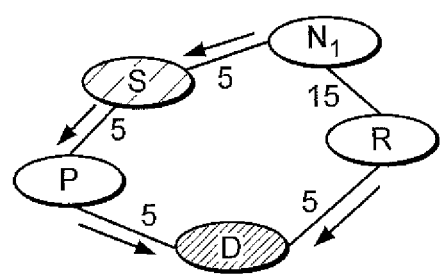
FIG. 2.7
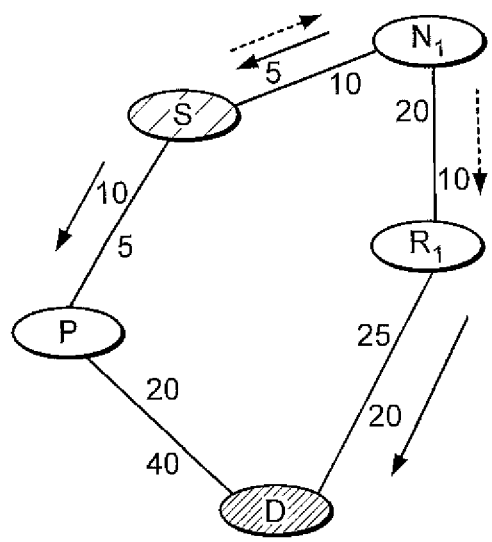
FIG. 2.8
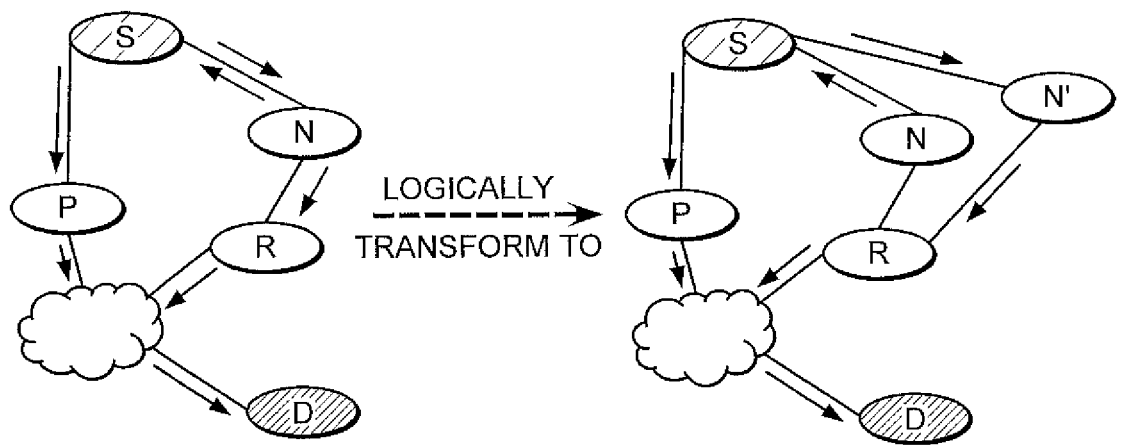
FIG. 2.9

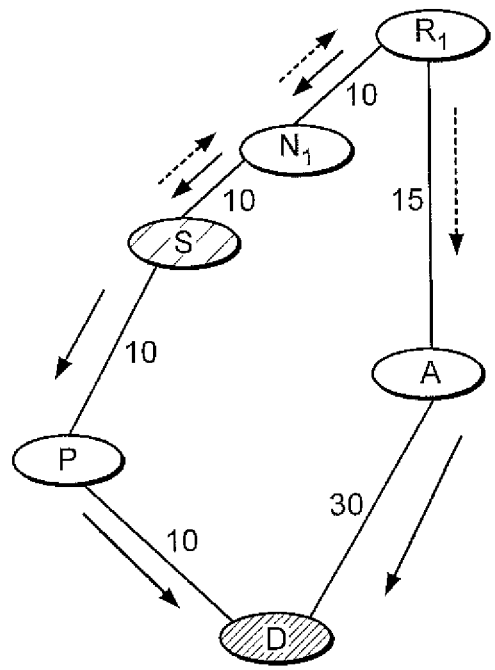
FIG. 2.10
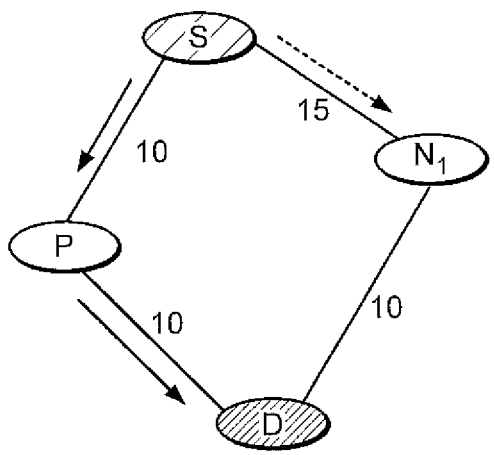
FIG. 2.11A

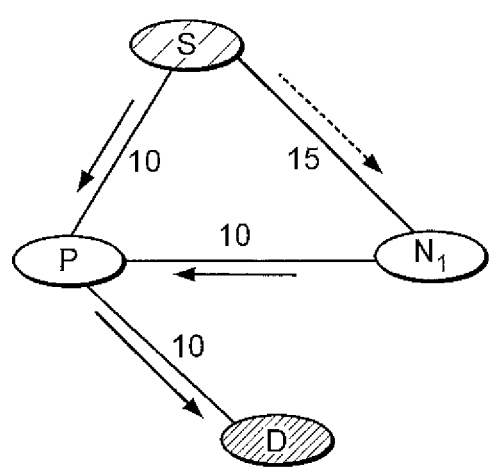
FIG. 2.11B
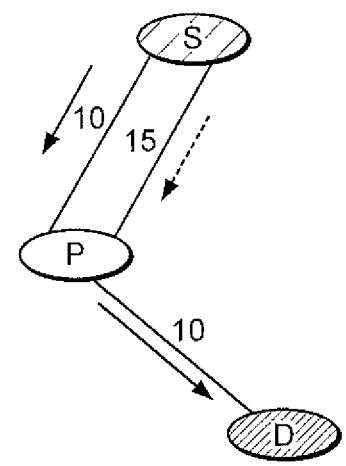
FIG. 2.11C
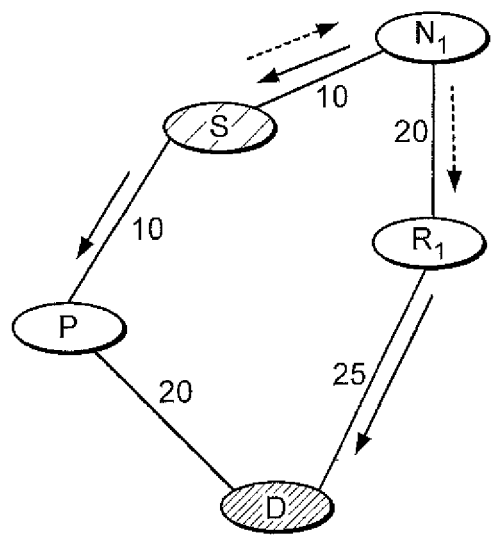
FIG. 2.12
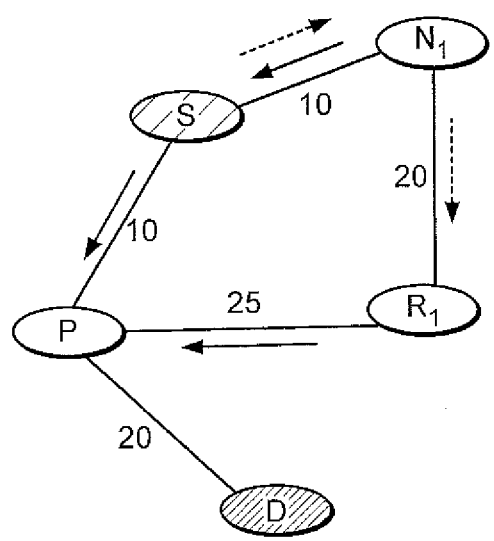
FIG. 2.13

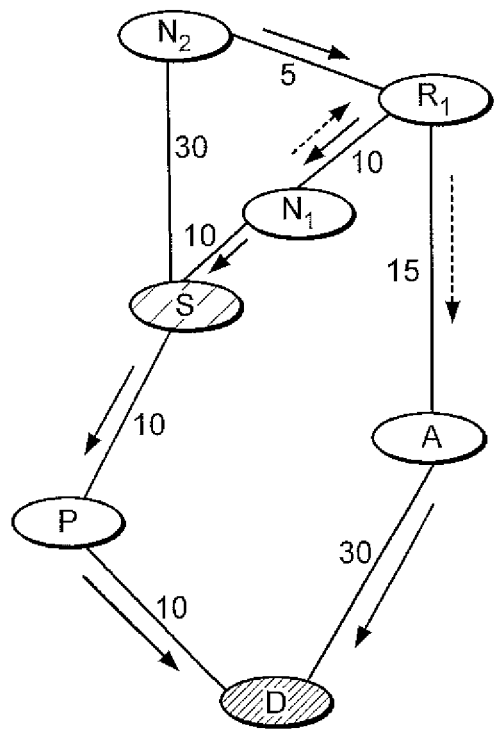
FIG. 2.14
IF THE IP DESTINATION PREFIX INDICATES DESTINATION D
    IF PACKET WAS RECEIVED ON AN INTERFACE CONNECTED TO A PRIMARY NEXT-HOP NEIGHBOOR
        FORWARD OR DISCARD BASED ON TABLE 1.
    ELSE FORWARD THE PACKET TO THE PRIMARY NEXT-HOP.
FIG. 2.15

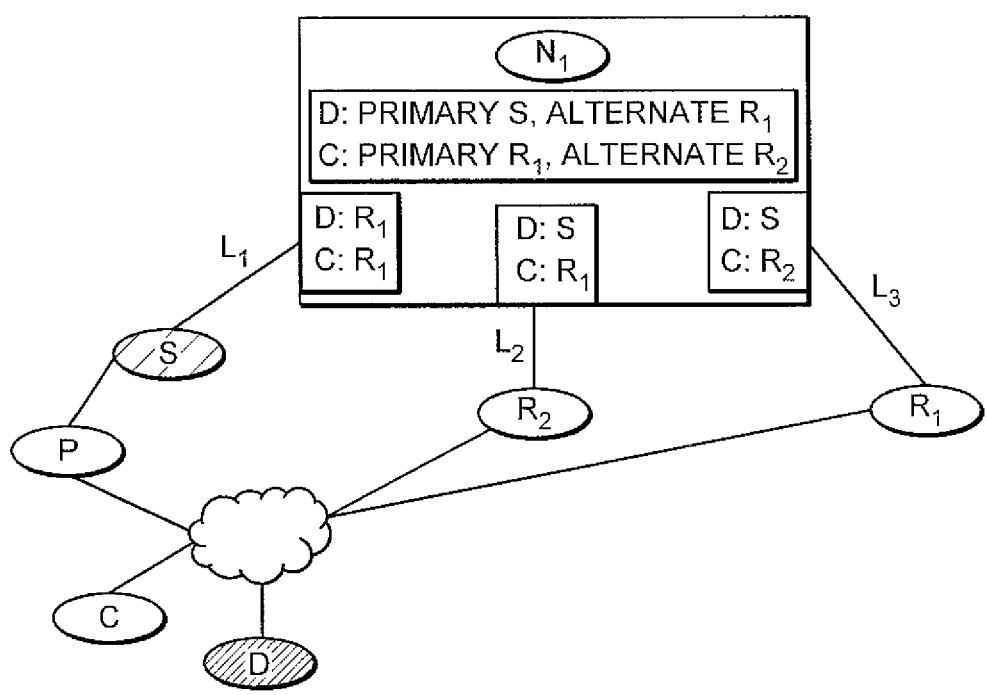
FIG. 2.16

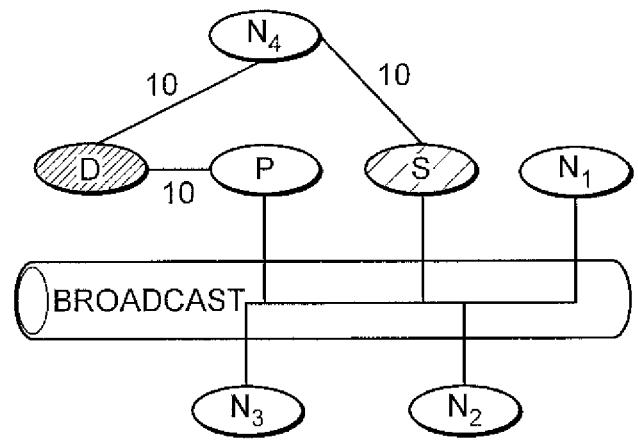
FIG. 2.17A
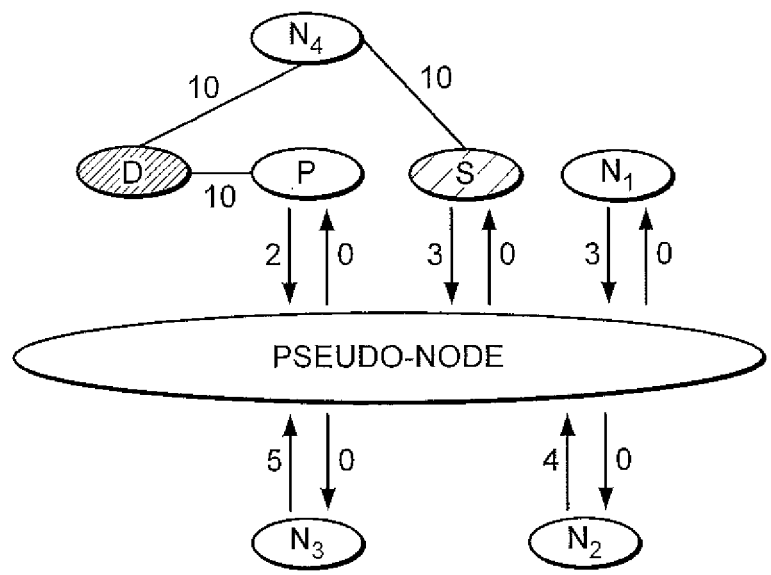
FIG. 2.17B

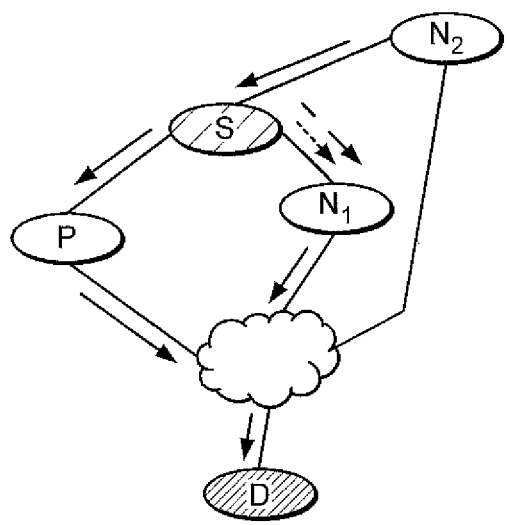
FIG. 2.18A
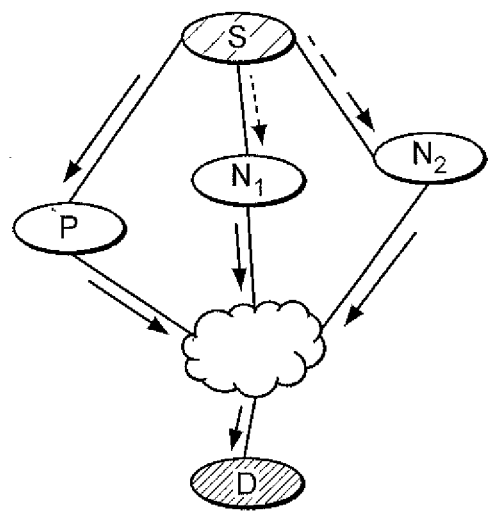
FIG. 2.18B

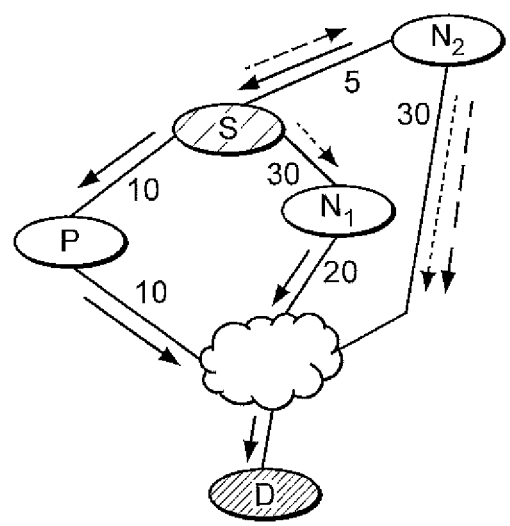
FIG. 2.19A
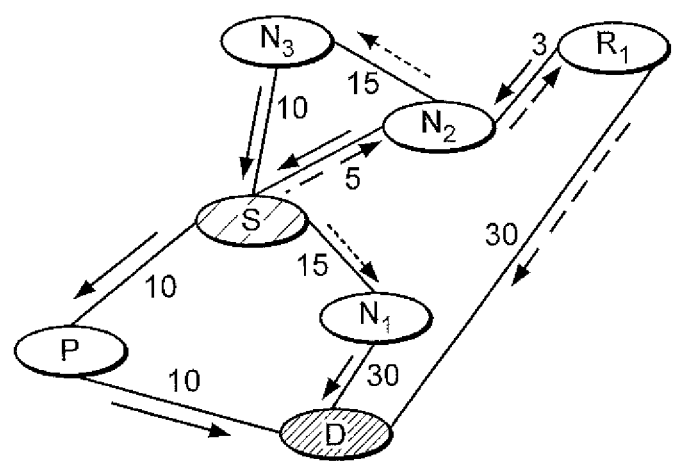
FIG. 2.19B

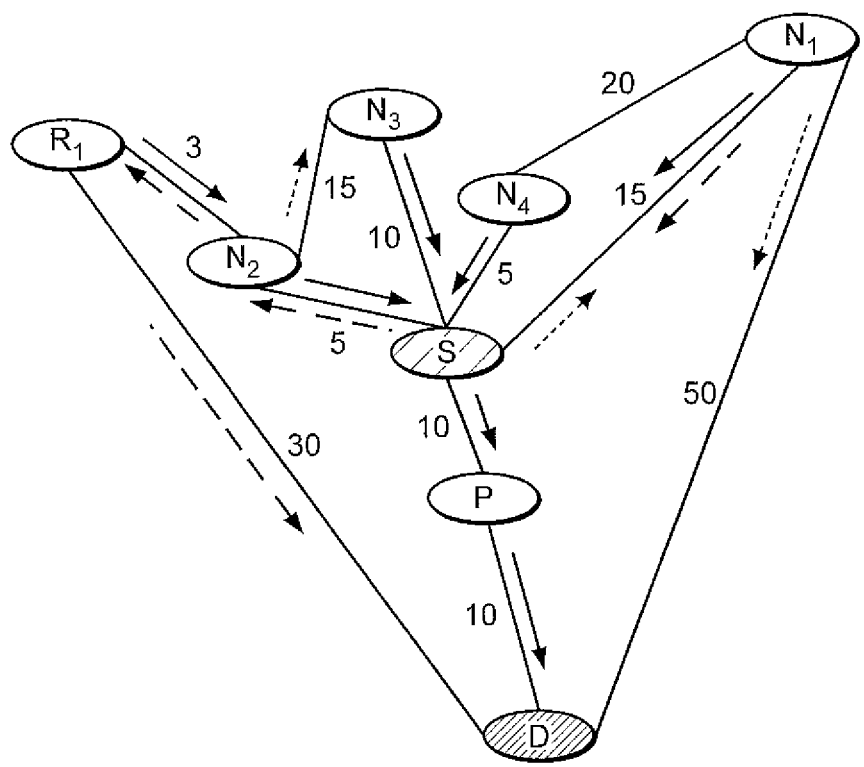
FIG. 2.20

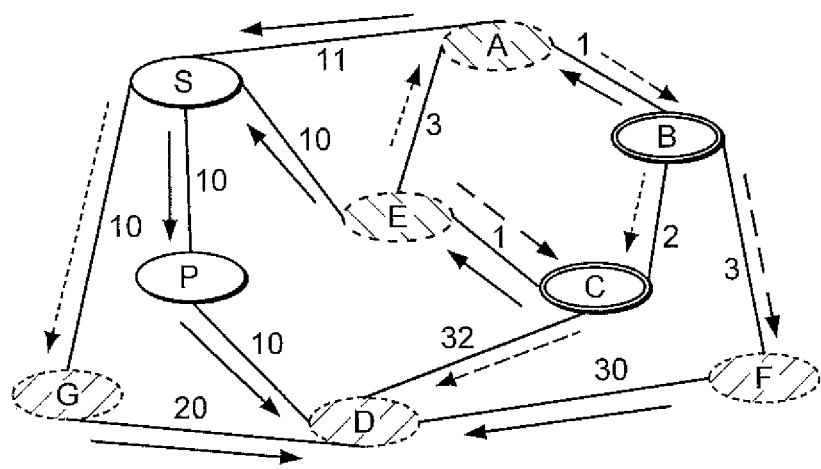
FIG. 2.21
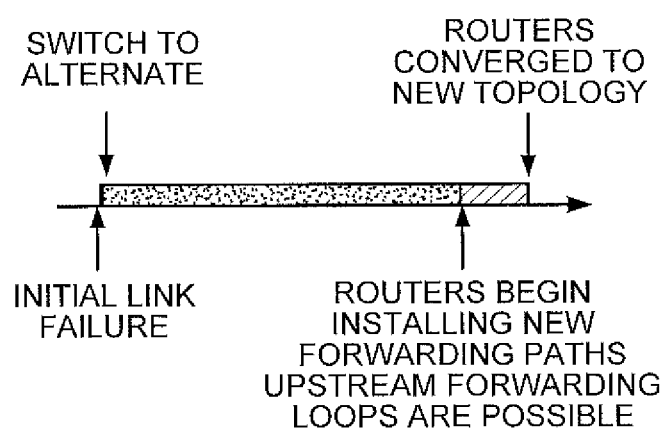
FIG. 2.22

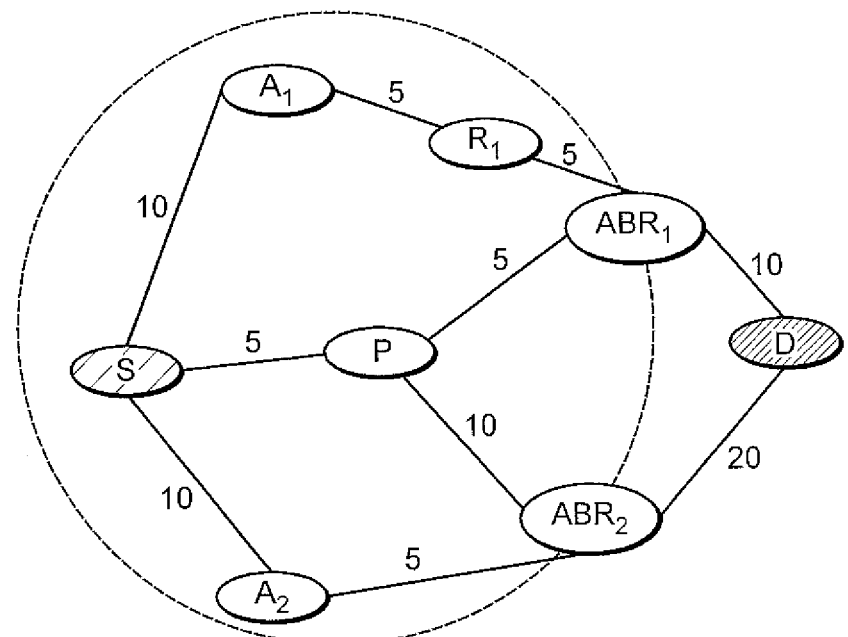
FIG. 2.23
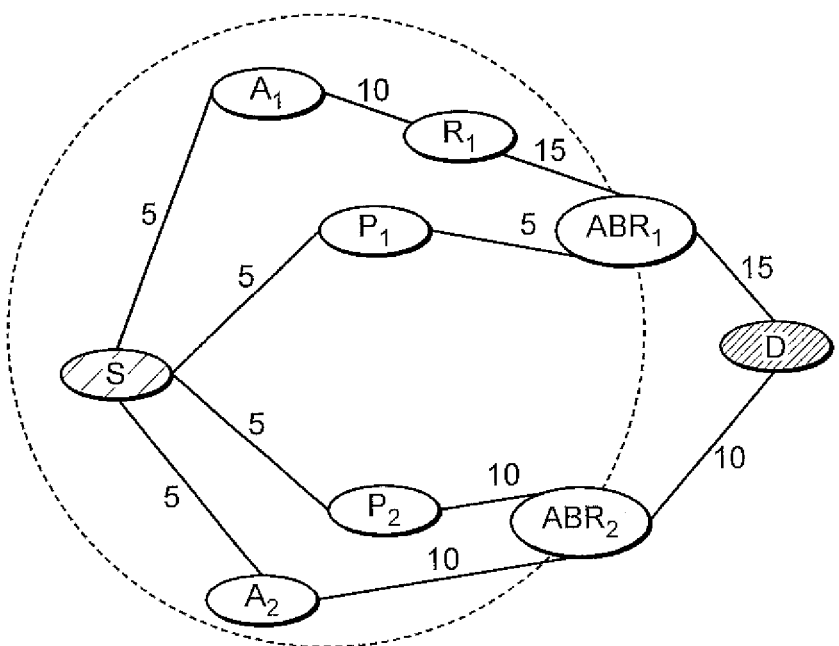
FIG. 2.24

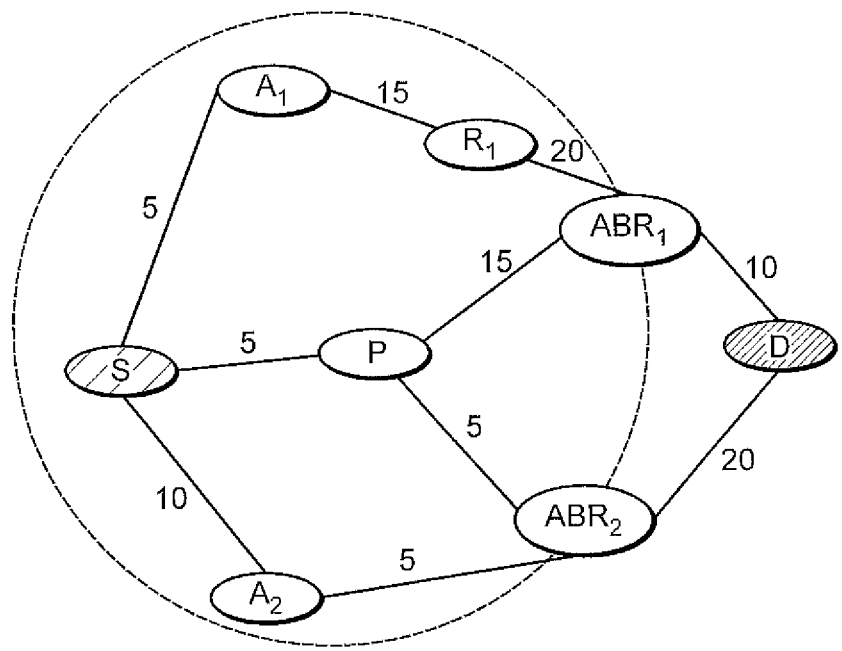
FIG. 2.25
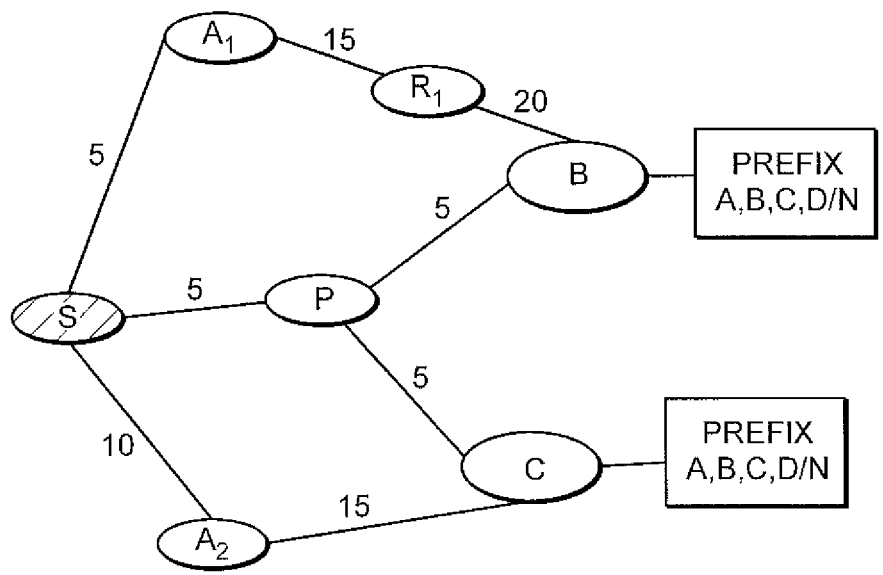
FIG. 2.26

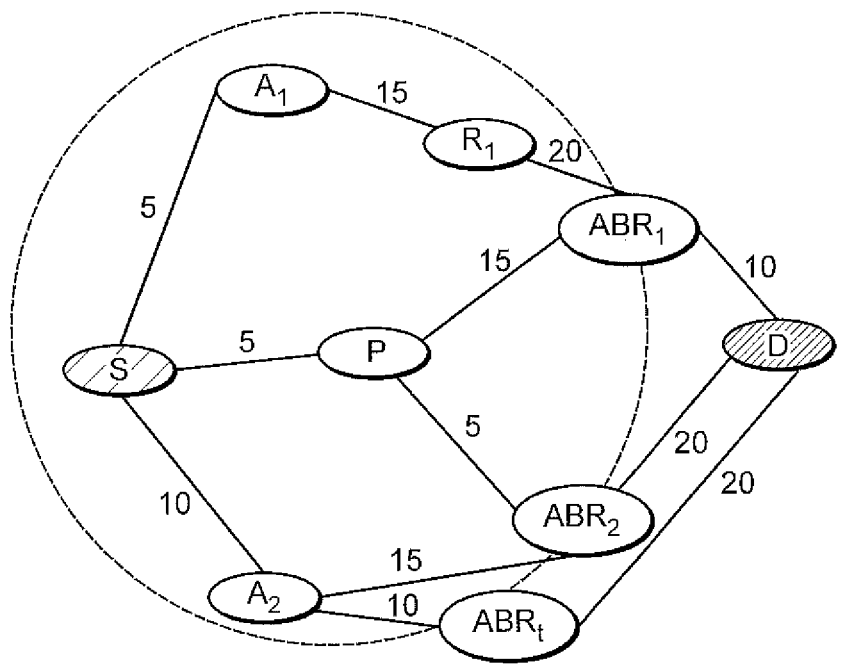
FIG. 2.27
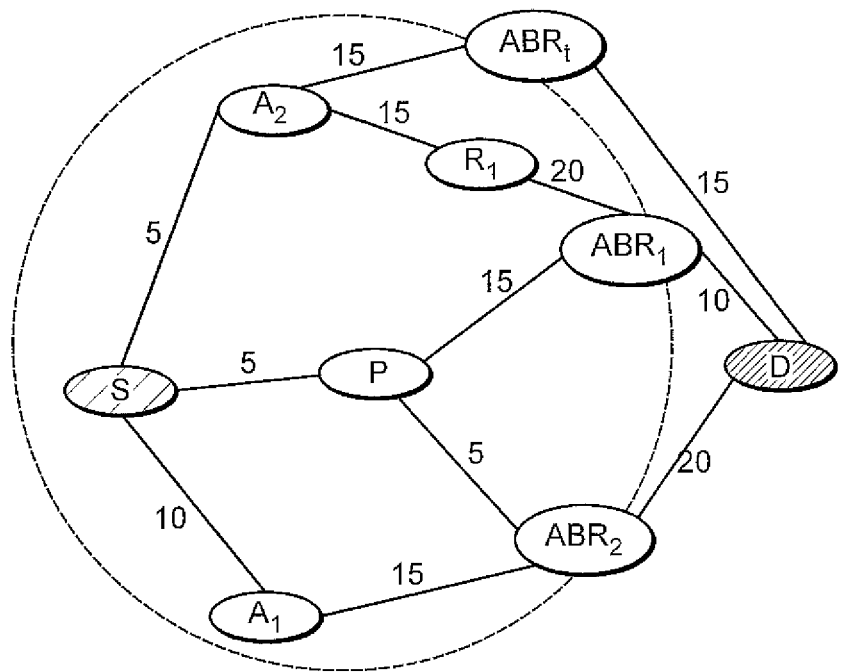
FIG. 2.28

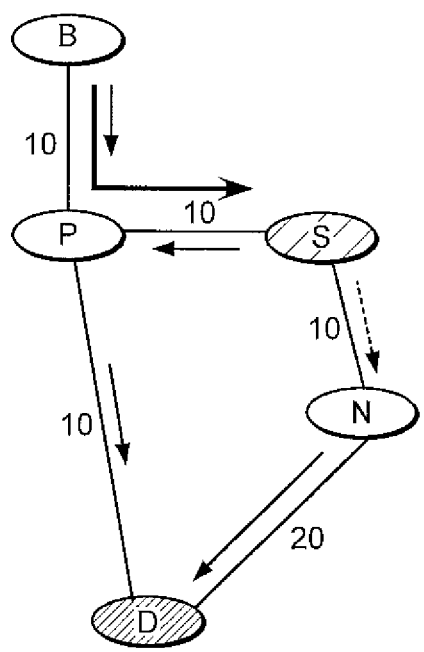
FIG. 2.29
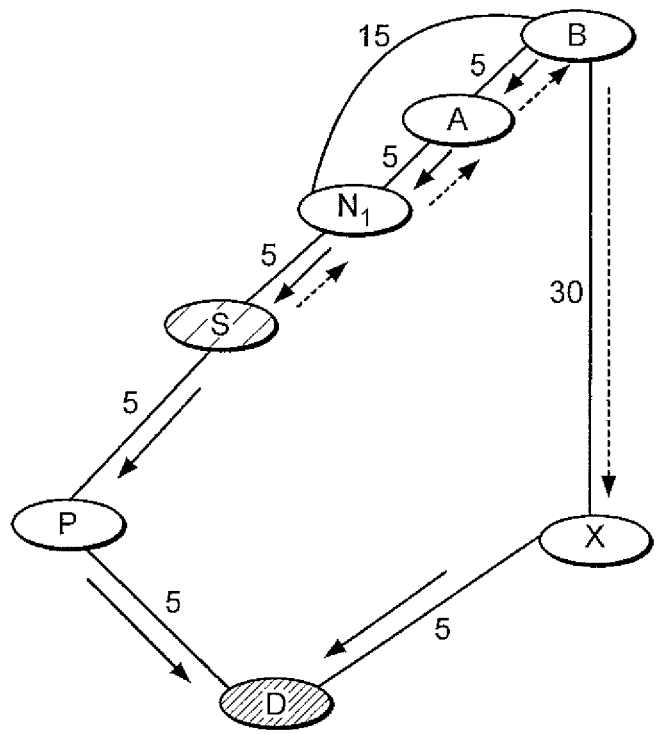
FIG. 2.30

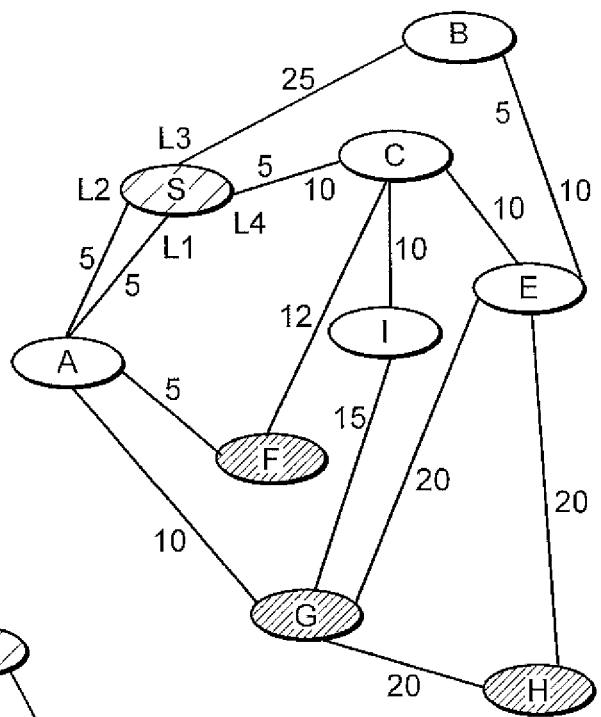
FIG. 3.1
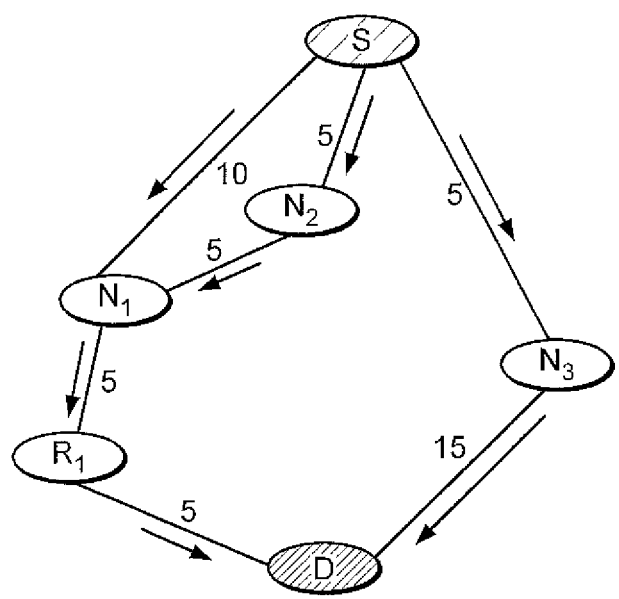
FIG. 3.2
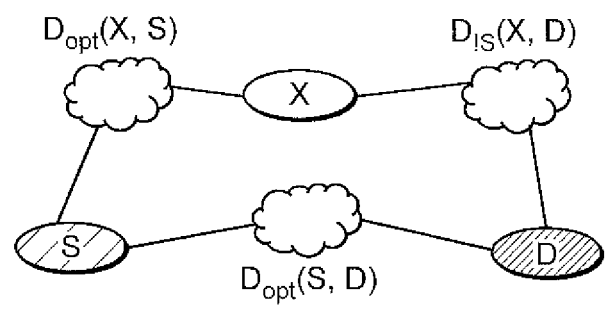
FIG. 3.3

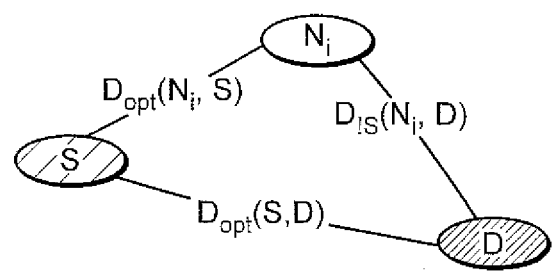
FIG. 3.4
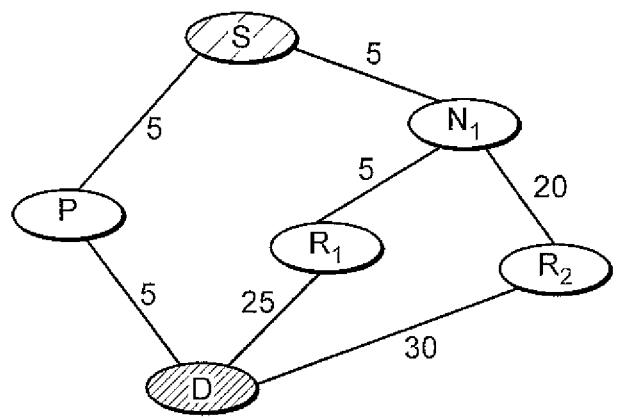
FIG. 3.5
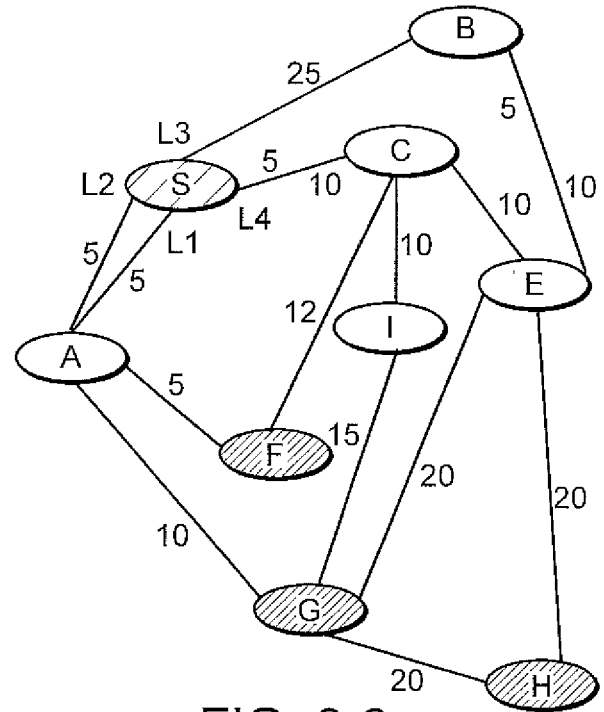
FIG. 3.6

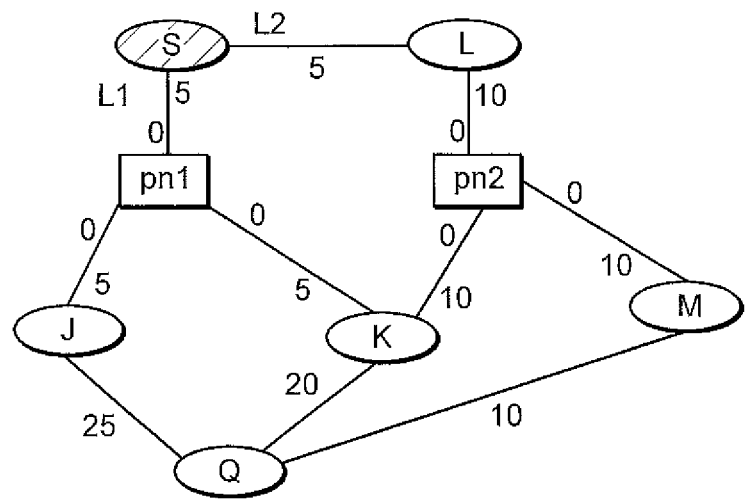
FIG. 3.7
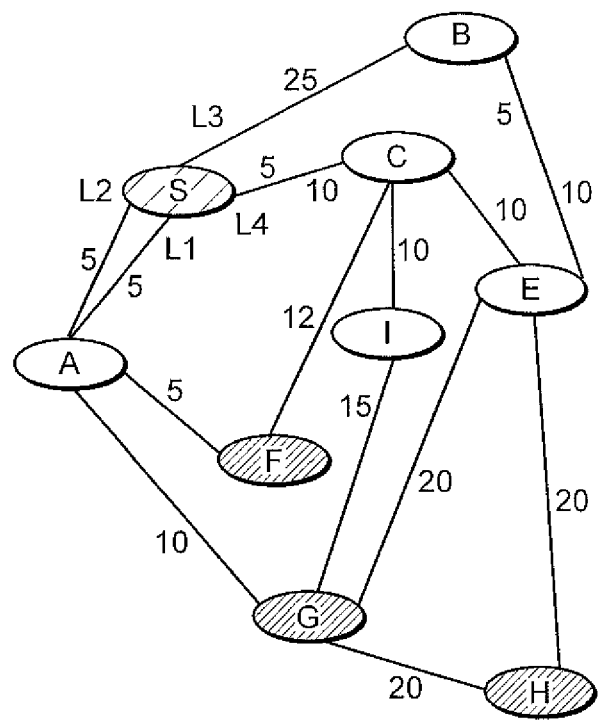
FIG. 3.8
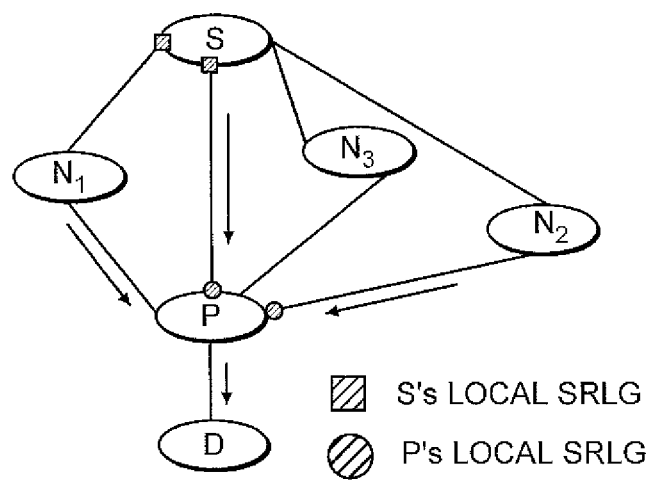
FIG. 3.9

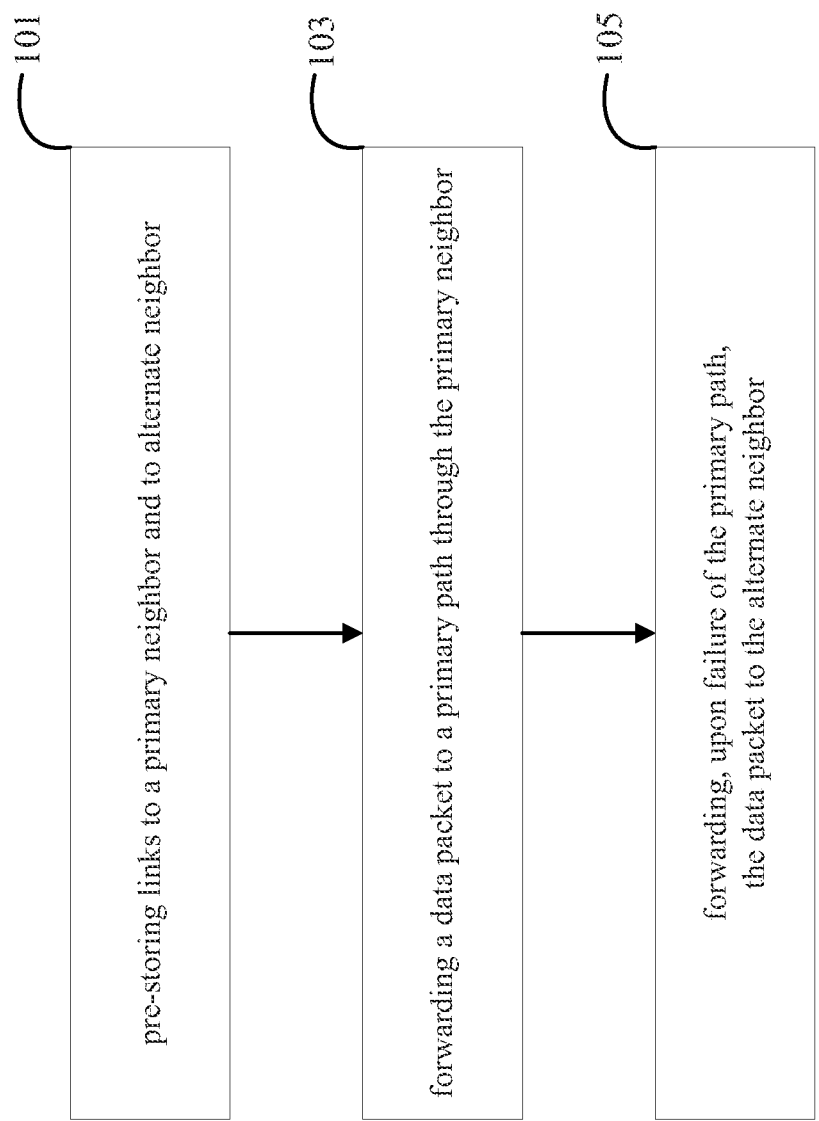
FIG. 4.0

US 9,013,976 B2

RAPID ALTERNATE PATHS FOR NETWORK DESTINATIONS

RELATED APPLICATIONS

This application is a continuation of U.S. application Ser. No. 10/993,025, filed Nov. 19, 2004 now U.S. Pat. No. 7,830, 786, which claims the benefit of U.S. Provisional Application No. 60/542,555, filed on Feb. 6, 2004, and which is a continuation of International Application No. PCT/US2004/032386, which designated the United States and was filed on Oct. 1, 2004, which is a continuation-in-part of U.S. application Ser. No. 10/774,069, also filed Feb. 6, 2004 now abandoned, which claims the benefit of U.S. Provisional Application No. 60/508,766, filed Oct. 3, 2003. The entire teachings of the above applications are incorporated herein by reference.

BACKGROUND OF THE INVENTION

Networks are used to transmit data (also called network traffic) between network devices connected by links. A path used for transmission of data between two network devices may go through several intermediate network devices and links. A network device may be a router, a computer, a processor in a multiprocessor computer, or any other device as long as it is capable of performing the required network tasks.

A network in general has multiple paths between a given source and a given destination, uses some routing protocol to select a set of the available paths and should be capable of tolerating some links between network devices breaking. One example of such a network is a packet-switched network transmitting packets consisting of binary data. The packets are sent from one network device (also called a host or a node) to another network device, usually through several intermediate network devices known as routers that determine the next hop, i.e. the next network device in the path to the destination.

The transmission of data between network devices, such as routers, may be accomplished using a variety of technologies: wires, phone lines, optical links, wireless links, and others. The low-level protocols used by implementations of these technologies are known as physical layer (or level 1) protocols.

Internet Protocol (IP) based networks, i.e., networks conforming to Request for Comments (RFC) 0791 and RFC 1349 distributed by the Internet Engineering Task Force (IETF) are a popular type of packet-switched networks. The IETF develops, distributes, and maintains a variety of network standards commonly referred to by their numbers as RFCs. A global IP network comprising a large number of interconnected local networks is known as the Internet. A full set of RFCs is available at the IETF's Internet site.

IP is an example of a network layer (or level 3) protocol. Network layer protocols rely on link layer (or level 2) protocols. These protocols may also involve routing packets. A popular type of link layer protocol is Ethernet.

A host is connected to at least one other host. A network router is a host connected to two or more other hosts. Hereinafter, these other hosts will be called the hosts' neighbors and the connection ports on the hosts will be called interfaces. A transmission over a single link between two neighbors is called a "hop". Upon receiving a packet, a router decides the best, for some definition of best, next hop to use, such that the packet eventually arrives at its destination. This decision is usually made using the information carried within the packet, such as the packet's destination host. A router may also use information about the network's topology, i.e. how other hosts are interconnected to determine which interface to direct an incoming packet. Another variable that the router may consider in making its decision is the input interface on which the packet has arrived. Alternatively, a packet may simply carry a label, which the router would use to determine the output interface by using a table per input interface indexed by the labels and containing the output interfaces. One such label-based forwarding mechanism is known as Multi-Protocol Label Switching (MPLS, RFC 3031).

Normally, routing selects the lowest cost path to the destination. Given a network topology, each link in each direction is assigned a positive number, its cost. Given this information, the path chosen for forwarding a packet is the route with the least sum of costs. Each router stores in its memory the network topology and the relevant link costs and for each destination D determines to which neighbor it sends a D-addressed packet so that it travels the lowest cost path. However, other considerations may apply, such as reducing strain on some links in the network, or prioritizing delivery of some packets over others.

After a change in network topology (for example, when a link between two hosts is broken), the routing decisions made by routers may also change. In other words, a packet arriving to a router from interface A may be forwarded to interface B before the change and to interface C after the change. To minimize network traffic loss after a topology change, it is preferable that even before network routers become aware of what the new topology is and make proper adjustments in their traffic forwarding strategy, they continue to forward packets to their destinations. In other words, it is preferable that the forwarding strategy does not cause a loss of traffic in case of topology change even when forwarding decisions are based on stale (pre-change) topology and before even the occurrence of the change becomes known.

Obviously, this task is simply impossible in some cases (to take an extreme example, when all links in a network fail) and trivial in others (for example, when an extra link or links between routers are added to a network without other changes, the old forwarding strategy would remain functional by simply ignoring the added links). However, usually links between routers fail one at a time and networks have enough link redundancy to allow traffic redirection. Many routing algorithms, such as OSPF, rely on link state advertisements (LSAs) to inform all the other routers in a routing group of link status. In the case of a down link, the routers directly connected to that link (that are still able to function) broadcast (flood) a new LSA indicating the down link. These routers compute routes based on the new information and install those new routes. As the other routers in the routing group receive the LSA, they also recompute routes based on the new information and install those new routes as well.

The goal is for all of the routers to compute the same routes. Once their view of the network from the LSAs becomes consistent, the routes become identical since they use algorithms that provide identical results to compute the routes. However, since the information takes a different amount of time to get to each router, each router may take a different amount of time to compute the new routes, and there may be more than one link event at any given time, different routers may have different routes installed for some time after a topology change. Inconsistent routes may cause routing loops (closed-loops), where traffic is forwarded in a ring of routers, never to reach their final destination.

SUMMARY OF THE INVENTION

A network node may compute an appropriate alternate next-hop when it detects a failure in its primary path. Preferably, alternates are pre-computed so that data packets can be promptly forwarded on the alternate without loss of data. Preferably, an alternate provides a loop-free path that does not pass back through the computing source node. However, loop-free paths are not always available, and the preferred system allows data packets to be returned in a U-turn to a node which is capable of itself choosing an appropriate alternate when it receives the U-turn data packet.

In accordance with one inventive feature, a method of forwarding data packets comprises, at a network node, storing links to primary neighbor nodes and forwarding data packets to primary paths through the primary neighbor nodes. Upon failure of a primary path, data packets destined from the network node to the primary path are forwarded to an alternate link and an alternate neighbor node. In some cases, such as when the alternate neighbor node receives a U-turn packet, the alternate neighbor then forwards the data packet on yet another alternate link. In a preferred implementation, each node attempts to compute a loop-free alternate and also attempts to compute a U-turn alternate for use when a received data packet is a U-turn data packet.

In accordance with another inventive feature, a method of forwarding data packets comprises, at a network node, storing links to primary neighbor nodes to which the data packet is primarily forwarded and storing links to alternate neighbor nodes. Upon receiving a U-turn data packet at the network node from a primary node, the data packet is forwarded to an associated alternate neighbor node.

An alternate neighbor node may be loop-free with respect to a primary neighbor node from which the data packet arrived, a primary outgoing interface of the primary neighbor node, a primary neighbor of the primary neighbor node, a primary outgoing interface of the primary neighbor node, all primary neighbors of the primary neighbor node and/or all nodes failing together with primary neighbors of the primary neighbor node. The alternate neighbor node may be the first node on a path to a data packet destination that does not utilize any resources that are known to potentially fail simultaneously with any of the primary neighbors primary next hops or with any of the primary neighbors primary neighbors. Where the alternate neighbor node is loop free for the data packet with respect to a primary remote node, the primary remote node being a node in a sequence of nodes starting at the network node, each node in the sequence may be a primary neighbor of the primary node of the sequence with respect to the data packet and each node in the sequence may be an alternate neighbor node of the next node in the sequence.

An alternate neighbor node depends on the data packet destination and may be determined using a Dijkstra algorithm.

A U-turn data packet may be identified by its being received from a primary neighbor node, or by an explicit tag in the data packet. Such a tag may be an MPLS label.

In accordance with another inventive feature, a unicast data packet is forwarded to a globally defined destination. At a network node, for the destination, a stored function maps inputs of the network node to outputs of the network node, some of the outputs being used as alternates to reach the destination. Data packets are forwarded from inputs to outputs of the network node according to the mapping function.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1.1 is a schematic illustration of one embodiment of this invention.

FIG. 1.2 illustrates the functioning of the Dijkstra algorithm.

FIG. 1.3 shows the functioning of a loop-free alternate node.

FIG. 1.4 shows the functioning of a U-turn alternate node.

FIG. 1.5 illustrates application of the Dijkstra algorithm for some embodiments of this invention.

FIG. 2.1 shows Basic Topology with Primary and Alternate.

FIG. 2.2 shows Example Topology with Local SRLGs.

FIG. 2.3 shows Topology for Terminology.

FIG. 2.4 shows Topology for Terminology of Looping Neighbors.

FIG. 2.5 shows U-Turn Neighbor with ECMP.

FIG. 2.6 shows ECMP Neighbor Which Is Not a ECMP U-Turn Neighbor.

FIG. 2.7 shows U-Turn Alternate Example.

FIG. 2.8 shows Topology with Asymmetric Link Costs.

FIG. 2.9 shows Topology for Loop-Free Proof.

FIG. 2.10 shows Cascaded U-Turn Alternate.

FIG. 2.11A shows $N_1$ Provides Loop-Free Node-Protecting Alternate

FIGS. 2.11B and C show $N_1$ and P Provide Loop-Free Link-Protecting Alternates.

FIG. 2.12 shows $N_1$ Provides U-Turn Node-Protecting Alternate

FIG. 2.13 shows $N_1$ Provides U-Turn Link-Protecting Alternate

FIG. 2.14 shows No Alternate Available from Looping N2 or N1 without Loop-Free Node-Protecting Alternate FIG. 2.15 shows New Forwarding Rule for IP/LDP.

FIG. 2.16 shows Example Forwarding Tables.

FIGS. 2.17A and B show Broadcast Interface Translated to Pseudo-Node.

FIGS. 2.18 A and B show Converging to a Loop-Free Neighbor.

FIGS. 2.19 A and B show Converging to a U-Turn Neighbor.

FIG. 2.20 shows Using a U-Turn Alternate and Converging to a U-Turn Neighbor.

FIG. 2.21 shows an Example Where 2 U-Turn Alternates Lead to Forwarding Loop.

FIG. 2.22 shows a Timeline of Traffic Loss After Link Failure.

FIG. 2.23 shows Inter-Region Destination via One Border Router.

FIG. 2.24 shows Inter-Region Destination via Multiple Border Routers and Multiple Primary Neighbors.

FIG. 2.25 shows Inter-Region Destination via Multiple Border Routers but One Primary Neighbor.

FIG. 2.26 shows Dual-Homed Prefix has ECMP but Single Primary Neighbor.

FIG. 2.27 shows ECMP to Destination, via Different ABRs but Single Primary.

FIG. 2.28 shows an Example of Single Primary and Multiple ABRs for U-Turn Proof.

FIG. 2.29 shows Topology with TE Tunnel and Traffic from B to D via S.

FIG. 2.30 shows Cascading U-Turn Alternatives.

FIG. 3.1 shows Topology for Illustration.

FIG. 3.2 shows Topology where Neighbor isn't ECMP U-turn.

FIG. 3.3 shows Topology Showing Reverse Distance.

FIG. 3.4 shows Loop-Free Topology.

FIG. 3.5 shows an Example Where Reverse Distance Consideration in Minimization is Crucial.

FIG. 3.6 shows an Example Topology.

FIG. 3.7 shows Broadcast Topology.

FIG. 3.8 shows an Example Topology.

FIG. 3.9 shows an Example Topology with Local SRLGs.

FIG. 4.0 shows a process for forwarding a packet.

DETAILED DESCRIPTION OF THE INVENTION

A description of preferred embodiments of the invention follows.

Rather than rely only on the general routing algorithm and waiting for all nodes to converge on a uniform set of routes, embodiments of this invention provide mechanisms to properly route packets even before the new routes are calculated. The embodiments use alternate routes when the primary routes (i.e. routes calculated before the link is down) traverse a down link or node. The only routers switching over to alternate routes are the routers connected to the down link or node. The alternate paths may be used until the rest of the network converges.

Each node may compute the output link and neighboring node for each destination using an algorithm, for example, the well-know Dijkstra's algorithm. In the event of a failure, the nodes are made aware of the failure. Then the algorithm must be run again, but before all nodes run their algorithms (i.e. before the network converges), this invention permits the network to remain functional. To allow this, during the initial computation for each node, embodiments of this invention define, if possible, at least one link to at least one alternate neighbor to which packets are forwarded in case of a link failure. The alternate link from a node S is preferably to a node with a path to the destination bypassing S. The alternate neighbor may have as its primary path to the destination a path flowing through S that would result in a loop. To avoid this, some embodiments of this invention allow for U-turns. In the case of a U-turn, the alternate neighbor follows a rule by which when the alternate neighbor N receives a packet from a node S to which in would normally send the packet, it sends it to an alternate node such that the packet does not pass through S or N again. U-turns may be cascaded.

Hereinafter the functioning of embodiments of this invention will be described with attention to single link failures, but it must be understood that the invention's embodiments remain functional in many cases of multiple link failures, host failures, and other topology changes as well.

FIG. 1 shows an embodiment of this invention including nodes 10, 11, 13-17 and the rest of the network 18. When a packet destined for the node 17 arrives to the node 10 from the node 13, the node 10 decides whether to send this packet to the node 11, 14, 15, or 16. 10's decision may be made by choosing a path on the basis of the IP address of the packet's destination or on the basis of the MPLS label attached to the packet. The packets having the same MPLS label are said to belong to the same Forwarding Equivalence Class (FEC). Each direction of each link in the network 21 is assigned a non-negative cost. The paths to choose are calculated for each IP destination address or each MPLS FEC by choosing the path with the least sum of costs of links for each destination and are stored at each node.

In FIG. 1, when a packet 19 arrives from the node 13 to node 10 via link 20, it is normally routed (based, for example on its IP destination or MPLS label earlier applied based on the associated FEC) to the node 11 via link 12. When node 10 determines that link 12 is broken, as shown in FIG. 1, it decides whether to forward the packet to any of the nodes 13-16 assuming that they are not aware that link 12 is broken. This decision may be different from the decision made after the entire network 21 becomes aware of this topology change and computes the new paths based on this change. After the new paths are computed and installed in all nodes, all paths will be loop-free. This assumption may not be true before the new paths are computed by each node and thus node 10, once it determines the link is broken, chooses the alternate node for the packet 19 so that the packet 19 does not end up on a closed loop route or is lost because it is forwarded over a broken link.

For each packet's FEC or IP destination, a node may be determined as an alternate node based on whether each of its neighbors belongs to one of the following classes: (a) loop-free alternate neighbors that do not forward through the primary next node 11; (b) loop-free alternate neighbors that do forward through the primary next node 11; (c) U-turn neighbors with a loop-free alternate neighbor node that does not forward through the primary next hop 11; or (d) U-turn neighbors with a loop-free alternate neighbor node that do forward through the primary next node 11. Within each category a priority may be assigned to each neighbor within the category. When the link through which a packet is normally forwarded is broken, this packet is forwarded to the neighbor in the category (a), if any available, which has the highest priority in the category (a), otherwise, to the neighbor in the category (c), if any available, which has the highest priority in the category (c), otherwise, to the neighbor in the category (b), if any available, which has the highest priority in the category (b), and otherwise to the neighbor in the category (d), if any available, which has the highest priority in the category (d). This prioritization of the categories may vary; the node should select an alternate from category (a) first, so that U-turn alternates function and from (c) next to support cascaded U-turn alternates. The node 10 decides by this method to which of the nodes 13-16 to forward the packet 19 after the link 12 is broken.

The first two categories under consideration are (a) loop-free alternate neighbors that do not forward through the primary next node and (b) loop-free alternate neighbors that do forward through the primary next node. A loop-free neighbor for a node for a given destination is a neighbor that does not forward a packet to the destination through the node. In other words, node 16 (see FIG. 1) is loop-free with respect to node 10 and packet 19 if after receiving packet 19, node 16 normally does not forward it to any route that may eventually lead back to node 10 including through link 26. The loop-free neighbors that normally do not forward packet 19 to the route going through node 11 (the node to which packet 19 would normally go from node 10 if link 12 was not broken) belong to the category (a), the other loop-free neighbors belong to the category (b). In this paragraph, "normally" refers to the set of paths computed by the routing algorithm in use that assumes that link 12 is up. An example of such a routing algorithm is a least-cost algorithm that is often computed by Dijkstra's algorithm.

A neighbor belonging to the category (c) or (d), U-turn neighbors with a loop-free alternate neighbor node, for a node for a given destination is a neighbor that normally forwards a packet to the destination back to the node and also has at least one neighbor which forwards the packet through a path going neither through the node nor through the node's neighbor. Node 14 belongs to either category (c) or (d) with respect to node 10 and packet 19 if it would normally forward packet 19 to node 10 via link 24 and if it has a neighbor 22 which would normally forward packet 19 neither through node 14 nor through node 10. In this paragraph, "normally" refers to the set of paths computed by the routing algorithm in use that assumes that link 12 is up.

In embodiments of this invention utilizing category (c) and (d) neighbors after a link failure, such neighbors do not forward all the incoming packets using a least-cost algorithm; otherwise packets arriving from node 10 to node 14 via link 24 would be forwarded back to node 10 via the same link 24 in the opposite direction, creating a loop. Whenever a category (c) or (d) neighbor 14 receives packet 19 from node 10, it avoids a routing loop by forwarding packet 19 along the alternate path to node 22 rather than along the primary path to node 10. The routing table in node 14 for link 24 specifies forwarding packets to node 22 when those packets arrive from node 10, the normal next-hop node on the primary path, but specifies node 10 as the next-hop node for all other packets arriving at node 14.

Alternately, node 10 may mark packets sent along link 24 and intended for node 14 to send to node 22, which is node 14's alternate. In that case, node 14 will specify sending packets so marked when received from node 10 to node 22 as above. The marking may be general, indicating that the packet may need to be sent to an alternate, or specific, indicating which neighbor is desirable. Such a marking could be a particular MPLS label, a different layer-2 encapsulation, etc.

As mentioned above, the routing through the category (a), (b), (c) or (d) neighbors continues only until the nodes in the network become aware of the changed topology (for example, by LSA) and switch to the newly computed routes. The nodes directly connected to the down link or node must wait a configurable hold-down time before switching to the new routes to give the rest of the network time to converge.

Functioning of one embodiment is illustrated in FIG. 3. The solid arrows indicate the routing of packets addressed to destination 304 before link 306 is broken, in particular, 301-303-304 and 302-304 (not passing through 301). After link 306 is broken, instead of 301-303-304, the packets travel along the route 301-302-304. This alternative routing selected by node 301 is shown by a dashed line. Node 302 is a category (a) neighbor for node 301 and destination 304. When node 301 sees a break at 306, it forwards packets destined to node 304 on the alternate link 307. Node 302 forwards the packet toward node 304 via the same link 308, on which it would normally forward packets received from links 309 and 310 and destined to node 304.

Functioning of another embodiment is shown in FIG. 4. The solid arrows indicate the routing of packets addressed to node 404 before link 406 is broken, in particular, 401-403-404, 402-401-403-404, and 405-404 (not passing through 401 or 402). After link 406 is broken, instead of 401-403-404, the packets travel along the route 401-402-405-404; instead of traveling along 402-401-403-404, the packets, which enter 402 via a node other than 401 or 405, travel along the route 402-401-402-405-404, thus making a U-turn at node 401. Packets destined for 404 that start at 401 will travel along the alternate route 401-402-405-404. This alternative routing by nodes 401 and 402 is shown by dashed lines. Node 402 is a category (c) neighbor for node 401 and destination 404. Node 401 uses the alternate link 406 (Uses unlabeled link in picture and not 406 which is broken primary.) Node 402 recognizes that it has received a packet from a node to which it normally would send packets with such destination and thus uses its alternate link 407. Node 405 forwards the packet via its normal primary link 408.

Note that some embodiment of this invention may employ only neighbors of type (a), and/or neighbors of type (b), and/or neighbors of type (c), and/or neighbors of type (d) for the temporary routing. Note also that when only neighbors of type (a) and/or type (b) are used, no behavior modification is required for the nodes not connected with the broken link. Incorporation of all these types into an embodiment of this invention provides more opportunities for determining appropriate alternates.

The following equations determine whether a node's neighbor is a loop-free neighbor for a given destination.

If a node in the network is loop-free with respect to the source S for a particular destination D, the following equation is true. If it is true, then the particular node N is loop-free with respect to the source for that destination.

$$\text{Distance}_S(N,D) < \text{Distance}_{opt}(N,S) + \text{Distance}_{opt}(S,D)$$

If the above equation is true, then N does not forward traffic to S in order to reach D because N has a shorter path. The $\text{Distance}_S(N, D)$ is the shortest path from N to D that may be found when done from S's perspective (so that the found path does not loop back to through S). The above equation can be equivalently stated as:

$$\text{Distance}_{opt}(N,D) < \text{Distance}_{opt}(N,S) + \text{Distance}_{opt}(S,D)$$

Note that we use Distance as our example cost function. Other cost functions other than distance can be used with RAPID.

One way to determine which neighbors may be used as loop-free alternates is to know $\text{Distance}_{opt}(N_i, S)$ for each S's neighbor $N_i$, $\text{Distance}_{opt}(S, D)$, and $\text{Distance}_S(N, D)$.

$\text{Distance}_{opt}(N_i, S)$ may be determined by running the Dijkstra algorithm with S as the source using reverse link costs; then the shortest paths reported by each node to S will be the total distance from the node to the source S instead of from the source S to the node. Alternatively, it may be determined by running the Dijkstra algorithm from each of the $N_i$.

$\text{Distance}_{opt}(S, D)$ may be determined by a Dijkstra algorithm with the normal link costs; it may also be determined as a side-effect of the Extended Dijkstra algorithm described below.

$\text{Distance}_S(N_i, D)$ may determined by the Extended Dijkstra algorithm. It is not sufficient to record all the sub-optimal paths found during the Dijkstra algorithm; due to the order in which nodes are probed, sub-optimal paths may not be correctly propagated to all relevant nodes in the network. Therefore, it is necessary to obtain the optimal path via each neighbor $N_i$ to each node in the network. To do this, the Dijkstra algorithm is extended so that paths are explored via each neighbor. Unlike the original Dijkstra algorithm, which compares all paths and retains only the shortest, the Extended Dijkstra algorithm stores the shortest paths through every neighbor $N_i$ in each node and compares two paths only if their first hop is the same neighbor. Additionally, to ensure that the paths are properly propagated to all nodes in the network, it is necessary to ensure that the shortest path via each first-hop neighbor $N_i$ is explicitly passed from a node to its neighbors when it may no longer be shortened.

The following well-known algorithm for determining the least-cost path between two given nodes is known as Dijkstra's algorithm.

To determine the least-cost path between the node 201, as shown in FIG. 2, and the rest of the nodes 202-209, one divides the entire set of nodes into two non-overlapping sets 230 and 231. At the start of the process, only the starting node 201 belongs to the set 230, while all the other nodes belong to the set 231. To determine the next node to add to the set 230, choose the member of the set 230, with the shortest path, and explore its links to neighboring nodes. Each neighboring node's existing shortest path is compared to the cost of the member's shortest path plus the cost of the link to reach that neighboring node and the shorter of the two is retained. If the neighboring node is a member of the set 231, it is made a member of set 230. The previously selected member of set 230 is removed from both sets because its path has been minimized. When set 230 is empty, the algorithm is complete. The proof why this process does indeed produce the least-cost paths to each node is well known among those skilled in the pertinent art and is outside the scope of this invention.

One way of using the Dijkstra algorithm to determining loop-free nodes, in particular for determining $Distance_S(N, D)$ for all $N_i$, is illustrated in FIG. 5. For each node 502-509 the algorithm produces a least-cost path that starts at 502, 503, or 504, and then goes to another node without ever going through 501. One way of doing this is to run a Dijkstra algorithm three times with node 501 and its associated links removed: first starting with 502, then starting with 503, and finally starting with 504. This produces $Distance_S(N_i, D)$ for each $N_i$: 502, 503, and 504, with D being a node 502-509.

The above method determines $Distance_S(N_i, D)$ for each neighbor $N_i$ and each destination node D. $Distance_S(N_i, D)$ along with $Distance_{opt}(N_i, S)$ and $Distance_{opt}(S, D)$ are sufficient to determine whether a neighbor is loop-free with respect to S and a destination D.

Note that other routing algorithms many require other methods to determine whether a neighbor is loop-free with respect to a source S and a destination D. However, the RAPID concept will still work for other routing algorithms.

The Dijkstra algorithm may be used to perform all the necessary calculations for embodiments of this invention. However, an Extended Dijkstra method may also be used as described in U.S. Provisional Application No. 60/542,555, entitled "Network Routing Algorithm" by Alia Karin Atlas and Raveendra Torvi, filed on Feb. 6, 2004, incorporated herein by reference.

The following provides additional information on functioning of embodiments of this invention.

RAPID External Architecture

1 Introduction

Applications such as VoIP and pseudo-wires can be very sensitive to traffic loss, such as occurs when a link or router in the network fails. A router's convergence time is generally on the order of seconds; the application traffic is sensitive to losses greater than 10 s of milliseconds. This document describes a mechanism to allow a router whose local link has failed to forward traffic to a pre-computed alternate until the router installs the new primary next-hops based upon the changed network topology.

With current IP routing and forwarding, there is a non-trivial period of traffic loss in the event of a link failure. Consider the example topology shown below in FIG. 2.1. In this example (and all other examples given in here), the green arrows show the shortest path tree towards the destination (D in this topology).

If the link from node S to node P fails, then traffic from S which is destined to D will be dropped until S recomputes and installs new forwarding state. This process of recomputing the shortest path (running an SPF algorithm) and installing the results can take seconds. This means that the traffic convergence can take seconds.

The goal of RAPID is to reduce that traffic convergence time to tens of milliseconds by having pre-computed an alternate interface to use, in the event that the currently selected primary interface fails, and having installed that alternate interface into the forwarding plane so that it can be rapidly used when the failure is detected.

This document describes RAPID from the perspective of the externally visible changes to a router, its associated protocols, and the interactions this causes in the network. It does not address any algorithms to compute the alternate next-hops nor any router internals to actually implement RAPID.

To clarify the behavior of RAPID a bit more, consider the topology shown in FIG. 2.1. When Router S computes its shortest path to Router D, Router S determines to use the interface to router P as its primary next-hop. (Although we use "shortest path" terminology throughout the document, RAPID also works with non-shortest path routing algorithms as well.)

Without RAPID, that is all the only next-hop that router S computes to reach D. With RAPID, S also looks for an alternate next-hop to use. In this example, S would determine that it could send traffic destined to D by using the interface to router $N_1$ and therefore S would install the interface to $N_1$ as its alternate next-hop. At some point later, the link between router S and router P could fail. If that link fails, S and P will be the first to detect it. On detecting the failure, S will stop sending traffic destined to D towards P and the failed link and instead send the traffic to S's pre-computed alternate next-hop, which is the interface to $N_1$. As with the primary next-hop, the alternate next-hop is computed for each destination.

RAPID can use a loop-free or U-turn neighbor to provide an alternate to protect against a single failure. A looping neighbor cannot be used to provide an alternate.

The terminology needed to understand RAPID will be described in Section 2. The different types of alternates and how to select an alternate are discussed in Section 3. The use of an alternate for breaking U-Turns and for protecting against a local failure is covered in Section 4. The external signaling required to support RAPID and the associated protocol extensions are discussed in Section 5. Section 6 discusses how the alternates which are computed for a single IGP area or level are inherited to the different protocols and types of routes. The interactions with IGP tunnels, RFC 3137, ISIS overloaded routers, and LDP/IGP Interactions are also described.

2 Terminology

The following describes the terminology used in describing alternates and finding alternates. The terms are introduced as they are used, but they are gathered together here for clarity.

SPT—Shortest Path Tree.

SRLG—Shared Risk Link Group. This is a set of links which are dependent upon a common resource and may therefore fail at the same time. For example, multiple links may use the same router module and thus be part of a shared risk group.

$localSRLG_M$—Any SRLG which contains only links from router M.

D—The destination router under discussion.

S—The source router under discussion. It is the viewpoint from which RAPID is described.

P—The router which is the primary next-hop neighbor to get from S to D. Where there is an ECMP set for the shortest path from S to D, these will be referred to as $P_1$, $P_2$, etc.

$N_i$—The ith neighbor of S.

$R_{i,j}$—The jth neighbor of $N_i$, the ith neighbor of S.

$Distance_{i,S}(N_i, D)$—The distance of the shortest path from $N_i$ to D which does not go through router S.

$Distance_{opt}(A, B)$—The distance of the shortest path from A to B.

Reverse Distance of a node X—This is the $Distance_{opt}(X, S)$.

Loop-Free Alternate—This is a next-hop that is not a primary next-hop whose shortest path to the destination from the alternate neighbor does not go back through the router S which may use it as an alternate.

U-Turn Alternate—This is an alternate next-hop of S that goes to a neighbor $N_i$, whose primary next-hop is S, and whose alternate is loop-free with respect to S and $N_i$.

Link(A→B)—A link connecting router A to router B.

Primary Neighbor—One or more of the primary next-hops for S to reach the destination D goes directly to this neighbor.

Loop-Free Neighbor—A Neighbor $N_i$ which is not the primary neighbor and whose shortest path to D does not go through S.

U-Turn Neighbor—A neighbor $N_i$ is a U-Turn neighbor of router S with respect to a given destination D if and only if S is a primary next-hop of $N_i$ to reach the destination D for all primary paths which go through S to reach D.

ECMP U-Turn Neighbor—A neighbor $N_i$ which is a U-Turn neighbor and which has at least one equal cost path to reach D that does not go through S as well as the path(s) which do go through S to reach D.

Looping Neighbor—A neighbor $N_i$ is a looping neighbor of router S with respect to a given destination D if and only if S is not the primary next-hop of $N_i$ on at least one optimal path that goes through S to reach D.

Loop-Free Node-Protecting Alternate—This is a path via a Loop-Free Neighbor $N_i$ which does not go through any of S's primary neighbors to reach the destination D.

Loop-Free Link-Protecting Alternate—This is a path via a Loop-Free Neighbor $N_i$ which does go through one or more of S's primary neighbors to reach the destination D.

U-Turn Node-Protecting Alternate—This is a path via a U-Turn Neighbor $N_i$ which does not go through S or any of S's primary neighbors to reach the destination D.

U-Turn Link-Protecting Alternate—This is a path via a U-Turn Neighbor $N_i$ which does not go through S but does go through one or more of S's primary neighbors to reach the destination D.

Upstream Forwarding Loop—This is a forwarding loop which involves a set of routers, none of which are directly connected to the link which has caused the topology change that triggered a new SPF in any of the routers.

⟶ This is an arrow indicating the primary next-hop towards the destination D.

--→ This is an arrow indicating the new primary next-hop towards the destination D in the event that the link between router S and router P has failed.

······→ This is an arrow indicating the alternate next-hop towards the destination D.

3 Finding an Alternate to Use 3.1 Failure Scenarios

For very fast fail-over times using all known schemes, it is necessary to find an acceptable alternate to use before the failure occurs. What constitutes an acceptable alternate depends on what types of failures are to be protected against.

The simplest case is to protect against a single link failure.

However, a link, as seen in the IP topology, may not be independent of other links as seen in the IP topology. This may be because of multiple logical interfaces, such as VLANs on a Gigabit Ethernet interface or PVCs on an ATM port. It may also be because of channelization, so that multiple interfaces use the same physical fiber. It may also be because multiple links use the same internal hardware, such as a line-card, and so have a correlated failure. Each of these scenarios represent links local to the router which need to be grouped into correlated failure groups. Such a local failure group will be referred to as a local SRLG (Shared Risk Link Group). A local SRLG which contains links local to a router M will be indicated as $localSRLG_M$.

To clarify about protection of a local SRLG, consider the topology shown in FIG. 2.2. In this example, S has a local SRLG which contains Link(S→P) and Link(S→$N_1$). Similarly, P has a local SRLG which contains Link(P→S) and Link(P→$N_2$). It is possible for S's alternate to only protect against S's own local SRLG and not against P's local SRLG; in that case, S might select $N_2$ as an alternate. If S's alternate also tried to protect against P's local SRLG, because the link from S to P was included in it, then S could not select $N_2$ or $N_1$ and so would need to select $N_3$, because $N_3$, to reach D, does not go via a link in the same local SRLG of P of which the potential failed link from S to P is a member The former case will be referred to as providing local SRLG protection. The latter case will be referred to as also providing protection for the primary neighbor's local SRLG.

It is also useful to protect against a node failure. For broadcast interfaces, protection against a node failure does not imply protection against a link failure, as is the case for point-to-point interfaces. Thus, there are three different failure scenarios—link protection, node protection, and link and node protection.

One can generalize the concern about correlated failures to apply to links which are not local to a single router but instead contain any links from the topology. This allows considerations about physical equipment, such as conduits, fibers, etc., to be accurately expressed as correlated failures. These correlated failure groups that contain an arbitrary set of links are referred to as SRLGs (Shared Risk Link Groups).

RAPID can provide link protection, node protection or local SRLG protection, depending upon the selection of the alternates which is done when the RAPID algorithm is run at a router S. General SRLGs are not considered for protection.

It is possible for RAPID to interact beneficially with the transport layer it for example, the transport layer is SONET and is doing shared mesh restoration. To heal with shared mesh restoration can take 10s of seconds. When shared mesh restoration is in progress, AIS will be indicated by SONET, as opposed to LOS. With RAPID, it would be possible to fail-over to the backup when MS is indicated but not notify that the link has failed to the IGP. This allows time for the transport layer to repair itself while IP uni-cast and LDP traffic are moved to the safe alternate.

3.2 Types of Alternates

As with primary next-hops, an alternate next-hop is discussed in relation to a particular destination router D. For this discussion, the following terminology, illustrated in FIG. 2.3, will be used. The router on which the search for an alternate is proceeding is S. The primary next-hop neighbor to get from S to D is P. Additionally, S has various neighbors which will be labeled $N_1$, $N_2$, etc. Where an arbitrary neighbor of S is intended, $N_i$ will be used. Routers which are neighbors of neighbors will be labeled $R_1$, $R_2$, etc. Where an arbitrary neighbor of a neighbor $N_i$ is intended, it will be referred to as $R_{i,j}$.

In standard IP routing, a router S can join the shortest path tree (SPT) at exactly one point—itself. An alternate next-hop allows traffic from S to D to deviate from the SPT and then rejoin it. For instance, if S were to send traffic destined for D to $N_1$ instead of P, thereby deviating from the SPT, then when $N_1$ received it, $N_1$ would send that traffic along its shortest path to D.

3.2.1 Loop-Free Alternates

To expand the set of points at which S can cause its traffic to join the SPT, first consider S's neighbors. Router S has the ability to send traffic to any one of its neighbors $N_i$; this is the easiest possible deviation from the SPT that S can cause to happen. Thus, all of router S's neighbors are possible points at which S could cause traffic to rejoin the SPT. However, it is not useful for router S to use an next-hop which results in rejoining the SPT upstream of S, such that the traffic will transit S again. This would cause a loop. Avoiding a loop is thus the first constraint imposed on the alternate next-hop. In FIG. 2.3, this is the case for S's neighbors $N_2$ and $N_3$.

A next-hop which goes to a neighbor that does not have a loop back to S and is not the primary next-hop may be selected as an alternate next-hop. In FIG. 2.3, that is the case for S's neighbor $N_1$. Such alternates are referred to as loop-free alternates because there is no loop caused by using them.

An algorithm run on router S must be able to determine which neighbors provide loop-free alternates. By running an SPF computation from S's perspective, router S can determine the distance from a neighbor $N_i$ to the destination D for the optimal path that does not go through S. This is referred to as Distance$_{!S}(N_i, D)$. If a neighbor $N_i$ can provide a loop-free alternate, then it is cheaper to get to the destination without going through S than by going through S. This gives the following requirement, where Distance$_{opt}(A, B)$ gives the distance of the optimal path from A to B.

$$\text{Distance}_{!S}(N_i,D) < \text{Distance}_{opt}(N_i,S) + \text{Distance}_{opt}(S,D)$$

Equation 1

Criteria for a Loop-Free Alternate

Recall that a router will take the shortest path to a destination that it can see. Thus, if Distance$_{!S}(N_i, D)$>Distance$_{opt}(N_i, S)$+Distance$_{opt}(S, D)$, then router $N_1$ will, based on its own shortest path computations, determine to send traffic destined for D to S. Similarly, if Distance$_{!S}(N_i, D)$=Distance$_{opt}(N_i, S)$+Distance$_{opt}(S, D)$, then router $N_1$ has equal cost paths to the destination D where one or more of those paths go through S. In such a case where a router $N_i$ has an ECMP set to reach the destination and one or more paths go through S, then the router $N_i$ cannot provide a loop-free alternate because some traffic destined to D may be sent back to S by $N_i$. Thus, if $N_i$ is to decide not to send traffic for D back to S, $N_i$ must know that the shortest path to D does not go through S; Equation 1 gives this requirement in terms which can be determined by router S.

3.2.2 U-Turn Alternates

In examining realistic networks, it was seen that loop-free alternates did not provide adequate coverage for the traffic between all the source-destination pairs. This means that it is not sufficient to expand the set of points where S can cause its traffic to join the SPT to be S's neighbors.

The next possibility is to see whether S could expand its SPT join points to include router S's neighbors' neighbors. This is only of interest if S had no loop-free node-protecting alternate available for the given destination D. If there are no loop-free alternates, that implies that all of S's non-primary neighbors will send traffic for D back to S.

The topology shown in FIG. 2.4 gives an example where router S has no loop-free alternate to reach D. Router S uses $N_1$ as its primary next-hop (distance of 30). S has three other neighbors, but all of them will send traffic for D back through S.

In order for S to be able to use a neighbor's neighbor as a point where S's traffic can rejoin the SPT, S must be able to direct traffic to a neighbor $N_i$ and that neighbor $N_i$ must be able to direct traffic to one of its appropriate neighbors $R_{i,j}$ instead of along the SPT. In deciding to use its alternate, S has the ability to force traffic destined to D to go through the selected alternate neighbor $N_i$. However, for S to reach the appropriate neighbor's neighbor $R_{i,j}$, the selected neighbor $N_i$ must be able to detect that the traffic should not be sent along its shortest path to D, which would lead back to S, and should instead be sent to its appropriate neighbor $R_{i,j}$.

This detection and forwarding contrary to the SPT by $N_i$ must occur without any communication from S upon the failure which would cause S to redirect the traffic to $N_i$. There is already communication from S to $N_i$ indicating when a link has failed, but such communication would cause the fail-over of traffic to take longer if $N_i$ depended upon it to decide that it should forward contrary to the SPT. In essence, the assumption being made is that the time budget to recover traffic in the event of a failure is being consumed by router S's detection of the failure and switch-over to its pre-computed alternate.

With that assumption, it is clear that $N_i$'s behavior to forward traffic contrary to the SPT on receiving traffic from S must be a default behavior. This default behavior must not change how traffic is forwarded unless a forwarding loop is detected; basic IP forwarding must be preserved in the absence of a failure. Router $N_i$ can detect if it is receiving traffic from a neighbor to whom it would forward that traffic; this detection is done via a reverse forwarding check. Such a reverse forwarding check may only consider if traffic is received on the same interface as it would be forwarded out, but logically it should consider the neighbor and not merely the interface. Normally, if traffic fails a reverse forwarding check (i.e. would be forwarded out to the same neighbor as received from), then that traffic is normally either discarded or forwarded into a loop. In RAPID, however, traffic that fails a reverse forwarding check is forwarded to the appropriate $R_{i,j}$, if available, rather than being discarded.

First, this detection can be used by $N_i$ to determine not to forward the traffic according to the SPF (or discard it), but to instead send the traffic to $N_i$'s appropriate neighbor $R_{1,j}$. $N_i$ can only detect the traffic to be redirected if S sends it directly to $N_i$, which is under S's control, and if $N_i$ would send that traffic back to S, according to the SPT. This motivates the definition of a looping neighbor and a U-turn neighbor.

Looping Neighbor—A neighbor $N_i$ is a looping neighbor of router S with respect to a given destination D if any of $N_i$'s shortest paths to D goes through S but S is not the primary next-hop of $N_i$ for all those paths through S.

U-Turn Neighbor—A neighbor $N_i$ is a U-Turn neighbor of router S with respect to a given destination D if and only if S is a primary next-hop of $N_i$ to reach the destination D for all primary paths which go through S to reach D.

For a Looping Neighbor to provide an alternate would require changing the forwarding state associated with links from any neighbor which an optimal path to D traversed; additionally, appropriate alternates which avoided that neighbor would be necessary to compute. This would cause the complexity of RAPID to increase. Therefore for this version, we disallow using an alternate via a Looping Neighbor. A U-Turn neighbor may be able to provide an alternate. In FIG. 2.4, S has two U-Turn Neighbors $N_2$ and $N_3$ and one looping neighbor $N_4$. For neighbor $N_4$, the path to D is $N_3$ to S to $N_1$ to $R_1$ to D; because there is a node between $N_4$ and S on the path, $N_4$ is a looping neighbor.

Mathematically, for a neighbor $N_i$ to be a U-Turn neighbor, it is necessary that Equation 2, which is the exact opposite of Equation 1, be true. If the equality is true, that means that there are multiple optimal paths, at least one of which goes through S and one does not. Such a neighbor may be an ECMP U-Turn neighbor or may be a looping neighbor.

$$\text{Distance}_{!S}(N_i,D) \geq \text{Distance}_{opt}(N_i,S) + \text{Distance}_{opt}(S,D)$$

Equation 2

U-Turn or Looping Neighbor

Additionally, all optimal paths to reach D that go via S must be via a direct link between $N_i$ and S. If a neighbor $N_i$ satisfies Equation 2 and all optimal paths to reach D that go via S are via a direct link between $N_i$ and S, then it is a U-turn neighbor.

The above clarifies what a U-Turn neighbor is and how such a neighbor can detect traffic from router S and redirect it. It is still necessary to describe where the U-Turn neighbor $N_i$ redirects the traffic.

It is also necessary to describe on what interfaces a router $N_i$ must consider that it could be a U-Turn neighbor. A router $N_i$ must detect traffic coming from its primary neighbor and redirect that traffic to the appropriate alternate. This is termed breaking a U-turn because it redirects the traffic to the alternate and avoids forwarding the traffic back into the U-turn loop. If a router advertises that an interface is U-turn safe, meaning the router can break U-turns on traffic entering that interface, then the router must break U-turns for all traffic coming from a primary neighbor. The router is not responsible for breaking U-turns for traffic from potential primary neighbors which were not selected.

3.2.2.1 ECMP U-Turn Neighbors

The above definition for U-Turn Neighbor allows a neighbor, which has equal cost paths (an ECMP set) where one of those paths goes directly to S and others may not, to be a U-Turn Neighbor. Consider the topology shown in FIG. 2.5. In this figure, $N_1$ has three equal-cost paths to reach D which are $N_1$-S-P-D, $N_1$-$R_1$-D, and $N_1$-$R_2$-D. Because the only path that goes through S goes directly through S, $N_1$ is a U-Turn neighbor.

$$Distance_{1S}(N_i,D)=Distance_{opt}(N_i,S)+Distance_{opt}(S,D)$$

Equation 3

ECMP Neighbor

A neighbor is an ECMP neighbor if Equation 3 is true. The complication comes because S does not whether a neighbor $N_i$ supports ECMP or how that neighbor selects among the equal cost paths. Recall that a node will only break U-Turns on the interfaces connected to that node's primary neighbors; these interfaces may not be a primary next-hop.

Consider the topology in FIG. 2.6, where $N_2$ has three equal cost primary neighbors which are S, $N_1$ and A. If $N_2$ were to select only $N_1$ as its primary neighbor, then $N_2$ would break U-Turns only on traffic received from $N_1$ and not on traffic received from S. Therefore, S cannot consider $N_2$ as an ECMP U-Turn neighbor because S cannot rely upon $N_2$ to break U-turns for traffic destined to D which is received from S.

If $N_2$ has multiple paths to reach D which go through S and not all such paths have a first hop which is a direct link between $N_2$ and S, then S cannot use $N_2$ as a U-Turn neighbor because $N_2$ in this case is a Looping Neighbor.

If all paths from an ECMP neighbor $N_i$ to destination D which go via S have S as the primary neighbor, then S can use $N_2$ as a ECMP U-Turn neighbor.

3.2.2.2 U-Turn Neighbor's Alternate

The requirement for the neighbor's neighbor $R_{i,j}$ to which a U-Turn Neighbor $N_i$ will redirect traffic from S destined to D is that the traffic will not come back to S. Equation 4 gives this requirement that $R_{i,j}$ must have a path to D that does not go through S which is shorter than the path to D going via S. This can be expressed as follows.

$$Distance_{1S}(R_{i,j},D)<Distance_{opt}(R_{i,j},S)+Distance_{opt}(S,D)$$

Equation 4

Loop-Free Neighbor's Neighbor

Equation 4 means that a U-Turn neighbor's alternate cannot be an ECMP set which contains that U-Turn neighbor.

If $N_i$ is a U-Turn neighbor, then the optimal path to D from $N_i$ is via S; the path is $N_i$-S- . . . -D. Therefore, if the optimal path from $R_{i,j}$ goes through $N_i$, it must also go through S. Thus, if Equation 4 holds for a $R_{i,j}$, that implies that the path from $R_{i,j}$ does not go through $N_i$. This may be made clearer by considering FIG. 2.7 below. If the shortest path from R to D went through $N_1$, then it would go through S as well, because the shortest path from $N_1$ to D is through S. Therefore, if the shortest path from R does not go through S, it cannot have gone through $N_1$.

---

Proof 5: Proof that a Loop-Free $R_{i,j}$ (Neighbor's Neighbor) Implies $R_{i,j}$ Doesn't Loop to Neighbor $N_i$ This is a proof by contradiction showing that if a neighbor's neighbor $R_{i,j}$ is loop-free with respect to S, then it is also loop-free with respect to $N_i$.
If the optimal path from $R_{i,j}$ to D goes through $N_i$, then
$$Distance_{1S, Ni}(R_{i,j}, D) \geq Distance_{opt}(R_{i,j}, N_i) + Distance_{opt}(N_i, D)$$
Because $N_i$ is a U-Turn neighbor, the shortest path to D is via S so:
$$Distance_{opt}(N_i, D) = Distance_{opt}(N_i, S) + Distance_{opt}(S, D)$$
The previous two equations can be combined to form the following:
$$Distance_{1S, Ni}(R_{i,j}, D) \geq Distance_{opt}(R_{i,j}, N_i) + Distance_{opt}(N_i, S) + Distance_{opt}(S,D)$$
The following observation can be made because $Distance_{opt}(R_{i,j}, S)$ is the minimum distance of a path to get from $R_{i,j}$ to S, so the path to do so via $N_i$ cannot have a lower distance.
$$Distance_{opt}(R_{i,j}, S) \leq Distance_{opt}(R_{i,j}, N_i) + Distance_{opt}(N_i, S)$$
This can be combined with the previous equation to yield
$$Distance_{1S, Ni}(R_{i,j}, D) \geq Distance_{opt}(R_{i,j}, S) + Distance_{opt}(S, D)$$
This equation is the opposite of Equation 4. Thus, if Equation 4 is true, then the optimal path from $R_{i,j}$ to D does not go through $N_i$.

---

The proof given in Proof 5 means that if a U-Turn Neighbor $N_i$ has itself a neighbor $R_{i,j}$ that satisfies Equation 4, then that router $R_{i,j}$ is itself a loop-free alternate with respect to $N_i$. Regrettably, the converse does not apply; just because $R_{i,j}$ is loop-free with respect to $N_i$ and D does not mean that $R_{i,j}$ is loop-free with respect to S and D.

3.2.2.2.1 Computing Alternate Such that the Primary Next-Hop can Use the Computing Router as U-Turn Alternate Each router independently computes the alternate that it will select. It is necessary to consider what alternate S could select so that S's primary next-hop P could use S as a U-Turn alternate. In other words, consider the computation when S is in the role of a neighbor to a router trying to use S as a U-Turn alternate.

To describe this using router S as the computing router, S would need to verify that both Equation 1 is true and that S's selected alternate $N_i$ does not have a path that goes through P.

This can be described as if $N_i$ were doing the computation as follows. The criteria described in Equation 4 requires that if a U-Turn neighbor $N_i$ is to be used as a U-Turn alternate then $N_i$ must have a loop-free alternate which avoids $N_i$'s primary neighbor S. Such an alternate will be referred to as a loop-free node-protecting alternate. $N_i$ can identify loop-free alternates by checking the validity of Equation 6. Additionally, $N_i$ will need to tell whether the path from a loop-free $R_{i,j}$ to D goes through $N_i$'s primary next-hop neighbor, S.

$$\text{Distance}_{1S}(R_{i,j}, D) < \text{Distance}_{opt}(R_{i,j}, N_i) + \text{Distance}_{opt}(N_i, D)$$

Equation 6

Neighbor's Loop-Free Alternate 3.2.3 Asymmetric Link Costs

Nothing in the determination of an acceptable alternate to use depends upon symmetric link costs. The example topology in FIG. 2.8 shows asymmetric link costs with the alternates computed. That symmetric link costs are not assumed in the alternate computation can be seen by examining the equations used and their derivation. At no point is it assumed that $D_{opt}(N, S)$ $D_{opt}(S, N)$, for instance.

3.2.4 Explanation of why U-Turn Alternates do not Cause Loops in Absence of Multiple Failures One can exhaustively go through all of the possibilities. Assume a topology such as shown in FIG. 2.9. RAPID protects against the failure of Link(S→P) by providing an alternate path through N. Once Link(S→P) fails, S forwards traffic destined for D to N.

Either N or R are on a shortest path to D that does not go via S. If N is a loop-free alternate of S, it is on a shortest path to D that does not include S. If N is a U-Turn alternate of S, then R is on a shortest path to D that does not include S.

N is either a loop-free neighbor of S or it is a U-Turn neighbor of S. If N is a loop-free neighbor of S, then all traffic destined for D through N will not travel through S. Thus there is no loop caused by the redirection of traffic by S to N because N will not forward the traffic back to S.

If N is a U-Turn neighbor of S, traffic destined for D from S to N will be forwarded to R, but traffic destined for D and not from S will be forwarded to S. Thus, there are two cases: traffic destined for D either (i) goes through S before N OR (ii) goes through N before S.

In case (i), there is no loop because N will forward the traffic to R.

In case (ii), there is what appears to be a loop (N→S→N). Due to its separate forwarding table for traffic arriving from S, however, N has effectively become two nodes with the first node (N) being exactly the same as the original N and the second node (N') having two links, one to/from S and the other to/from R. Since N becomes N' for traffic from S to D, the path now becomes N→S→N'. N' forwards traffic to D through R which is on a shortest path to D that does not include S.

To prove freedom from loops, one can simply show that any given node is only visited once. However, U-turn alternates are visited more than once. Since those nodes behave differently based on whether the traffic enters via their primary or not, they are effectively two nodes for the given destination D, the first node (X) being exactly the same as the original node with a single routing table for the destination while the second node (X') has two links, one to its primary and the other to its alternate. Each of the two nodes will be traversed at most once, since the first node X will forward towards its primary and the second node X' will forward towards the alternate. The alternate path is not taken until S is hit and the U-turn commenced. There is no crossover that would create a loop since all of the first nodes are hit before any second node, since the second nodes are only on the alternate path and cannot be reached from the primary path except through S. Thus, the graph is acyclic and will have no loops.

3.2.4.1 Cascading U-Turns

In the discussion of U-turn alternates so far, it is required that the U-turn neighbor have itself a loop-free node-protecting alternate. It is possible to extend the idea of a U-turn alternate so that the U-turn neighbor may itself have either a U-turn node-protecting alternate or a loop-free node-protecting alternate. This would increase the availability of alternates, such as shown in the topology in FIG. 2.10.

Of course, there is no reason to limit the number of U-turn neighbors used by a U-turn alternate to merely 2. A router S can choose to use a U-turn neighbor, $N_1$, as a U-turn alternate as long at that U-turn neighbor itself has an alternate which avoids S; that alternate might be another U-turn alternate, which would need to avoid $N_1$ as well as S, and so on. The number of U-turn alternates swapped to need not be limited to a particular number. The same proof as given earlier can show that cascaded U-turn alternates would be loop-free.

Clearly, calculating whether a potential cascaded U-turn alternate will provide the correct protection is more complicated than computing whether the selected U-turn neighbor has a loop-free node-protecting alternate. Therefore, in the remainder of this document, cascaded U-turn alternates are not discussed; to record thoughts on cascading u-turns, a few notes on them appear in 3.3 Selection of an Alternate A router S may have multiple alternates that it must decide between. A common selection method is necessary to support U-Turn Alternates. This is because it is not sufficient for router S to know that its U-Turn neighbor $N_i$ has itself a neighbor $R_{i,j}$ that is loop-free with respect to S and D if S does not also know that $N_1$ will select that $R_{i,j}$ or another with the same properties.

3.3.1 Configuration Control: RAPID Alternate Capability

There are a number of different reasons why an operator may not wish for a particular interface to be used as an alternate. For instance, the interface may go to an edge router or the interface may not have sufficient bandwidth to contain the traffic which would be put on it in the event of failure.

If an interface cannot be used for an alternate, then the interface will have its RAPID Alternate Capability be signaled as false and otherwise as true.

3.3.2 Interactions with Maximum Costed Links

A router may advertise itself as overloaded, for ISIS, or indicate a link weight of LSInfinity (for OSPF), or the equivalent maximum weight (for ISIS). This is done in several circumstances.

First, the operator is intending a maintenance window for the interface or router and the operator does not want any transit traffic to be directed across that link or through that router. The link or router is kept active in the topology so that the link's or router's local addresses can still be reached.

Second, the router has not learned the necessary information to be able to accurately forward a subset of traffic, either BGP-distributed prefixes or LDP FECs. For the case of BGP, the entire router will be indicated to not be used for transit. In the case of LDP, one or more links will be set to the maximum cost to avoid that link being used to transit LDP traffic.

RAPID must respect the intentions of having a link set to maximum cost and/or a router being overloaded. This is particularly required because those links would otherwise look very tempting to RAPID, because the $D_{opt}(N_i, S)$ would be quite large if $N_i$ has set the links between itself and S to the maximum cost.

Therefore, when looking for alternates, a router S cannot consider diverting from the SPT to a neighbor $N_i$ if all links between S and $N_i$ have a maximum reverse cost or if $N_i$ is overloaded. Similarly, router S cannot consider that a neighbor $N_i$ could provide a U-turn alternate via a neighbor's neighbor $R_{i,j}$ when $R_{i,j}$ is overloaded or if all the links between $N_i$ and $R_{i,j}$ have a maximum reverse cost.

3.3.3 Characterization of Neighbors

Each neighbor $N_i$ must be categorized as to the type of path it can provide to a particular destination. Once the primary paths have been determined and removed from consideration, each neighbor can be characterized as providing a path in one of the following categories for a particular destination D. It is possible for a neighbor to provide both the primary path and a loop-free link-protecting alternate. Additionally, for case of ECMP primary paths, a primary path may serve as the alternate for another primary path. The path through the neighbor $N_i$ is either a:

Loop-Free Node-Protecting Alternate—not a primary path and the path avoids both S and one of S's primary neighbor's on the path to D. If it also avoids the interface connecting S to that primary neighbor, then it is also link-protecting. In FIG. 2.11A, $N_1$ provides a loop-free node-protecting alternate Loop-Free Link-Protecting Alternate—not a primary path and the path avoids S and an interface connecting S to one of S's primary neighbors, but goes through that primary neighbor on the path to D. In FIGS. 2.11B and 2.11C, respectively, $N_1$ and P provide loop-free link-protecting alternates.

U-Turn Node-Protecting Alternate—the neighbor is a U-Turn neighbor or a ECMP U-Turn neighbor and the alternate that the neighbor has selected does not go through a primary neighbor of S to reach D. In FIG. 2.12 $N_1$ provides a U-Turn node-protecting alternate.

U-Turn Link-Protecting Alternate—the neighbor is a U-Turn neighbor or a ECMP U-Turn neighbor and the alternate that the neighbor has selected goes through a primary neighbor of S to reach D. In FIG. 2.13, $N_1$ provides a U-Turn link-protecting alternate.

Unavailable—because the neighbor is looping or a U-Turn neighbor which didn't itself have a loop-free node-protecting path, or a U-Turn neighbor which couldn't break U-Turns or the links to the neighbor are configured to not be used as alternates. The neighbor may also be disqualified because the link to reach it is in a local SRLG with the primary next-hop. The neighbor may be connected to S via a broadcast interface that is a primary next-hop. In FIG. 2.14, no alternate is available from looping N2 or N1 without a loop-free node-protecting alternate.

3.3.3.1 Broadcast and NBMA Interfaces

The checking for node-protection and link-protection is a bit more complicated for broadcast interfaces. In an SPF computation, a broadcast interface is represented as a pseudo-node with links of 0 cost to leave the pseudo-node. For an alternate to be considered link-protecting, it must avoid the pseudo-node. Thus, a potential alternate that doesn't avoid the next node on the primary path cannot be used as an alternate if the next node on the path is a pseudo-node; this assumes that link-protection is a minimum. Additionally, an alternate that would normally be termed node-protecting because it avoided the next node on the primary path may be only link-protecting. If the alternate avoids the pseudo-node but goes through the next node on the path (i.e. the real neighbor of S), then the alternate is link-protecting; if the alternate avoids not only the pseudo-node but the following node on the primary path, then the alternate is node-protecting and link-protecting. It is possible to use a node-protecting alternate that does not provide link protection, if that yields protection against the failure scenarios of most concern.

Additionally, the definition of a U-turn neighbor indicated that there are no other nodes on the path from the neighbor back to S; a pseudo-node is not considered to be another node on the path.

3.3.4 Selection Procedure

Once the neighbors have been categorized, a selection can be made. The selection should maximize the failures which can be protected against. A node S can only be used to break U-turns by its primary neighbors if S has a loop-free node-protecting alternate. This is a consequence of Equation 4 and assumes that multiple U-Turns cannot be broken in order to find an alternate; such extensions are for future study.

The selection procedure depends on whether S has a single primary neighbor or multiple primary neighbors. A node S is defined to have a single primary neighbor only if there are no equal cost paths that go through any other neighbor; i.e., a node S cannot be considered to have a single primary neighbor just because S does not support ECMP.

3.3.4.1 Alternate Selection with a Single Primary Neighbor

Because a node S can only be used to break U-Turns by its primary neighbor if S selects a loop-free node-protecting alternate, the following rules are followed when selecting an alternate. This describes a policy which allows U-Turn alternates to function in a way which is more efficient given our current algorithm; other policies are possible and will allow U-Turn alternates to function.

If a node S has one or more loop-free node protecting alternates, then S must select one of those alternates. Let M be the set of neighbors which provide loop-free node-protecting alternates. If S has multiple loop-free node protecting alternates, then S must select the alternate through a $N_k$ such that:

$$D_{opt}(N_k,D) - D_{opt}(N_k,P) \; \min_{\forall m \in M} (D_{opt}(m,D) - D_{opt}(m,P))$$

Equation 7

Selection Among Multiple Loop-Free Node-Protecting Alternates where P is the primary neighbor of S.

To rephrase the above consider S is the node looking for a U-Turn alternate. Using Equation 7 to select among loop-free node-protecting alternates ensures that N is to primary neighbor S can determine which alternate was picked by N_i. For S to know that N_i's S's U-Turn neighbor N_i can provide a loop-free node-protecting alternate, S must know if $$(\min_{\forall\, in\, j}(D_{iS}(R_{i,j},D) - D_{opt}(R_{i,j},S))) < D_{opt}(S,D)$$

Equation 8

Determination if a U-Turn Neighbor can Provide a U-Turn Alternate

This equation comes from Section 3.2.2.2, where Equation 4 is rearranged so that the $R_{i,j}$ dependent terms are shifted to the left-side so that a minimum across all $R_{i,j}$ can be taken. Equation 8 allows S to determine that $N_i$ has a loop-free node-protecting alternate. To allow S to determine whether the alternate which $N_i$ selected will avoid P and thus provide a U-turn node-protecting alternate, S must know the path taken by the loop-free node-protecting alternate. S knows only the path for the particular R, which satisfied Equation 8. Because a router obeys Equation 7 when selecting among multiple loop-free node-protecting alternates, as it MUST for IP/LDP Local Protection, this allows S to determine exactly which alternate was selected by $N_1$ without needing to know the each $D_{t,S}(R_{i,j})$. The set of neighbors which can offer loop-free node-protecting alternates and thus are relevant for Equation 7 are exactly the same set that are considered in Equation 8. Thus, a router obeying Equation 7 selects for its alternate the $R_{i,j}$ whose path S knows. For more details, consult ATM 1708. Because this allows S to know that the alternate found by S is exactly that which will be selected by $N_i$, S can determine whether that alternate protects against S's primary neighbor as well. If there are multiple neighbors which provide the minimum as expressed in Equation 7, then a router can select among them arbitrarily.

To rephrase the above to consider the S is the node looking for a U-Turn alternate, the above way of selecting among loop-free node-protecting alternates ensures that $N_i$'s primary neighbor S can determine which alternate was picked by N. For S to know that S's U-Turn neighbor $N_i$ can provide a loop-free node-protecting alternate, S must know if $\min_{\forall j \ni J} (D_{t,S}(N_{i,j},D) - D_{opt}(N_{i,j},S)) < D_{opt}(S,D)$.

If a router S has no loop-free node-protecting alternates, then S's alternate selection has no consequences for its neighbors because S cannot provide a U-Turn alternate. Therefore, S can select freely among the loop-free link-protecting alternates, u-turn node-protecting alternates and u-turn link protecting alternates which S has available. Clearly selecting a u-turn node-protecting alternate, if one is available, will provide node-protection, while the other options will not. Selection among these categories is a router-local decision.

If S has neither loop-free node-protecting alternates, loop-free link-protecting alternates, u-turn node-protecting alternates, nor u-turn link-protecting alternates, then S has no alternate available for traffic to the destination D from the source S.

3.3.4.2 Alternate Selection with Multiple Equal Cost Neighbors

The selection among multiple equal cost paths is a router-local decision. Therefore, a router $N_i$ cannot know which of the potential primary neighbors that S will choose to use.

As described in Section 3.2.2.2, $N_i$ can only select S for its U-Turn alternate if any potential primary neighbor which S might select, except for $N_i$ itself, will not go via $N_1$ to reach the destination D.

Since a router S has multiple potential primary neighbors, router S MUST select one or more alternates for breaking U-Turns from among next-hops to its potential primary neighbors. If router S does not have a potential primary neighbor that is node-protecting for a particular primary next-hop, that indicates that the particular primary neighbor will not use S as a U-turn alternate.

Router S need not use the same alternate(s) for breaking U-Turns on traffic received from a primary next-hop as for when the primary next-hop fails. The alternate(s) used when a primary next-hop fails are a router-local decision.

4 Using an Alternate

If an alternate is available, it is used in two circumstances. In the first circumstance, it is used to redirect traffic received from a primary next-hop neighbor. In the second circumstance, it is used to redirect traffic when the primary next-hop has failed. As mentioned in Section 3.3.4.2, for destinations with multiple potential primary neighbors, the alternates used for each purpose need not be the same.

4.1 Breaking U-Turns

If one ignores potential security redirection, IP forwarding is a purely destination based algorithm Traffic is forwarded based upon the destination IP address, regardless of the incoming interface.

As previously described in Section 3.2.2, RAPID requires that a U-Turn neighbor be capable of detecting traffic coming from the primary next-hop neighbor and redirecting it to the alternate, if an alternate which is node protecting is available. This becomes the new default behavior. This behavior is described in FIG. 2.15.

TABLE 1

Forwarding Rules for Traffic From Primary Next-Hop

| Interface | State | | |
|---|---|---|---|
| | U-Turn Capable and no loop-free node-protecting alternate | Not U-Turn capable | U-Turn Capable and Loop-Free Node-Protecting Alternate |
| Point-to-point | Forward to Primary | Forward to Primary | Forward to Alternate |
| Broadcast | Forward to Primary | Forward to Primary | Forward to Alternate |

The rules described in Table 1 apply to traffic received on an interface whose primary next-hop is the same interface. If an interface is U-Turn capable and has a node-protecting alternate, traffic received on its primary next-hop will be forwarded to its alternate next-hop. Otherwise, the current behavior will be preserved, which is forwarding traffic received to its primary next-hop.

If a broadcast interface is U-turn capable, then it is acceptable to forward traffic from all nodes on that interface via the alternate path. This will work if all nodes on that interface have a common topology because they are in the same OSPF area or ISIS level.

Consider the topology example shown in FIG. 2.16. In this case, router $N_1$ has a primary and an alternate for two destinations D and C. The primary next-hop for destination D is router S and the alternate next-hop is $R_1$. Similarly, the primary next-hop for destination C is router $R_1$ and the alternate next-hop is $R_2$. The three interfaces $L_1$, $L_2$, and $L_3$ shown on router $N_1$ have different forwarding tables as shown in FIG. 2.16; additional interfaces would have the same forwarding table as for interface $L_2$, which is not a primary next-hop for either destination.

By default, broadcast interfaces will not be administratively configured as U-Turn capable until explicitly configured. Point-to-point interfaces will be administratively configured as U-Turn capable by default. An interface is U-Turn capable if the interface is administratively configured as U-Turn capable and if the interface hardware can break U-Turns for that type of traffic.

4.1.1 Tagging U-Turn Alternate Traffic

There are four reasons why it is desirable to explicitly mark or tag traffic entering a U-turn alternate.

First, for some hardware platforms, it may be difficult to detect traffic coming from a primary neighbor and treat that traffic differently. This is because it requires per-interface forwarding state.

Second, for broadcast and NBMA interfaces, if the traffic is not explicitly tagged, it is necessary that all neighbors on the interface be part of the same IGP. This is described in Section 4.1.2. This could limit realistic deployment scenarios where hosts may exist on the same broadcast link as routers.

Third, traffic that is exiting an MPLS RSVP-TE tunnel, which uses penultimate hop popping (PHP), may be misidentified as requiring the breaking of a U-turn loop. This is described in Section 6.4. By requiring an explicit tag, this confusion can be eliminated. For example, IP traffic from the primary neighbor could arrive with the tag if it got to the primary neighbor via hop-by-hop routing; IP traffic from the primary neighbor could arrive without the tag if the traffic reached the primary neighbor as the penultimate hop in a RSVP-TE tunnel.

Fourth, if all traffic going into a U-turn alternate is marked, this alleviates concerns about incorrectly forwarding traffic to the alternate. This has the downside of not breaking upstream micro-forwarding loops that could occur due to different speeds in converging on the part of the multiple neighbors; the breaking of these loops is discussed in Section 4.3.3.

There are a number of different ways in which U-turning traffic could be marked. For instance, it could be done at layer-2 by using a different PPP type or Ethernet type. The simplest mechanism that applies regardless of layer 2 technology is to use a reserved MPLS label. By using a reserved MPLS label, there is no need to signal the assigned label. Since the label does not indicate where the packet should be forwarded but simply that it should be forwarded to the alternate if it came from a primary neighbor, the semantics are not precisely that of switching, so using a reserved label makes more sense. The suggested value for the reserved label is 13, which is not currently allocated by IANA. If a reserved label proves undesirable (because of standardization issues), then a common agreed on value could be used; i.e. the same implementation could always reserve label 17 for this. The selected MPLS label will be referred to as the U-turn label.

When a packet is received with the U-turn label, the packet will be forwarded as follows.

If the packet was received from a primary neighbor, then the packet will be forwarded to the appropriate loop-free node-protecting alternate, if available, and to a primary neighbor otherwise. If the packet was not received from a primary neighbor, then the packet will be forwarded to a primary neighbor. If the packet is received on an interface that has not indicated that it is capable of breaking U-turns, then the packet may be forwarded to a primary neighbor, to the alternate, or discarded as a router-local decision.

4.1.2 Broadcast and NBMA Interfaces

NBMA and broadcast interfaces can be treated identically for RAPID; both involve the case of possibly receiving traffic from multiple neighbors. FIG. 2.17A shows a broadcast interface which can be translated to the pseudo-node of FIG. 2.17B. With broadcast interfaces (i.e. Gigabit Ethernet), there can be multiple neighbors connected to the same interface. If all the neighbors are not in the same area, then it is not desirable to treat the traffic received identically, because traffic may be incorrectly sent to the alternate. It is extremely desirable to have at most one forwarding table per interface. Therefore, it must be considered whether all traffic received on an interface can be treated identically, regardless of the neighbor sourcing the traffic on that interface, as long as all the neighbors on the interface are in the same area.

The cost for any node on the broadcast interface to reach S or P will be identical. Because all link costs are positive, no neighbor on the broadcast interface will ever send traffic to S along that interface in order to reach P. Therefore, S can logically assume that any traffic received on the broadcast interface which goes to a destination via a primary next-hop neighbor that is also on the broadcast interface is in fact sent by that primary next-hop neighbor and should be redirected to break the U-Turn.

Thus, if router S has a primary next-hop neighbor for a given prefix on the broadcast interface, S should redirect all traffic received destined to that prefix on the broadcast interface to S's alternate next-hop. Traffic is received by the router if the packets had that router's MAC address.

An interface can be either a primary next-hop or the alternate next-hop, but not both because there would be no protection if the interface failed.

4.2 Responding to a Failure

When a failure is detected, traffic which was destined to go out that failed interface must be redirected to the appropriate alternate next-hops. The alternate next-hop is calculated to be reliable in the event of the failure scenario being protected against.

RAPID does not attempt to add anything new to the detection of the failure. The same mechanisms that work for RSVP-TE Fast-Reroute can work here. For SONET interfaces, this means detecting a failed link immediately, rather than waiting the standard 2 seconds. For Gigabit Ethernet, for directly connected interfaces, RFI can be used; other mechanisms can be investigated as appropriate and necessary.

Because the alternate next-hop is pre-computed and can be available on the forwarding plane, it should be extremely fast to switch traffic to use it. This can be the same mechanisms used for Fast-Reroute.

4.3 Avoiding Micro-Forwarding Loops

It is desirable to avoid micro-forwarding loops when going from using an alternate to using the new SPF results. Doing so means that there is only one period of traffic loss, when the failure is detected and traffic is shifted to the pre-computed alternate. There should be no traffic loss when going from the alternate to the newly calculated primary, if micro-forwarding loops are avoided.

4.3.1 For Loop-Free Alternates

There are three different scenarios for where router S will send traffic after its primary next-hop link fails. In the topologies shown, the green arrows show the initial SPT towards destination router D, the red arrow shows the alternate computed for the initial SPT, and the blue arrows shows the new SPT after the link between router S and router P has failed.

In the first scenario, router S will direct traffic to a neighbor which was loop-free with respect to S both before and after the link fails. Consider the topologies shown in FIG. 2.18. In the topology of FIG. 2.18A, router S determines that it should send traffic destined to D to $N_1$ after recomputing its shortest paths; in the topology of FIG. 2.18B, router S determines to send the traffic destined to D to $N_2$ after recomputing. In FIG. 2.18A, it doesn't matter when S updates its forwarding table from using the alternate to using the new primary because they are the same. In FIG. 2.18B, the alternate and the new primary are different, but both the path from the alternate neighbor and the path from $N_2$ (the new primary neighbor) are loop-free with respect to S. Because the path from $N_2$ was not dependent on the failed link, whether $N_2$ or other routers on its shortest path to D have recomputed based on the changed topology doesn't matter because the results of the computation are the same for the previous and the new topologies.

In the second scenario, router S will direct traffic to a neighbor which was a U-Turn neighbor. Here there are two sub-scenarios. The new primary neighbor may not have been the alternate neighbor but has a loop-free alternate that also avoids S (FIG. 2.19A). The new primary neighbor may not have been the alternate neighbor and has no alternate that also avoids S (FIG. 2.19B).

In the topology on the right, router S's primary is P and its loop-free node-protecting alternate is $N_1$. Router $N_2$ has a loop-free alternate, $N_3$, to protect against the link from $N_2$ to S failing. When router S recomputes its shortest path to D after the link from S to P has failed, S decides to send the traffic to $N_2$. If $N_2$ has not recomputed and installed new forwarding, then $N_2$ will discard the traffic because $N_2$ had no alternate which could be used to break U-Turns; the router $N_3$ provides a loop-free link-protecting alternate, not a loop-free node-protecting one. If $N_2$ has recomputed, then the traffic will be sent to $R_1$. Router $R_1$ will forward traffic received from $N_2$ destined to D directly to D before the topology change because $R_1$ is breaking the U-Turn and afterwards because that is the new shortest path.

It is possible to construct additional scenarios like the one in FIG. 2.19B where there is a dependency on a router further along the path having recomputed and installed new forwarding state. What is necessary is that, on failure of its primary next-hop, S switches to using a path which is independent of the failure and thus doesn't change as a result of the failure until the remainder of the network has converged. S's alternate is a path which is independent of the failure. Router S should keep using its alternate until the remainder of the network can be considered to have converged or until the failure scenario which is protected by RAPID has been violated. The failure scenario can be violated by S learning of a link failure elsewhere in the network that is not in a common local SRLG with the initial failed link. In our implementation, Router S assumes when the remainder of the network has converged based upon an operator-configured hold-down on new forwarding table installation. The only changes in the forwarding state that S will be waiting to install will be as a result of the local link failure and are thus exactly those which must be delayed.

The third scenario is when S's new primary is to a looping neighbor. This has sub-scenarios with the same issue as that for the scenario shown in FIG. 2.19B. The solution is the same, because the alternate is independent of the failure and thus doesn't change as a result of the failure.

4.3.2 For U-Turn Alternates

The hold-down discussed in Section 4.3.1 works because the alternate path being used does not change as a result of the failure. For a U-Turn alternate, the question is what path might the U-Turn neighbor converge to once it learns of the link failure. There are two possibilities for the new path from the U-Turn neighbor. Either the U-Turn neighbor $N_i$ will converge to a path which uses S to reach the destination D or the U-Turn neighbor will converge to a path which does not use S to reach D. The former case is shown in the topology in FIG. 2.20 where router S is using a U-Turn alternate, $N_1$.

Before the link between S and P failed, the shortest path for $N_i$ to reach D went through S and then through P. If the link between S and P fails, this does not change the shortest path from $N_i$ to S. Therefore, if after the failure, $N_i$'s new path to reach D goes through S, it must go directly across the same link to S and therefore $N_i$ will continue to consider traffic from S towards D to be in a U-Turn which requires breaking. Additionally, if $N_i$ has a loop-free node-protecting alternate before the link between S and P failed, then $N_i$ still has that loop-free node-protecting alternate, because it was not using the link from S to P since the alternate did not go through S. Thus, if $N_i$ converges to a new path towards D which includes S, $N_i$ will continue to use S as a primary neighbor and break U-Turns for the traffic received from S for D and $N_i$ will continue to have a viable loop-free node-protecting alternate.

If $N_i$ converges to a path which does not include S to reach D, then traffic received from S for D will be sent along the new path and no forwarding loop will ensue.

4.3.3 Upstream Forwarding Loops

It is the nature of IP routing and forwarding that each router makes an independent computation and installs its forwarding state based upon its knowledge of the topology. This means that after a topology change, such as a link failure, each router may be forwarding based upon the old topology or the new topology until, eventually, all routers are forwarding based on the new topology. For ease of discussion, the following terms are introduced.

Unaffected Router—If a router has the same shortest path to the destination D before the link failure and after the link failure, then it is considered an unaffected router. It is still termed an unaffected router even if its alternate next-hop changes as a result of the failure. In topologies shown in this section, an unaffected router will be depicted as .

Outdated Router—If a router will have a shortest path to the destination D after the link failure and the router has not yet installed the new shortest path into the forwarding plane, then it is considered an outdated router. In topologies shown in this section, an outdated router will be depicted as .

Updated Router—If a router will have a shortest path to the destination D after the link failure and the router has installed the new shortest path into the forwarding plane, then it is considered an updated router. In topologies shown in this section, an updated router will be depicted as .

Affected Router—A router that will have a different shortest path to the destination D after the link failure is called an affected router. Such a router will be either an outdated or an updated router.

For a particular Affected Router X and a destination D, if the path from X to D encounters an Unaffected Router or S, then the traffic from X to D will not loop. If the above is true for all Affected Routers in the network, then there are no upstream forwarding loops.

With IP routing, there can be upstream forwarding loops, depending upon the convergence times of the individual routers in the network. It is possible for RAPID to assist in some of these upstream forwarding loops by breaking a loop between two neighbors, because that will be perceived as a U-Turn and RAPID will send the traffic to a loop-free node-protecting alternate, if available.

However, because RAPID will detect and attempt to break U-turns, it is possible that multiple single hop loops will be extended to form one longer loop. Consider the topology shown in FIG. 2.21, where router A's new primary neighbor B is outdated and considers that router A is its primary neighbor. Router B will detect the U-turn when A updates its forwarding tables and, if router B has a node-protecting alternate, then B will direct the traffic to the node-protecting alternate, thereby breaking the loop. It is possible to construct a topology where multiple alternates will be used and a longer forwarding loop may therefore be created. In FIG. 2.21, router B will break a U-Turn of traffic from A and send that traffic to C. C will send this traffic to E and E will detect this as a U-Turn which must be broken and therefore send the traffic along C's alternate back to A.

Extended upstream forwarding loops, such as in the above topology, can occur when two or more forwarding loops are joined together by two or more loop-free node-protecting alternates. For instance, in the example above, there are two forwarding loops; one is between A and B and the other is between E and C. For the first forwarding loop, B has a loop-free node-protecting alternate that it uses to try and break the loop; this sends the traffic to C. For the second forwarding loop, E has a loop-free node-protecting alternate that it uses to try and break the loop; this sends the traffic to A. Because of these two alternates, the two separate forwarding loops A-B and E-C are joined to create a larger forwarding loop A-B-C-E.

To avoid forwarding loops which could impact more links, it may be useful to analyze a topology and decide which interfaces should not break U-Turns and therefore can't provide a U-Turn alternate.

With RAPID, the timeline pictured in FIG. 2.22 describes the traffic loss in the event of a failure. As soon as the failure is detected, the alternate is switched into use. After a period of time (seconds), other routers in the network start installing their updated forwarding state. This starts the period where the upstream forwarding loops discussed in this section become a concern. Once the routers have converged, all traffic is forwarded properly. The period where the upstream forwarding loops are an issue depends on the difference in times for the routers to update their forwarding tables, exactly as without RAPID. What RAPID does do is preserve the traffic until the routers start to converge and then any traffic not caught in an upstream forwarding loop is preserved until the entire network has converged to the new topology, at which point the traffic can be forwarded normally.

For a given network, a given destination and a given link failure, it is interesting to consider which routers might forward traffic into loops when the new forwarding state begins to be installed.

4.4 Requirements on LDP Mode

In order for LDP to take advantage of the alternate next-hops determined, it is necessary for LDP to have the appropriate labels available for the alternate so that the appropriate out-segments can be installed in the hardware before the failure occurs.

This means that a Label Switched Router (LSR) running LDP must distribute its labels for the FECs it can provide to those neighbors which may require the labels, regardless of whether or not they are upstream. Additionally, LDP must be acting in liberal label retention mode so that the labels which correspond to interfaces that aren't currently the primary next-hop are stored. Similarly, LDP should be in downstream unsolicited mode, so that the labels for the FEC are distributed other than along the SPT.

5 Communicating with Neighbors

For loop-free alternates, there is no additional capability required on the part of the alternate next-hop neighbor. This is not the case for a U-Turn neighbor. In order to support U-Turn alternates, a router must know some details about its neighbors to know whether or not a U-Turn neighbor can act as a U-Turn alternate.

5.1 Providing RAPID Alternate Capability

One of the things that a router must determine about a U-Turn neighbor is whether that U-Turn neighbor has a loop-free node-protecting alternate. To know this, the router must know which interfaces the neighbor is able to use for alternates. This is administratively configured via the RAPID Alternate capability.

5.2 Communicating Capabilities for Breaking U-Turns

A router S cannot use a U-Turn neighbor as an alternate if that neighbor is not capable of detecting and breaking the U-Turn. One part of the ability to break the U-Turn is having an appropriate alternate, which router S can determine. The second part is that the neighbor support RAPID, so that it can have computed the appropriate alternate, and that the neighbor's forwarding plane is capable of detecting the U-Turn and breaking it.

If a router N advertises that it can break U-turns for a particular interface, then if N's primary neighbor S for a destination D is connected via that interface, then S can consider selecting that interface as a U-Turn alternate next-hop.

5.3 Distributing Local SRLGs

The following rules can be used to protect against local SRLG failures. Other methods are possible for protecting against arbitrary SRLG failures as well as local SRLG failures.

First, a link between S and $N_i$ cannot belong to the same local SRLG as the link between S and P; if it did, then S could not consider U-Turn Neighbor $N_i$ as an alternate. Second, no other relevant link on $N_i$ can belong to the same local SRLG as the link between S and P; this is because no link to S will be used by the loop-free node-protecting alternate that $N_i$ has, if it has any. Thus, only the local SRLGs of $N_i$ need to be considered when deciding what interfaces are candidates for a loop-free node-protecting alternate.

There are already internet-drafts describing extensions to ISIS and OSPF to allow SRLGs to be signaled. The drafts are draft-ietf-isis-gmpls-extensions-19.txt and draft-ietf-ccamp-ospf-gmpls-extensions-12.txt If a router considers local SRLGs when selecting an alternate, this affects which loop-free node-protecting alternates are available. Therefore, the router capability to consider local SRLGs during alternate selection should be signaled via a router capability TLV.

When local SRLG protection is supported, an additional bit to do so will need to be obtained and used in the router capability TLV. The router capability TLV is currently defined in draft-raggarwa-isis-cap-00.txt and in draft-ietf-ospf-cap-01.txt. When local SRLG protection is supported, it will be necessary to support a mode without SRLGs as well, to provide an upgrade path.

5.4 Protocol Extensions for OSPF and ISIS

For an IGP, it is necessary to that a router know the neighbor's RAPID Alternate Capability for each of its interfaces. Additionally, a router must know whether the neighbor can break U-Turns for IP traffic on each of its interfaces which are directly connected to the router. This information can be propagated with a link-scope for flooding, as only the neighbors need to know this information.

5.4.1 OSPF and ISIS Extensions

One way to provide this information is as follows. Two bits in a Link Capabilities sub-TLV will be defined; one bit will indicate that the interface can be used by the router as an alternate, while the other bit will indicate that the router can break U-turns on traffic coming into that interface. The same type of extensions can be used for both OSPF and IS-IS.

| Eligible Alternate Link Capability | Usable As Alternate? |
|---|---|
| 0 or Not Present | NO |
| 1 | YES |

| Eligible U-Turn Recipient Link Capability | Usable As U-Turn Recipient? |
|---|---|
| 0 or Not Present | NO |
| 1 | YES |

Then the router can determine if traffic received on that link is from the router's primary neighbor for that traffic and, if so, redirect it to the router's alternate next-hop. If a router's link is usable as a U-Turn recipient, then the router's neighbor can use select for an alternate a U-Turn alternate which goes across that link to that router.

5.5 Protocol Extensions for LDP

In the future, if one supports enabling RAPID for LDP independently from enabling it for IP, it may become desirable to signal the ability to break U-Turns separately for LDP traffic. If so, then the following extension could be used.

The only message that is sent and received on a per interface basis is the Hello message. It is possible to take one of the fourteen reserved and unused bits in the Hello Message and use its being set to indicate that the interface is capable of breaking a U-Turn for MPLS traffic.

No LDP extensions will be necessary because all hardware which is capable of breaking U-Turns for IP traffic will be able to break them for MPLS traffic, and vice versa.

To support breaking U-Turns for LDP, it is necessary for a router N to provide its label mapping for the relevant FECs to N's primary neighbor S. This is clearly included in RFC 3036 in Appendix A.1.2, as described in Note 7 on p. 104.

6 Routing Aspects

The RAPID algorithm is run for each topology, as represented by a link-state database. IGP protocols keep separate link-state databases for each process and for each area or level within a particular process. RAPID does not pass information across a process. The IGP protocols need to determine the inheritance of the RAPID alternates, as determined for routes within each topology, for other protocols such as BGP and LDP and for inter-area routes. The inheritance of RAPID alternates for PIM still requires substantial investigation. Although RAPID provides alternate paths for IGP destination, these are intended for forwarding purposes only; the alternates are not redistributed in any fashion into other protocols.

Just as the use of static routes is hazardous in a network which is also using an IGP, static routes can be hazardous with RAPID. It is possible to specify an alternate next-hop with the primary next-hop for a static route. The specification of a static route must consider the alternates computed and used on failure by RAPID.

6.1 Multiple-Region Routing and Multiply Announced Prefixes

Routes in different regions inherit their primary next-hops from the border routers (area border routers (ABRs) or level boundary routers) which offer the shortest path to the destination(s) announcing the route. Similarly, routes must inherit their alternate next-hop and will do so from the same border routers.

The shortest path to an inter-region route may be learned from a single border router. In that case, both the primary and the alternate next-hops can be inherited from that border router. FIG. 2.23 illustrates this case where D is reached via $ABR_1$; the primary next-hop for $ABR_1$ is P and the loop-free node-protecting alternate is $A_1$.

The shortest path to an inter-region route may be learned from multiple border routers with at least two different primary neighbors. FIG. 2.24 illustrates this case. D is reached via $ABR_1$ and $ABR_2$ with equal cost from S. The primary neighbor to reach $ABR_1$ is $P_1$ and the alternate is $A_1$. The primary neighbor to reach $ABR_2$ is $P_2$ and the alternate is $A_2$. In this case, there are equal-cost primary next-hops to reach D and they can protect each other. In this example, the primary next-hops would be to $P_1$ and $P_2$; if the link to $P_2$ failed, then $P_1$ could be used as an alternate and vice-versa. Similarly for breaking U-turns, if traffic for D were received from $P_1$, the traffic could be directed to $P_2$ and vice versa. In this case, the alternates are obtained from the primary next-hops.

In the third case, the shortest path to an inter-region route may be learned from multiple border routers but with a single primary neighbor. This is shown in FIG. 2.25, where D can be equally reached from S via $ABR_1$ and $ABR_2$. The alternate next-hop to reach $ABR_1$ is $A_1$ while the alternate to reach $ABR_2$ is $A_2$. It is necessary to select one of the alternates to be inherited.

The same problem applies to prefixes that are announced by multiple routers in the network and for which S has ECMP paths to two or more of those routers. This example is illustrated in FIG. 2.26.

6.1.1 Inheriting Alternate Next-Hops with One Primary Neighbor

The main question when deciding whether an alternate can be inherited is whether or not that alternate will continue to provide the necessary protection. I.e., will the alternate continue to be usable as an alternate and provide the same link or node protection with respect to the destination that was provided with respect to the border router. The relationships shown in FIG. 2.25 will be used for illustrative purposes, although the topology connecting them may be more general than that shown.

The proofs and explanations are provided below, but the answer is that the alternate will be usable as an alternate and provide at least the same link or node protection that was provided with respect to the border router. The alternate next-hop inheritance procedure must select the "most loop-free" loop-free node-protecting alternate to inherit, if one is available. This is based on Equation 7, where the candidate neighbors are those offering alternates to one of the ABRs which can provide an optimal path to D.

If one is not available, then a U-turn node-protecting alternate should be chosen. If no node-protection is available, then a loop-free link-protecting alternate can be chosen and, failing that, a u-turn link-protecting alternate.

6.1.1.1 Loop-Free Alternate

In FIG. 2.27, consider where $A_2$ is a loop-free alternate with respect to S and $ABR_2$. Will $A_2$ be a loop-free alternate with respect to S and D?

Let there be three ABRs that must be considered. Each ABR can represent a group of ABRs with the same characteristics.

$ABR_1$ is from the set of ABRs where $D_{opt}(A_2, ABR_1) = D_{opt}(A_2, S) + D_{opt}(S, ABR_1)$. In other words, $A_2$ is not loop-free with regards to S and $ABR_1$. Additionally, $D_{opt}(S, D) = D_{opt}(S, ABR_1) + D_{opt}(ABR_1, D)$ $ABR_2$ is from the set of ABRs where $D_{opt}(A_2, ABR_2) < D_{opt}(A_2, S) + D_{opt}(S, ABR_2)$. In other words, $A_2$ is loop-free with regards to S and $ABR_2$. Additionally, $D_{opt}(S, D) = D_{opt}(S, ABR_2) + D_{opt}(ABR_2, D)$ $ABR_t$ is from a set of ABRs where $D_{opt}(S, D) < D_{opt}(S, ABR_t) + D_{opt}(ABR_t, D)$ First, we will prove that $D_{opt}(A_2, D) < D_{opt}(A_2, ABR_1) + D_{opt}(ABR_1, D)$.

From definition of $ABR_1$ and $ABR_1$ is on a shortest-path from S to D:

Step i: $D_{opt}(A_2, ABR_1)+D_{opt}(ABR_1, D)=D_{opt}(A_2, S)+D_{opt}(S, ABR_1)+D_{opt}(ABR_1, D)$ From definition of $ABR_2$ and that $A_2$ is loop-free with respect to S and D:

Step ii: $D_{opt}(A_2, ABR_2)+D_{opt}(ABR_2, D)<D_{opt}(A_2, S)+D_{opt}(S, ABR_2)+D_{opt}(ABR_2, D)$ From previous and given that $ABR_1$ and $ABR_2$ provide equal-cost paths from S to D:

Step iii: $D_{opt}(A_2, ABR_2)+D_{opt}(ABR_2, D)<D_{opt}(A_2, S)+D_{opt}(S, ABR_1)+D_{opt}(ABR_1, D)$ From previous and Step i:

Step iv: $D_{opt}(A_2, ABR_2)+D_{opt}(ABR_2, D)<D_{opt}(A_2, ABR_1)+D_{opt}(ABR_1, D)$ Step v: $D_{opt}(A_2, D) \leq D_{opt}(A_2, ABR_2)+D_{opt}(ABR_2, D)<D_{opt}(A_2, ABR_1)+D_{opt}(ABR_1, D)$ Thus, the optimal path from $A_2$ to D cannot go through $ABR_1$.

Next, we will prove that if $D_{opt}(A_2, D)=D_{opt}(A_2, ABR_t)+D_{opt}(ABR_t, D)$, then $A_2$ is still loop-free with respect to S and D. This is proved via contradiction.

Assume that $D_{opt}(A_2, D)$ goes through $ABR_t$.

Step i: $D_{opt}(A_2, ABR_t)+D_{opt}(ABR_t, D) \leq D_{opt}(A_2, ABR_2)+D_{opt}(ABR_2, D)$ Step ii: $D_{opt}(A_2, ABR_2)+D_{opt}(ABR_2, D)<D_{opt}(A_2, S)+D_{opt}(S, ABR_2)+D_{opt}(ABR_2, D)$ Step iii: $D_{opt}(S, ABR_2)+D_{opt}(ABR_2,D)<D_{opt}(S, ABR_t)+D_{opt}(ABR_t, D)$ From previous by adding $D_{opt}(A_2, S)$ to both sides Step iv: $D_{opt}(A_2, S)+D_{opt}(S, ABR_2)+D_{opt}(ABR_2,D)<D_{opt}(A_2, S)+D_{opt}(S, ABR_t)+D_{opt}(ABR_t, D)$ From Steps i and ii:

Step v: $D_{opt}(A_2, ABR_t)+D_{opt}(ABR_t, D)<D_{opt}(A_2, S)+D_{opt}(S, ABR_2)+D_{opt}(ABR_2, D)$ From Steps iv and v:

Step iv: $D_{opt}(A_2, ABR_t)+D_{opt}(ABR_t, D)<D_{opt}(A_2, S)+D_{opt}(S, ABR_t)+D_{opt}(ABR_t, D)$ Therefore, if $D_{opt}(A_2, D)$ is via $ABR_t$, it does not go through S.

These two proofs show that if $A_2$ is loop-free with respect to S and $ABR_2$, then $A_2$ is loop-free with respect to S and D.

6.1.1.1.1 Loop-Free Node-Protecting Alternate

It must also be shown that if $A_2$ is loop-free and node-protecting with respect to S and $ABR_2$, then $A_2$ will still be node-protecting with respect to S and D. In other words, that $A_2$ will be loop-free with respect to P and D.

This is shown where $D_{opt}(S, D)=D_{opt}(S, P)+D_{opt}(P, D)$, so that $D_{opt}(P, ABR_1)+D_{opt}(ABR_1, D)=D_{opt}(P, ABR_2)+D_{opt}(ABR_2, D)$.

First, it has already been proven that an ABR offering equal-cost from S to D which is also loop-free with respect to S and D will be selected by $A_2$ over an ABR offering equal-cost from S to D which is not loop-free with respect to S and D. Since the alternate inheritance is of interest only where all the ABRs offering equal-cost paths to D have the same primary next-hop P, if $A_2$ is loop-free and node-protecting for one ABR offering equal-cost paths to D, then $A_2$ is node-protecting for all those ABRs.

Next, given that $A_2$'s optimal path to $ABR_2$ does not go through P, is to prove that Assume that $D_{opt}(A_2, D)$ goes through $ABR_t$.

Step i: $D_{opt}(A_2, ABR_t)+D_{opt}(ABR_t, D) \leq D_{opt}(A_2, ABR_2)+D_{opt}(ABR_2, D)$ Step ii: $D_{opt}(A_2, ABR_2)+D_{opt}(ABR_2, D)<D_{opt}(A_2, P)+D_{opt}(P, ABR_2)+D_{opt}(ABR_2, D)$ Step iii: $D_{opt}(P, ABR_2)+D_{opt}(ABR_2,D)<D_{opt}(P, ABR_t)+D_{opt}(ABR_t, D)$ From previous by adding $D_{opt}(A_2, P)$ to both sides Step iv: $D_{opt}(A_2, P)+D_{opt}(P, ABR_2)+D_{opt}(ABR_2,D)<D_{opt}(A_2, P)+D_{opt}(P, ABR_t)+D_{opt}(ABR_t, D)$ From Steps i and ii:

Step v: $D_{opt}(A_2, ABR_t)+D_{opt}(ABR_t, D)<D_{opt}(A_2, P)+D_{opt}(P, ABR_2)+D_{opt}(ABR_2, D)$ From Steps iv and v:

Step iv: $D_{opt}(A_2, ABR_t)+D_{opt}(ABR_t, D)<D_{opt}(A_2, P)+D_{opt}(P, ABR_t)+D_{opt}(ABR_t, D)$ Therefore, if $D_{opt}(A_2, D)$ is via $ABR_t$, it does not go through P.

if $A_2$'s optimal path to D goes via some $ABR_t$, that that path does not go through P. This can be shown using variable replacement of the second proof given as follows:

6.1.1.2 U-Turn Alternates

Consider where $A_2$ is a U-turn alternate for $ABR_2$ in FIG. 2.28. This case matters only if $A_2$ is not a loop-free alternate for any ABR offering an optimal equal-cost path from S to D.

There are two possibilities for the path from $A_2$ to D. First, $A_2$'s optimal path to D is via one of the set of ABRs giving optimal equal-cost paths from S to D. Therefore, $A_2$ is still a U-turn neighbor of S with respect to D. Consider that $R_1$ is the neighbor of $A_2$ which provides the loop-free node-protecting alternate for $ABR_2$. In that case, either $R_1$'s optimal path to D is via one of the ABRs in the set, in which case that it is loop-free and avoids be can be shown or $R_1$ will go via a different ABR, $ABR_t$, in which case it will also remain loop-free and avoid P (same proofs as in Section 6.1.1.1 with $R_1$ replacing $A_2$).

The other possibility is that $A_2$'s optimal path to D is via a different ABR, $ABR_t$.

Step i: $D_{opt}(A_2, ABR_t)+D_{opt}(ABR_t, D) \leq D_{opt}(A_2, S)+D_{opt}(S, ABR_2)+D_{opt}(ABR_2, D)$ Step ii: $D_{opt}(S, ABR_2)+D_{opt}(ABR_2, D)<D_{opt}(S, ABR_t)+D_{opt}(ABR_t, D)$ Step iii: $D_{opt}(A_2, S)+D_{opt}(S, ABR_2)+D_{opt}(ABR_2, D)<D_{opt}(A_2, S)+D_{opt}(S, ABR_t)+D_{opt}(ABR_t, D)$ Step iv: $D_{opt}(A_2, ABR_t)+D_{opt}(ABR_t, D)<D_{opt}(A_2, S)+D_{opt}(S, ABR_t)+D_{opt}(ABR_t, D)$ Therefore, if $D_{opt}(A_2, D)$ is via $ABR_t$, it does not go through S.

The same proof can be done to show that the path would be loop-free with respect to P and D, simply by substituting P for S in the above proof.

Thus, if $A_2$ offered a U-Turn alternate for one of the ABRs offering an optimal equal-cost path from S to D, $A_2$ will, at the worst, offer a U-turn alternate for D.

If a U-Turn neighbor offered a node-protecting alternate to one of the ABRs offering an optimal equal-cost path from S to D, then the U-Turn neighbor will still offer a node-protecting alternate because it will fall into one of the following 3 categories:

1. The U-turn neighbor is still a U-turn neighbor. Its neighbor $R_i$, which provides the loop-free node-protecting alternate, has the shortest path to D via one of the ABRs, in which case, if it was protecting against P before, it still will be.
2. The U-turn neighbor is still a U-turn neighbor. Its neighbor $R_i$ has the shortest path to D via a different ABR, in which case it doesn't go through P.

The U-turn neighbor offers a loop-free alternate to reach D, in which case it must go through a different ABR and therefore doesn't go through P.

6.1.2 OSPF Inter-Area Routes

In OSPF, each area's links are summarized into a summary LSA, which is announced into an area by an Area Border Router. ABRs announce summary LSAs into the backbone area and inject summary LSAs of the backbone area into other non-backbone areas. A route can be learned via summary LSA from one or more ABRs; such a route will be referred to as a summary route.

The alternate next-hop inheritance for summary routes is as described in Section 6.1.1

6.1.3 OSPF External Routing

Rules of inheritance of alternate next-hops for external routes is the same as for inter-area destinations. The additional complication comes from forwarding addresses, where an ASBR uses a forwarding address to indicate to all routers in the Autonomous System to use the specified address instead of going through the ASBR. When a forwarding address has been indicated, all routers in the topology calculate the shortest path to the link specified in the external LSA. In this case, the alternate next-hop of the forwarding link should be used, in conjunction with the primary next-hop of the forwarding link, instead of those associated with the ASBR.

6.1.4 ISIS Multi-Level Routing

ISIS maintains separate databases for each level with which it is dealing. Nodes in one level do not have any information about state of nodes and edges of the other level. ISIS level boundary points, also known as ISIS level boundary routers, are attached to both levels. ISIS level boundary routers summarize the destinations in each, level. ISIS inter-level route computation is very similar to OSPF inter area routing. Rules for alternate next-hop inheritance is the same as described in Section 6.1.1

6.2 OSPF Virtual Links

OSPF virtual links are used to connect two disjoint backbone areas using a transit area. A virtual link is configured at the border routers of the disjoint area. There are two scenarios, depending upon the position of the root, router S.

If router S is itself an ABR or one of the endpoints of the disjoint area, then router S must resolve its paths to the destination on the other side of the disjoint area by using the summary links in the transit area and using the closest ABR summarizing them into the transit area. This means that the data path may diverge from the virtual neighbor's control path. An ABR's primary and alternate next-hops are calculated by RAPID on the transit area.

The primary next-hops to use are determined based upon the closest set of equidistant ABRs; the same rules described in Section 6.1.1 for inter-area destinations must be followed for OSPF virtual links to determine the alternate next-hop. The same ECMP cases apply.

If router S is not an ABR, then all the destinations on the other side of the disjoint area will inherit the virtual link's endpoint, the transit ABR. The same OSPF inter-area rules described in Section 6.1.1 must be followed here as well.

Supporting non-local SRLGs is possible because if router S is an ABR which has the link state of both the transit area and the disjoint area, then S can avoid using an alternate path which shares an SRLG with the first hop of the primary path.

A virtual link cannot be used as an alternate. The capabilities advertised for a virtual link should not specify the ability to break U-turns or to use the virtual link as an alternate. Neither is possible.

6.3 BGP Next-Hop Synchronization

Typically BGP prefixes are advertised with AS exit routers router-id, and AS exit routers are reached by means of IGP routes. BGP resolves its advertised next-hop to the immediate next-hop by potential recursive lookups in the routing database. RAPID computes the alternate next-hops to the all the IGP destinations, which includes alternate next-hops to the AS exit router's router-id. BGP simply inherits the alternate next-hop from IGP; this is not as simple if there are multiple ASBRs which offer equal-cost paths because then it can't be determined if the U-turn alternate offers node-protection. The BGP decision process is unaltered; BGP continue to use the IGP optimal distance to find the nearest exit router. MBGP routes do not need to copy the alternate next hops.

6.4 RAPID with IGP Tunnels

RAPID treats IGP tunnels the same as any other link. Consider FIG. 2.29 if router S is not an endpoint of the tunnel, then the alternate path is computed as normal; due to a lack of knowledge about the SRLGs used by the tunnel, SRLG protection is not possible. If router S is one of the end-points, then all destinations which have the tunnel as a primary next-hop must be protected via a protection scheme associated with the tunnel. Such a protection scheme might be RSVP-TE Fast-Reroute or hot standby tunnels. Because the physical interface used by the tunnel is not known to RAPID, RAPID cannot compute an alternate which is link or node protecting.

One issue with MPLS RSVP-TE tunnels is that an LSP may be created where the router uses penultimate-hop popping (PHP). Traffic received via that tunnel is undistinguishable from traffic received over the interface. If some of the traffic received via the LSP is destined back to the penultimate hop, then the egress router would consider that the traffic required U-Turn breaking and would redirect that traffic to its alternate, if available. To avoid such a scenario, a router can simply not request PHP for those LSPs which are entering via an interface upon which the router has advertised that it can break U-Turns. If a router must do PHP, then it can stop advertising the ability to break U-Turns upon the interface.

For IP traffic, it is not possible to resolve the PHP issue. For LDP traffic, it would be possible to advertise a different label for a FEC on targeted sessions from the label advertised for non-targeted sessions. In this case, only traffic received with the label for non-targeted sessions would be subject to U-Turn breaking.

7 Outstanding Issues

7.1 Resolved Issues

The following issues have been resolved as follows.
1. Due to the probable increased topology coverage and common appearance of ECMP, it is desirable to have a U-Turn neighbor include those with an ECMP set. A U-Turn neighbor with an ECMP set can break a U-Turn by sending the traffic to another member of the ECMP set, if reliable, or to an alternate, if not reliable. The incoming packet's neighbor must be checked simply against the selected member in the ECMP set.
2. Looking for a node-protecting U-Turn alternate is resolved by specifying how a router selects among multiple loop-free node-protecting alternates to be based on information easily available to the primary neighbor(s).
3. If upstream forwarding loops are a concern, analysis of topologies and selective configuration of which interfaces can break U-Turns may help.
4. It is not necessary to signal the ability to break U-Turns for MPLS traffic separately from IP traffic. If it were, then precisely which of the reserved bits in the Hello Message for LDP should be used to indicate the ability to break U-Turns would need to be determined.
5. It will be desirable to signal the ability to consider local SRLGs when selecting an alternate. The ability to consider local SRLGs may be added to RAPID later, but it is not certain for the first implementation.
6. OSPF and ISIS extensions are defined.
7. Need to consider BGP alternate inheritance and U-Turn node-protection. Proofs for alternate inheritance have been added.

S selects an alternate next-hop which eventually leads to a node A, that is on the shortest path that does not go through S to reach the destination or the destination itself. The set of such possible nodes can be described as follows.

B*A where B* is 0 or more nodes with the following relationship $B_0$'s primary neighbor to reach D is S $B_i$'s primary neighbor to reach D is $B_{i-1}$ and $B_{i-1}$'s alternate neighbor is $B_i$ And the last B, $B_n$ has an alternate neighbor of A In the example above, $B_0$'s primary neighbor is S and $B_0$'s alternate neighbor is $B_1$. $B_1$'s primary neighbor is $B_0$ and $B_1$'s alternate neighbor is A. A is loop-free with respect to S to reach D.

To cascade U-Turn alternates, there must eventually be a node X which is selected as a node-protecting loop-free alternate by the last node in the chain of U-Turn alternates. There are two problems which must be solved to for S to be able to use a chain of U-Turn alternates. First, S must know that the last node in the chain of U-Turn alternates has an alternate which does not go through S.

As pictured in FIG. 2.30, let B be the last node in the chain of U-Turn alternates. Let X be the loop-free neighbor that B can select as an alternate. For S to be able to use the chain of U-Turn alternates, S must know whether the following equation is true.

$$Distance_S(X,D) < Distance_{opt}(X,S) + Distance_{opt}(X,D)$$

Equation 9

Loop-Free End of Cascading U-Turns

S must be able to determine that there is a chain of U-turn neighbors. This can be verified by checking the following between one node A which is known to be in a U-turn chain and node B, which is a neighbor of A.

$$Distance_{opt}(B,S) = \min_{V_k \in K} Link_k(B \to A) \cdot cost + Distance_{opt}(A,S)$$

Equation 10

Neighbor of Node in U-Turn Chain Continues U-Turn Chain

If Equation 10 is true, then B continues the U-Turn chain.

If not, then S must determine whether a neighbor of A can serve as a node-protecting alternate.

RAPID Algorithm Design

1 Introduction

The traditional Dijkstra algorithm computes the minimum cost path between a source node and all other nodes in a directed graph with positive costs on each uni-directional link. The algorithm is efficient and applicable to a wide range of application spaces ranging from networking/transportation to speech recognition to imaging.

The basic Dijkstra algorithm, however, is limited. It only finds a single path between a single source to all the destinations and the paths it generates are simple minimums of the sums of the weights on each link of the path. If other paths are desired, such as paths between the original source's neighbors and every destination, or if finding the optimal value of functions other than a simple summation of the link costs are desired, the basic Dijkstra algorithm must be run multiple times and/or the graph must be modified.

This document describes a modified Dijkstra algorithm that can generate multiple paths using different criteria in a single run that is generally more efficient than multiple single runs. The modified Dijkstra also has the ability to compute more complex functions on a graph by initializing the starting conditions with potentially different values for each node.

This patent describes the algorithm in the context of RAPID, a method to find alternate paths to protect against link and node failures. The algorithm can be applied to other applications as well 1.1 Introduction to RAPID In traditional link-state protocols, such as OSPF, each router independently computes its routing next-hops for all possible destinations. From a given router S, there is one or more primary next-hops per destination. There may be multiple primary next-hops if there are multiple optimal paths, described as Equal Cost Multi-Path or ECMP. Since all nodes run an SPF algorithm using the same link-state information, the chosen next-hops create consistent loop-free paths. (Since link-state advertisements take time to pass from node to node, there are times when the link-state information is inconsistent across nodes. Such inconsistencies, however, are transient)

In addition to the primary next-hops per destination, as discussed above, RAPID automatically computes alternate next-hops per destination from the link-state information. The alternate path is chosen such that traffic sent on it will not loop in the event of the failure for which the alternate provides protection; once other nodes learn of the topology change, their independent actions may cause loops. In the case of a failure along the primary next-hop, the node redirects traffic to a failure-protecting alternate. In the case of receiving traffic from the primary next-hop, the node redirects the traffic to a U-turn breaking alternate. Conceptually, RAPID generates a list of potential alternates that avoid the primary next-hop link/node and selects a subset (generally one) of the alternates. For each destination, as long as there is at least one possible alternate link (there are topologies in which some source/destination pairs have no possible alternate links) at least one of those alternate links is chosen and stored within the node.

One simple way to generate RAPID alternates would be for each router S to run an SPF algorithm for each of the prospective alternate nodes and check what sort of alternate they would be by looking at the paths selected by the routing algorithm starting from the alternate nodes. For example, if S computed the routing algorithm for a neighbor, $N_i$, and determined that its primary path to a destination D did not travel through S or any of S's other neighbors, then $N_i$ would be a loop-free alternate that would protect against S itself as well as links to and from S failing. Clearly running an SPF computation for every neighboring node would be expensive.

This document describes an algorithm to implement the identification and selection of alternates for RAPID. The algorithm is based upon the Dijkstra SPF algorithm. The goals of the algorithm are to be complete, to find an alternate if the topology can provide one, and to be accurate with as low a time complexity as feasible. The algorithm as described does not make use of incremental SPF algorithms to further reduce the time complexity at the cost of additional space. This is a straightforward modification.

The RAPID algorithm first collects the information required for the alternate selection, as described in Section 1. That information is then used to determine the appropriate alternate next-hops for each node in the network, as is described in Section 8.

For the description of the algorithm, the topology example of FIG. 3.1 will be used. The router running the algorithm is S. For convenience, the links from S have been labeled L1, L2, L3 and L4. The destination nodes F, G and H help illustrate particular aspects of the algorithm. In this topology, the neighbors of S are A, B and C. In the example, a maximum of two equal-cost paths will be stored. This is to illustrate the concerns which motivate some of the extensions and not because the algorithm limits the number of equal-cost paths which could be stored and used.

In the discussion, a link may be referred to as a next-hop. This is to simplify the discussion. In the case of a broadcast or non-broadcast multi-access (NBMA) link, there may be multiple neighbors on a link. In that case, a next-hop must refer both to the selected interface to the link and the neighbor selected for the next-hop. Since in our example topology, there are multiple links to A and there are not any broadcast interfaces, it is simpler to name the links and refer to them as if they were sufficient to completely indicate the next-hop. Where broadcast interfaces are discussed, the next-hop will be clearly identified as both the outgoing link and the next-hop node. In practice, the next-hop could be stored as the link from the pseudo-node to the next-hop node; then the pseudo-node indicates the local interface used.

As is conventional in SPF algorithms, a broadcast link or non-broadcast multi-access (NBMA) link will be represented with the aid of a pseudo-node that has 0 cost for the links from the pseudo-node.

In this document, the destination node will be referred to as D, while the router that is running the computation will be referred to as the root or S. P will refer to the primary neighbor used by a particular next-hop to reach a given destination D from S. When the unqualified term of neighbors is used, this refers to the neighbors of S. Those neighbors are all nodes connected to S via a link; in the case of a broadcast link, these will include all the nodes connected to a pseudo-node that is itself connected to S. The optimal path will always refer to the shortest-cost path.

2 Information Required for Alternate Selection

There is a variety of information that must be gathered in order to select an alternate. This information must be gathered with respect to every possible destination node in the topology.

The information required is:
1. Primary next-hops and distance of the shortest path for each destination node,
2. Neighbors of S visited on the equal-cost primary paths for each destination node,
3. Whether there are two or more neighbors which are the next node from S on shortest-cost paths to the destination,
4. The distance of the shortest-cost path from each neighbor and each neighbor's neighbor back to S,
5. Whether any shortest cost path from a neighbor back to S goes through another neighbor of S,
6. The distance from any candidate neighbor to each destination node,
7. Whether a potential U-turn neighbor has a loop-free node-protecting path,
8. What neighbors are visited along the potential U-turn neighbor's selected loop-free node-protecting path, and
9. Which links can be used as alternates and which are capable of redirecting traffic identified as in a U-turn. This is signaled or configured information that is associated with the topology. If it is not configured or explicitly signaled, then the default for a node is that a neighbor's links can't be used to break U-turns or for alternates and that the node's own links can be used as alternates.

Once this set of information has been obtained, it is possible to select the appropriate alternate(s) for each purpose for each node.

Where $Distance_{LS}(A,B)$ is specified, this can be obtained by removing S and its links from the topology and running a regular Dijsktra with A as root. Alternately, a Dijkstra modified to find a path through A and run with S as the root will find the shortest path from A to B that does not go through S; this is what is meant by $Distance_{LS}(A, B)$.

2.1 Primary Next-Hops

The primary next-hops and the shortest distance to reach a destination D must be known. These are links that lead to the shortest-cost path(s) to the destination. It is possible in the case of a broadcast link to have an alternate that uses the same link as the primary. In this case, clearly only node failure is protected against and not link failure. Except for the above case, it is necessary that the alternate selected is not one of the primary next-hops.

The primary next-hops determine the links and nodes whose failures are to be protected against.

In our example topology in FIG. 3.1, S's primary next-hops to reach F and G are via L1 and L2. To reach H, S has three equal-cost paths; these are via L1, L2 and L4. Because as an assumption of our example for illustrative purposes S will store at most two primary next-hops, and because of an arbitrary tie-breaking mechanism in favor of lower-numbered links, S stores L1 and L2 (the two links to A) as its primary next-hops to reach H.

2.2 Neighbors Visited on Shortest-Cost Paths

If there are multiple equal-cost paths to reach the destination D, it may be desirable to have an alternate that provides node protection. It is possible that one primary next-hop provides node protection for another, but this is dependent upon the topology. Consider the example in FIG. 3.2, where S can reach D via $N_1$, $N_2$ or $N_3$ for the same path cost of 20. In this example, traffic sent to $N_3$ will avoid $N_2$ and $N_1$. Traffic sent to $N_2$ will avoid $N_3$ but not $N_1$. Traffic sent to $N_1$ will avoid $N_3$ and $N_2$. S must be able to determine this type of topological information. More specifically, S must be able to determine which shortest-cost paths go through multiple neighbors of S to reach a final destination that is a neighbor of S.

There are at least two methods by which S can determine this. First, S can store the neighbors visited along the shortest-cost path(s) to each neighbor. This devolves to determining the neighbors visited along the shortest-cost path(s) to any node, because any node may be the penultimate node before a neighbor is visited. As an optimization, one could terminate inheriting the neighbors-visited information after the shortest-cost paths to all neighbors have been determined.

An alternative to storing the neighbors visited would be to find all shortest-cost paths via each neighbor to each other neighbor and see if one matches a shortest-cost path to the other neighbor. This would require finding a path from every neighbor to every other neighbor, which may not scale well as the number of neighbors increases.

In our example topology in FIG. 3.1, no neighbors are visited on the path from S to A or from S to C; the direct link is the shortest-cost path. In the path from S to B, the neighbor C may be visited. This is because S has two paths to B of distance 25; the first is via L3 directly to B and the second goes via C and E by means of L4.

2.3 Multiple Potential Primary Neighbors

If a node S has multiple potential primary neighbors, all of which offer a shortest-cost path, to reach a destination D, then a potential primary neighbor will only use S as a U-turn alternate if all other potential primary neighbors are loop-free and node-protecting with respect to that potential primary neighbor. This is because a particular potential primary neighbor has no way to determine which of the potential primary neighbors S has selected as S's primary neighbors. This is more conservative than is required if assumptions could be made about how S would select its primary next-hops. If this information were available, other possibilities would exist.

Consider the topology shown in FIG. 3.2. $N_1$ does not know whether S will select $N_1$, $N_2$, or $N_3$ as S's primary neighbors. Because $N_1$ does not know, $N_1$ must assume that S will select all potential primary neighbors except $N_1$ itself. Therefore $N_1$ must be node-protected by all other potential primary neighbors of S in order for $N_1$ to select S to break U-turns for $N_1$. Therefore it is important to know if S has multiple potential primary neighbors. If so, S can only break U-turns via interfaces connected to other potential primary neighbors. S can select a different alternate for protecting a primary next-hop from failure than that used for breaking U-turns.

It is necessary to store only two potential primary neighbors to ensure that S can break a U-turn for a primary neighbor as this will only be requested if all potential primary neighbors are loop-free and node-protecting with respect to that primary neighbor. If S receives traffic from a primary neighbor, then S can use the other potential primary neighbor to break the U-turn if that other potential primary neighbor offers a loop-free node-protecting alternate with respect to the primary neighbor; if all other potential primary neighbors could not provide a loop-free node-protecting alternate, then the primary neighbor would not send U-turn traffic to S because the primary neighbor could not determine which potential primary neighbor S had selected and would therefore break U-turns for. If S receives traffic from a potential primary neighbor that was not selected as a primary neighbor, then S can safely send it to any primary neighbor.

A router may be limited in the number of paths that will be stored to reach a destination. In our example, we are using a limit of 2 paths for illustrative purposes. Consider the topology in FIG. 3.1 and the paths stored to reach H. There are three next-hops which lead to equal-cost paths to H; these are L1, L2 and L4. However, only L1 and L2 will be stored as the primary next-hops. If no additional information were stored, S would not know that there are two potential primary neighbors to reach H. Those potential primary neighbors are C and A. By storing this information, S knows to send traffic destined to H that is received from A towards C.

2.4 Reverse Distance or $Distance_{opt}(X, S)$

To obtain a tight loop-free bound for a node X with respect to S and D, one must consider whether equation 1, with reference to FIG. 3.3, is true. The determination of whether a node is loop-free occurs for all neighbors of S that could be loop-free alternates and for all neighbors of U-turn neighbors (The criteria for a neighbor to be a U-turn neighbor are given in Section 1.5.)

$$Distance_{iS}(X,D) < Distance_{opt}(S,D) + Distance_{opt}(X,S)$$

Equation 1

Loop-Free Bound for a Node X

For these nodes, it is necessary to determine the distance of the path from the node X back to S. Just as a regular SPF finds the shortest distance from S to all nodes in the topology, by considering the cost of a link in the opposite direction (reverse-cost instead of cost), a reverse SPF can find the shortest distance from all nodes in the topology back to S.

The distance of the shortest-cost path from X to S may only be different from the distance of the shortest-cost path from S to X if there are links with different forward and reverse costs. In our example in FIG. 3.1, the cost of the link from C to S is 10, while the cost from S to C is 5. Similarly, the cost of the link from B to E is 5, while from E to B it is 10.

2.5 Penultimate Node on Reverse Path

S must determine whether it can consider a neighbor $N_i$ as a U-turn neighbor. If all of the shortest-cost paths from $N_i$ to S are across links connecting directly to both $N_i$ and S, then S can consider $N_i$ as a candidate U-turn neighbor. If $N_i$ is a candidate U-turn neighbor and is not loop-free with respect to the destination D and $N_i$ is capable of breaking U-turns on at least one of the directly connecting links between $N_i$ and S, then $N_i$ is a U-turn neighbor of S in regards to that destination D. More to the point, if $N_i$ has one or more shortest-cost paths to S that go via a node other than $N_i$ and S, then S cannot use $N_i$ as a U-turn alternate and therefore S need not find any potential U-turn alternates via $N_i$. If U-turn breaking were to be installed on links to non-primary neighbors that were along the shortest-cost path, then the set of neighbors that could be used would be expanded.

To determine whether another node is used on an optimal path from the neighbor to S, the following procedure can be followed.

When a reverse SPF is run, whenever a reverse path is inherited across a link because the reverse path's distance plus the link's reverse cost is less than the far node's current reverse path, the node from which the path was inherited should be stored as the penultimate node. If the reverse path plus the link's reverse cost is equal to the far node's current reverse path and if the node whose path could be inherited is not the root S, then that node should be stored as the penultimate node. If that node is a pseudo-node, instead of storing the pseudo-node, the penultimate node stored in the pseudo-node should be stored unless that is S. In this way, the traversal of pseudo-nodes will be ignored for these purposes. With this method, if after the reverse SPF, a neighbor's stored penultimate node is not S, this indicates that there is an optimal path from the neighbor to S via another node and therefore that the neighbor cannot be used as a U-turn neighbor.

In our example topology, at node B the stored penultimate node would be E. This is because B has two equal cost paths to reach S; the first is via a direct link for a cost of 25, and the second is B→E→C→S for a cost of 25. Thus, S cannot use B as a U-turn neighbor to obtain U-turn alternates.

2.6 Potential Loop-Free Alternate Distance ($Distance_{iS}(N_i, D)$)

For each neighbor $N_i$ that has at least one link to it that could be used as an alternate, it is necessary to determine if $N_i$ is loop-free with respect to S and D. To determine if $N_i$ offers a loop-free node-protecting alternate, it must be seen if $N_i$ is loop-free with respect to P and D. Finally, if S has multiple loop-free node-protecting alternates via different neighbors, S should determine which is the "most loop-free". The selection criterion that requires this information is described in Sections 1.7 and 1.8.

A is more loop-free than B if $Distance_{iS}(A, D) - Distance_{opt}(A, S) < Distance_{iS}(B, D) - Distance_{opt}(B, S)$.

These three requirements lead to the need to know the shortest path that does not go through S from $N_i$ to every destination D. With reference to FIG. 3.4, the following equations express these requirements.

$$Distance_{iS}(N_i,D) < Distance_{opt}(S,D) + Distance_{opt}(N_i,S)$$

$$\text{Distance}_{1S}(N_i,D) < \min(\text{Distance}_{1S}(N_i,P), \text{Distance}_{opt}(N_i,S) + \text{Distance}_{opt}(S,P)) + \text{Distance}_{opt}(P,D)$$

$$\min_{\forall k \text{ which provide satisfy first two equations}} (\text{Distance}_{1S}(N_k, D) - \text{Distance}_{opt}(N_k, S))$$

Equation 2

Uses of $\text{Distance}_{1S}(N_i, D)$

The first equation determines whether $N_i$ is loop-free with respect to S and D. To understand this, recall both that a shortest path is comprised of shortest paths and that other nodes, such as the neighbor $N_i$, will take the shortest path to the destination.

The longest the path from $N_i$ to D can be is $D_{opt}(N_i, S) + D_{opt}(S, D)$. If $D_{1S}(N_i, D)$ is less than that, then it is clearly a shorter distance and thus the optimal one indicating the path that $N_i$ will follow.

The second equation is to determine if $N_i$ is loop-free with respect to P; this is necessary to determine if $N_i$ offers a node-protecting alternate. The complication in the equation is that $D_{opt}(N_i, P)$ is not immediately known, but is instead determined to be the minimum of the shortest path from $N_i$ to P that doesn't go through S (i.e. $\text{Distance}_{1S}(N_i, P)$) and the shortest path from $N_i$ to P that does go through S (i.e. $\text{Distance}_{opt}(N_i, S) + \text{Distance}_{opt}(S,P)$). Once that is understood, it can be seen that the second equation is essentially the first with S replaced by P; this is because the check is to determine if $N_i$'s path goes through P instead of through S.

The third equation is used to select among multiple loop-free node-protecting alternates and the rationale is better presented in Section 1.8.

2.7 Potential U-Turn Alternate Check

For one approach, if a neighbor $N_i$ can be used to provide a U-turn alternate, then S must determine whether that neighbor $N_i$ has a U-turn alternate available.

In this approach, for a neighbor $N_i$ to be able to be used to provide a U-turn alternate, the following three conditions must be met.

1. $N_i$ must not have any nodes other than itself and S on the optimal path(s) from $N_i$ to S. This can be checked by determining if the penultimate node associated with $N_i$ is S. This reflects the requirement that all shortest-cost paths from $N_i$ to S must be across a direct link between the two.
2. $N_i$ must have advertised the ability to break U-turns on at least one link connecting $N_i$ to S. This is based on information obtained outside the algorithm and supplied as part of the topology; an example source is the Interior Gateway Protocol, such as OSPF or IS-IS.
3. $N_i$ must not be loop-free with respect to S and D. This is checked by determining if the following equation is true: $\text{Distance}_{1S}(N_i, D) < \text{Distance}_{opt}(S, D) + \text{Distance}_{opt}(N_i, S)$. If a neighbor $N_i$ meets these three conditions, then S can determine if there is a U-turn alternate available through $N_i$ by seeing if any neighbors of $N_i$, referred to as $R_{i,j}$, can provide loop-free node-protecting alternates. This could be done with the following logic:

```
hasAlternate ← FALSE
Foreach R_{i,j}
    if (Distance_{1S}(R_{i,j}, D) < Distance_{opt}(R_{i,j},S) + Distance_{opt}(S,D) )
        hasAlternate ← TRUE
```

If hasAlternate is TRUE at the end and $N_i$ has met the conditions necessary to be a U-turn neighbor, then $N_i$ can provide a U-turn alternate. An algorithm which determined $\text{Distance}_{opt}(R_{i,j}, D)$ could use that in place of $\text{Distance}_{1S}(R_{i,j}, D)$ in the above logic.

While the above logic will work, it requires that each $\text{Distance}_{1S}(R_{i,j},D)$ be known. This is unnecessarily computationally expensive. The above allows router S to know exactly which $R_{i,j}$ can provide the loop-free node-protecting alternates to $N_i$, but it is only necessary for S to know that $N_i$ has such an alternate and the path of the alternate which $N_i$ will select. The path is necessary to determine if that alternate avoids S's primary neighbor and is therefore node-protecting.

If one recalls that the Dijkstra algorithm performs a minimization, it is useful to arrange the desired minimization with all of the $R_{i,j}$ associated terms on the left as is done in Equation 3.

$$\min_{\forall j \text{ which exist}}(\text{Distance}_{1S}(R_{i,j},D) - \text{Distance}_{opt}(R_{i,j},S))) < \text{Distance}_{opt}(S,D)$$

Equation 3

Loop-Free Node-Protecting Neighbor's Neighbor Check

Assume that a single path will be stored at each node to indicate the left-side minimization for each particular neighbor $N_i$ that could potentially provide a U-turn alternate. This path is initialized at each $R_{i,j}$ with a special value so that the minimization gives the left-side of the above equation. Ideally, this special value would be $-\text{Distance}_{opt}(R_{i,j}, S)$. Unfortunately, the basic mechanisms of the algorithm, which are based on Dijkstra, do not handle negative link costs well; it is better to not start with a negative path distance. Thus, a constant $K_i$ must be added which is sufficiently large that the distance of the path as initialized at each $R_{i,j}$ is greater than 0. $K_i$ can be any such constant. For instance, $K_i$ could be equal to one plus the cost of the greatest cost link from any $R_{i,j}$ to $N_i$ plus the cost of a link from $N_i$ to S; this value would be greater than any $\text{Distance}_{opt}(R_{i,j}, S)$. Alternately, $K_i$ could be equal to $1 + (\max_{\forall k \text{ which exist}}(\text{Distance}_{opt}(R_{i,k}, S)))$.

For each neighbor which could provide a U-turn alternate, store a single path and populate it at each $R_{i,j}$ with a distance equal to the following:

$$K_i - \text{Distance}_{opt}(R_{i,j}, S)$$

Equation 4

Initialization Value at $R_{i,j}$ for Potential U-Turn Path for $N_i$

Once the algorithm is run and the minimized path has been found for each node, the value stored for a neighbor $N_i$'s potential U-turn alternate path will be the left-side of Equation 3 plus a constant $K_i$. The value stored can be compared against $\text{Distance}_{opt}(S, D) - K_i$ to determine if $N_i$ has a U-turn alternate.

To reduce computational complexity, the algorithm does not require computing each $\text{Distance}_{1S}(R_{i,j}, D)$. This is accomplished by minimizing a single path, which is associated with $N_i$, which can start at any neighbors of $N_i$. If that path distance which is initialized at each of the neighbors of $N_i$ were the same, then the algorithm could not determine whether $N_i$ had a loop-free node-protecting alternate, but rather only whether the particular neighbor of $N_i$ which is closest to D is also loop-free with respect to S and D. The distinction is illustrated by considering the topology shown in FIG. 3.5.

If the potential U-turn path distance associated with $N_1$ is initialized at $R_1$ and $R_2$ with 0, then the resulting value stored for the path at D will be:

$$Distance_{iS}(R_1,D)=Min(Distance_{iS}(R_1,D), Distance_{iS}(R_2,D))=25$$

If the particular neighbor's neighbor, from which the path started, is stored, then this distance can be used to see if that particular neighbor's neighbor is loop-free with respect to S and D. As can be seen from the topology, the shortest path for $R_1$ to reach D is via $N_1$, S and P; $R_1$ cannot provide a loop-free node-protecting alternate to $N_1$.

If instead the potential U-turn path distance associated with $N_1$ is initialized at $R_1$ and $R_2$ as specified in Equation 4 (where $K_1$ has a value of 26), then the resulting value stored for the path at D will be:

$$K_1+Distance_{iS}(R_2,D)-Distance_{opt}(R_2,D)=26+30-25=31$$

$$\min(K_1+Distance_{iS}(R_1,D)-Distance_{opt}(R_1,D),$$

$$K_1+Distance_{iS}(R_2,D)-Distance_{opt}(R_2,D))$$

This resulting value can be compared against $K_1$ plus the distance of the shortest path from S to D, to see that $R_2$ can provide a loop-free node-protecting alternate to $N_1$. This is seen in the equation below $$31 < K_1+Distance_{opt}(S,D)=26+10=36$$

As is illustrated by this example, it is possible to avoid computing the distance of each path from each neighbor's neighbor by proper selection of the function that will be minimized by the combining of those paths.

The basic idea of starting a path at a location other than S, the root of the shortest path tree, and starting that path with an initial distance other than 0 can be used in different scenarios to obtain the desired minimization. For instance, it can be used for cascaded U-turns, where the set of nodes may be different than a single set of $R_{i,j}$.

2.8 Neighbors Visited For Potential U-turn Alternates

The preference in alternate selection is to prefer a node-protecting alternate above a link-protecting alternate. This is a policy and not necessary to the algorithm. To satisfy such policies, it is necessary to be able to determine whether or not a U-turn alternate is node-protecting with respect to P.

As discussed above in Section 1.7, a router S may not know all the $R_{i,j}$ which can provide a loop-free node-protecting alternate for $N_i$. S only knows the path for those particular $R_{i,k}$ where $$Distance_{iS}(R_{i,k},D)-Distance_{opt}(R_{i,k},S)= (\min_{\forall j \text{ which exist}}(Distance_{iS}(R_{i,j},D)-Distance_{opt}(R_{i,j},S)))$$

If there are multiple $R_{i,k}$ which satisfy the above, then S must know the union of the neighbors which those paths go through. This allows S to be certain that a particular $N_i$ can provide a node-protecting U-turn alternate. S can only store the neighbors visited along what is perceived to be the shortest path during the algorithm; this translates to the "most likely to be loop-free" path which is the one corresponding to the $R_{i,k}$ which satisfies the equation above.

Conceptually, $N_i$ is to select among the $R_{i,j}$ for the $R_{i,k}$ for which it is the most expensive to reach the destination via S. If the $R_{i,k}$ for which it is most expensive to use S to get to the destination, still uses S to reach the destination, then there is no possibility that $N_i$ has loop-free neighbor which provides node-protection.

Because the distance stored at different nodes may be based on different $R_{i,j}$, it is not possible to determine whether a path went through a neighbor based on distance comparisons using the path information. Instead, S must determine this a different way. One such method is to store the neighbors visited along the path; those neighbors must include pseudo-nodes so that link-protection can be determined.

Because that is the only path which S knows and can determine the neighbors visited along, it is required that a neighbor $N_i$ select the loop-free node-protecting alternate which is such an $R_{i,k}$. The details of this selection process are described later.

In the example topology of FIG. 3.1, consider finding a U-turn alternate to G via C. If C has indicated its capability to support U-turn alternates, then C qualifies as a U-turn neighbor because its shortest path to S is across a direct link and $D_{opt}(C,G)=25=D_{opt}(C,S)+D_{opt}(S,G)$. In this example, we have the following:

$$D_{iS}(I,G)-D_{opt}(I,S)=15-20=-5$$

$$D_{iS}(E,G)-D_{opt}(E,S)=20-20=0$$

Both are loop-free with respect to S and G because the above are both less than $D_{opt}(S, G)=15$. C would select I as its loop-free node-protecting alternate because it is most likely to be loop-free (i.e. less than $D_{opt}(S, G)$).

3 Considering Capabilities

There are at least three reasons why a link may not be able to be used as an alternate next-hop to reach an alternate node. There may be additional reasons that not enumerated here, e.g. considering SRLGs.

First, the link may be configured to not be used as an alternate; if so, it must not be considered. When determining if a potential U-turn neighbor has a loop-free node-protecting alternate, S cannot consider any links from the potential U-turn neighbor that are not configured to be usable as an alternate.

Second, the link's back-link may indicate that the link should not be used. This could be because the link's back-link has a maximum cost or because the node at the far end of the link has indicated that it is overloaded and should not be used to transit traffic. This should be treated as if the link is configured to not be usable as an alternate.

Third, the node at the far end of the link may have indicated that U-turns cannot be broken for traffic received on that link, by setting or not setting such a capability on the link's back-link, for example. In this case, S may not use the link as an alternate next-hop to reach an alternate provided via a U-turn neighbor.

4 Algorithm Structure

The RAPID algorithm consists of four phases as follows.

The first phase consists of identifying the root S and allocating memory as necessary. Some description of this is given in Section 5 The data initialization is generally covered at the start of each of the other phases. There may be some memory management and data initialization for efficiency in the first phase.

The second phase consists of computing the primary paths, the potential primary neighbors, the neighbors visited on the primary paths, the reverse paths and the associated penultimate node. The multiple paths are simultaneously minimized as described in Section 4 The details on precisely how the primary and reverse paths are initialized and the additional data is obtained is described in Section 6 Further optimizations, such as terminating collection of data only needed for the neighbors or the neighbors' neighbors after the associated paths have been minimized, are straightforward.

The third phase consists of computing the alternate paths; these are both the potential loop-free alternates and the potential U-turn alternates. It is a policy decision that these are done using the enhanced SPF which allows simultaneous minimization of multiple paths (as described in Section 4). This phase is dependent on information from the previous. Specifically, the distances of the reverse paths from each neighbor or neighbor's neighbor back to S are required; additionally, the penultimate node associated with each neighbor must be known. The specifics of this phase are given in Section 7

The fourth phase consists of selecting the appropriate alternates for each destination and identifying the protection available. This is dependent on the results from the second and third phases. This phase is detailed in Section 8.

As an aid in understanding the details of the algorithm, the algorithm is run on the example topology given in FIG. 3.1; in each phase, the mechanisms and details of using the algorithm on this topology are given.

5 Simultaneously Computing Multiple Paths

As can be seen from the desired information described in Section 1, there are a large number of paths that must be minimized. First, there is the primary path. Second, there is the reverse path. Third, there is a potential loop-free path for each neighbor $N_i$ that can be used as an alternate. Fourth, there is a potential U-turn alternate path for each neighbor $N_i$ that may qualify as a U-turn neighbor. These can all be determined based on the same topology with different starting distances for the paths at specific nodes. Essentially, there is a path creation step which is different for each type of path. Once the path has been started, the path can be properly propagated by exploring links and inheriting the minimum of the possibilities for each changed path. The cost of the links may be different for different paths; this is the case for the primary path and the reverse path that use the cost of the link in different directions.

It is desirable to have a mechanism that is efficient at minimizing multiple paths simultaneously. The Dijkstra algorithm works to find a single minimum path to each node. Each path could be minimized via a different run of the Dijkstra, with a different starting exploration, but it is more efficient to find multiple paths simultaneously.

In the Dijkstra algorithm, a candidate list is stored of nodes that have a changed path. All nodes, except the root S, initially have a path distance of infinity. When a node X is reached by exploring a link, the node's path's distance is updated and the node is added into the candidate-list, which is generally ordered by path distance for efficiency. If the candidate-list is not ordered, a node may be placed in the candidate-list multiple times; this will occur each time that the node's path has changed and the node isn't in the candidate list.

If the candidate-list is ordered with the node with the shortest path distance at the start of the list, as is common, then a node is removed from the candidate-list at most once in the Dijkstra algorithm. In that algorithm, all links must have non-negative cost. Thus, when a node is removed from the candidate-list, there is no node which can further decrease the cost of that node's path. There is a set of nodes that had a shorter path; those have already been removed from the candidate-list and had their links explored. There is a set of nodes with an equal or longer path that are still in the candidate-list; adding a non-negative link cost cannot reduce the distance of their path to be that of the node just removed from the candidate-list. Removal of a node from the candidate-list implies that the path, whose distance determined the node's place in the candidate-list, has been minimized.

In the Dijkstra algorithm, a node's links are explored only once, when the node is removed from the candidate-list. At that point, the single path associated with the node has been minimized.

In the RAPID algorithm, there can be multiple paths associated with a node. A node can be placed on and removed from the candidate-list as many times as there are paths associated with that node, in the worst case. Every time a node is removed from the candidate-list, its links are explored and changed paths are passed to the neighbors for consideration. Although the worst case involves exploring a node's links once per path, this is not the average case.

5.1 Data Structure and Logic

To compute the multiple paths simultaneously, a node will store a candidateDistance and for each path, the distance and a changed bitflag. Initially, each node's candidateDistance is set to infinity. The changed flag is cleared; this flag is an optimization to avoid passing a path when it hasn't changed. The candidate-list used for the algorithm will be ordered based upon the candidateDistance rather than any specific path's distance.

Paths are created according to their initial starting condition. For example, the primary path in RAPID would be started by setting the path distance in the root to 0, marking it as changed, and then exploring all the links from the root.

When a link is explored from the nearEnd node, those paths which have the changed flag set may be inherited to the link's farEnd node. For each changed path, if farEnd's path is greater than the nearEnd's path plus the link cost used for that type of path, then the farEnd's distance is updated and the changed flag is set. Once all changed paths have been inherited as appropriate, if any have a distance less than the farEnd's candidateDistance changed, then the candidateDistance is updated and the node is inserted into the candidate-list, if not present, or re-ordered in the candidate-list based upon its new candidateDistance. When a node is removed from the candidate-list, the node's candidateDistance is reset to infinity.

It is only necessary to explore a node's links again if any path of the node has changed. When a path changes, its distance is compared with the candidateDistance; if no other paths have changed since the node's links were last explored, then the candidateDistance will be infinity, which will be larger than a real path.

The same logic described above for why Dijkstra knows that the path is minimized when the node is removed from a candidate-list explains why in the RAPID algorithm when a node is removed from the candidate-list, one or more of the paths associated with the node has been minimized.

This method is described in the pseudo-code below:

```
ExploreLink( link)
    newCandDist ← link->farEnd->candidateDistance
    Foreach path k
        if (link->nearEnd->path[k].changed is TRUE)
        if (link->nearEnd->path[k].distance + link->cost < link->farEnd-
    >path[k].distance)
                link->farEnd->path[k].distance ← link->nearEnd-
>path[k].distance + link->cost
            link->farEnd->path[k].changed ← TRUE
                if (link->farEnd->path[k].distance < newCandDist)
                    newCandDist ← link->farEnd->path[k].distance
        if (newCandDist ≠ link->farEnd->candidateDistance)
            link->farEnd->candidateDistance ← newCandDist
            update link->farEnd's position in the candidate-list
    MultiPathSPF(root)
        Explore Root's Links to start paths as desired and insert nodes
with paths into candidate-list
            while (candidate ← extract node with minimum
    candidateDistance from candidate-list)
                foreach link L from candidate
                    ExploreLink(L)
                candidate->candidateDistance ← ∞
```

-continued

```
foreach path k
    candidate->path[k].changed ← FALSE
When MultiPathSPF completes, the distance_ls for a path k to a
destination node will be stored in node->path[k].distance.
```

The mechanics of this will be seen in the example described in Section 6.

6 Preparing a Topology

The RAPID algorithm is run upon a graph, represented by nodes and links. For each uni-directional link, the corresponding back-link must be found and the cost and ability of that back-link to break U-turns must be considered.

There is a certain amount of memory management because the number of paths to store can vary depending upon the number of neighbors that can be alternates and because bitmaps of neighbors visited are required to help determine node-protection.

7 Finding Primary and Reverse Paths

The primary path is the only path that requires tracking multiple next-hops to accommodate ECMP. The reverse path and the primary path are computed together. If all links had symmetric costs, then each node would need to be removed from the candidate-list only once; this is the best case and the worst case has each node removed from the candidate-list twice.

To prepare the two different paths, the root's links are explored first with the forward cost to create a candidate primary path and then with the reverse cost to create a candidate reverse path. Associated with the primary path is a pair of potential primary neighbors; when the link from the root to a node is explored and that neighboring node finds the link provides the shortest known path from the root, that neighboring node stores the link as a primary next-hop, stores itself as a potential primary neighbor and sets its flag in its primary path's neighbors-visited bitmap.

It is possible for a root's link to be a broadcast link. In that case, the pseudo-node is explored and its flag is set in the primary path's neighbors-visited bitmap. The actual next-hop stored for a neighbor across a pseudo-node would be the logical link from the pseudo-node to the neighbor.

7.1 Inheriting Primary Path Attributes

If an equal cost path is found, then the set of primary next-hops is selected and stored based upon lowest link ID, if all cannot be kept. If there are not two potential primary neighbors stored with the primary path, then if the new equal cost path has a different potential primary neighbor, it is stored with the primary path. The union of the neighbors-visited bitmaps or lists (where the data structure used is dependent upon implementation choice) is stored. This is because it is not known which of the equal-cost paths might have been taken and so the worst-case assumption is that either could have been and to therefore consider that all neighbors visited on either path were visited. Visits to neighboring pseudo-nodes must also be tracked.

When exploring a link, if an equal cost primary path is found, then the behavior described above is used to determine how the node's primary path attributes are changed. If the exploration of a link results in a cheaper primary path, then the primary next-hops are set to those of the path being inherited, the pair of potential primary neighbors are set to those of the path being inherited, the neighbors-visited bitmap is inherited and, if the node inheriting the path is a neighbor, then the node's neighbor flag is set in its primary path's neighbors-visited bitmap.

These attributes of the primary path give the information described in Sections 1.1 and 1.2 once the SPF has completed (i.e. the candidate-list is empty).

7.2 Inheriting Reverse Path Attributes

For the reverse path, the new reverse path distance offered to a node at the far end of a link is the reverse path distance of the node at the near end of the link plus the reverse-cost of the link, which is the cost of the link's back-link.

Associated with a reverse path is the penultimate-node. Initially, the penultimate-node is set to the root. When a cheaper reverse path is found by exploring a link, the far end node's penultimate-node is set to the link's near end node. If an equal cost reverse path is found by exploring a link, then if the near end node is not the root, the far end node's penultimate-node is set to the link's near end node. An optimization is to only do this if the far end node's penultimate-node is still the root.

The attributes of the reverse path give the information described in Sections 1.3 and 1.5 once the SPF has completed.

7.3 Example Primary & Reverse SPF

This section will present an example for computing the primary and reverse paths, plus the penultimate node, the two potential primary neighbors, and the neighbors visited. For reference, the example topology to be used is given again in FIG. 3.6.

Before the algorithm begins, the data associated with it must be properly initialized as shown in Table 1. The candidate-list is empty and the only paths known are those for S, which is the root of the SPF.

TABLE 1

Initialization for Primary/Reverse SPF Computation

| candidate-list before step start | Ø |
| candidate-list at end of step | Ø |

| | | primary | | potential | | | reverse | | penultimate |
|---|---|---|---|---|---|---|---|---|---|
| Node | candidate distance | Distance, next-hop | changed | primary nbr 1 | nbr 2 | neighbors visited | distance | changed | node |
| S | 0 | 0, Ø | T | Ø | Ø | Ø | 0 | T | Ø |
| A | ∞ | ∞, Ø | F | Ø | Ø | Ø | ∞ | F | Ø |
| B | ∞ | ∞, Ø | F | Ø | Ø | Ø | ∞ | F | Ø |
| C | ∞ | ∞, Ø | F | Ø | Ø | Ø | ∞ | F | Ø |
| E | ∞ | ∞, Ø | F | Ø | Ø | Ø | ∞ | F | Ø |
| F | ∞ | ∞, Ø | F | Ø | Ø | Ø | ∞ | F | Ø |
| G | ∞ | ∞, Ø | F | Ø | Ø | Ø | ∞ | F | Ø |

TABLE 1-continued

Initialization for Primary/Reverse SPF Computation

| H | ∞ | ∞, Ø | F | Ø | Ø | Ø | ∞ | F | Ø |
| I | ∞ | ∞, Ø | F | Ø | Ø | Ø | ∞ | F | Ø |

For the initial step, the links from S are explored and its paths are compared for inheritance. Since no other paths are known, those paths are all inherited. At this point, there is only one potential primary neighbor for each path, which is the node itself. The penultimate node for all these paths is S because the reverse paths were inherited from S. When the reverse path is inherited, the reverse cost of the link is added to the reverse path while the forward cost of the link is added to the primary path. This can be clearly seen in the end state of node C. The primary path stored is a distance of 5, which is S's primary path distance of 0 plus 5, the cost of the link from S to C. The reverse path stored at C is a distance of 10, which is S's reverse path distance of 0 plus 10, the cost of the link from C to S.

TABLE 2

After Step 1: Exploring S's Links

| candidate-list before step start | Ø |
| candidate-list at end of step | (5, A), (5, C), ☐ (25, B) |

| Node | candidate distance | primary Distance, next-hop | changed | potential primary nbr 1 | nbr 2 | neighbors visited | reverse distance | changed | penultimate node |
|---|---|---|---|---|---|---|---|---|---|
| S | ∞ | 0, Ø | F | Ø | Ø | Ø | 0 | F | Ø |
| A | 5 | 5, {L1, L2) | T | A | Ø | A | 5 | T | S |
| B | 25 | 25, L3 | T | B | Ø | B | 25 | T | S |
| C | 5 | 5, L4 | T | C | Ø | C | 10 | T | S |
| E | ∞ | ∞, Ø | F | Ø | Ø | Ø | ∞ | F | Ø |
| F | ∞ | ∞, Ø | F | Ø | Ø | Ø | ∞ | F | Ø |
| G | ∞ | ∞, Ø | F | Ø | Ø | Ø | ∞ | F | Ø |
| H | ∞ | ∞, Ø | F | Ø | Ø | Ø | ∞ | F | Ø |
| I | ∞ | ∞, Ø | F | Ø | Ø | Ø | ∞ | F | Ø |

At this point, the algorithm simply involves removing the node from the head of the candidate-list and exploring that node's links to see if any of the changed paths should be inherited. As can be seen, once a node is removed from the candidate-list and its links are explored, those paths which were changed are marked as unchanged.

TABLE 3

Step 2: Exploring A's Links

| candidate-list before step start | (5, A), (5, C), ☐ (25, B) |
| candidate-list at end of step | (5, C), ☐ (10, F), (15, G), (25, B) |

| Node | candidate distance | primary Distance, next-hop | changed | potential primary nbr 1 | nbr 2 | neighbors visited | reverse distance | changed | penultimate node |
|---|---|---|---|---|---|---|---|---|---|
| S | ∞ | 0, Ø | F | Ø | Ø | Ø | 0 | F | Ø |
| A | ∞ | 5, {L1, L2) | F | A | Ø | A | 5 | F | S |
| B | 25 | 25, L3 | T | B | Ø | B | 25 | T | S |
| C | 5 | 5, L4 | T | C | Ø | C | 10 | T | S |
| E | ∞ | ∞, Ø | F | Ø | Ø | Ø | ∞ | F | Ø |
| F | 10 | 10, {L1, L2) | T | A | Ø | A | 10 | T | A |
| G | 15 | 15, {L1, L2) | T | A | Ø | A | 15 | T | A |
| H | ∞ | ∞, Ø | F | Ø | Ø | Ø | ∞ | F | Ø |
| I | ∞ | ∞, Ø | F | Ø | Ø | Ø | ∞ | F | Ø |

C is now at the head of the candidate-list. It is removed and its links are explored. Nodes E and I inherit paths but F already has shorter paths; therefore F doesn't change its stored paths or position in the candidate-list. When the reverse path is inherited by E, the penultimate node is set to C, which is the node that the path was learned from.

TABLE 4

Step 3: Exploring C's Links

| | candidate-list before step start | | | (5, C), ☐(10, F), (15, G), (25, B) | | | | | |
|---|---|---|---|---|---|---|---|---|---|
| | candidate-list at end of step | | | ☐(10, F), (15, E), (15, G), (15, I), (25, B) | | | | | |

| Node | candidate distance | primary Distance, next-hop | changed | potential primary nbr 1 | nbr 2 | neighbors visited | reverse distance | changed | penultimate node |
|---|---|---|---|---|---|---|---|---|---|
| S | ∞ | 0, Ø | F | Ø | Ø | Ø | 0 | F | Ø |
| A | ∞ | 5, {L1, L2} | F | A | Ø | A | 5 | F | S |
| B | 25 | 25, L3 | T | B | Ø | B | 25 | T | S |
| C | ∞ | 5, L4 | F | C | Ø | C | 10 | F | S |
| E | 15 | 15, L4 | T | C | Ø | C | 20 | T | C |
| F | 10 | 10, {L1, L2} | T | A | Ø | A | 10 | T | A |
| G | 15 | 15, {L1, L2} | T | A | Ø | A | 15 | T | A |
| H | ∞ | ∞, Ø | F | Ø | Ø | Ø | ∞ | F | Ø |
| I | 15 | 15, L4 | T | C | Ø | C | 20 | T | C |

TABLE 5

Step 4: Exploring F's Links

| | candidate-list before step start | | | ☐(10, F), (15, E), (15, G), (15, I), (25, B) | | | | | |
|---|---|---|---|---|---|---|---|---|---|
| | candidate-list at end of step | | | (15, E), (15, G), (15, I), (25, B) | | | | | |

| Node | candidate distance | primary Distance, next-hop | changed | potential primary nbr 1 | nbr 2 | neighbors visited | reverse distance | changed | penultimate node |
|---|---|---|---|---|---|---|---|---|---|
| S | ∞ | 0, Ø | F | Ø | Ø | Ø | 0 | F | Ø |
| A | ∞ | 5, {L1, L2} | F | A | Ø | A | 5 | F | S |
| B | 25 | 25, L3 | T | B | Ø | B | 25 | T | S |
| C | ∞ | 5, L4 | F | C | Ø | C | 10 | F | S |
| E | 15 | 15, L4 | T | C | Ø | C | 20 | T | C |
| F | ∞ | 10, {L1, L2} | F | A | Ø | A | 10 | F | A |
| G | 15 | 15, {L1, L2} | T | A | Ø | A | 15 | T | A |
| H | ∞ | ∞, Ø | F | Ø | Ø | Ø | ∞ | F | Ø |
| I | 15 | 15, L4 | T | C | Ø | C | 20 | T | C |

When E is removed from the candidate list in Step 5 and the link to B is explored, this creates the first instance of a node that can be reached via equal-cost paths from multiple neighbors of S. This is reflected appropriately in the data-structures. B stores new primary next-hops which are via L3 and L4. The potential primary neighbors from each of the paths are retained so that B has both B and C as potential primary neighbors. The penultimate node associated with B is updated to be E. This is the node which passed an equal path to B and which is not S.

TABLE 6

Step 5: Exploring E's Links

| | candidate-list before step start | | | (15, E), (15, G), (15, I), (25, B) | | | | | |
|---|---|---|---|---|---|---|---|---|---|
| | candidate-list at end of step | | | (15, G), (15, I), (25, B), (35, H) | | | | | |

| Node | candidate distance | primary Distance, next-hop | changed | potential primary nbr 1 | nbr 2 | neighbors visited | reverse distance | changed | penultimate node |
|---|---|---|---|---|---|---|---|---|---|
| S | ∞ | 0, Ø | F | Ø | Ø | Ø | 0 | F | Ø |
| A | ∞ | 5, {L1, L2} | F | A | Ø | A | 5 | F | S |
| B | 25 | 25, {L3, L4} | T | B | C | B, C | 25 | T | E |
| C | ∞ | 5, L4 | F | C | Ø | C | 10 | F | S |
| E | ∞ | 15, L4 | F | C | Ø | C | 20 | F | C |
| F | ∞ | 10, {L1, L2} | F | A | Ø | A | 10 | F | A |
| G | 15 | 15, {L1, L2} | T | A | Ø | A | 15 | T | A |
| H | 35 | 35, L4 | T | C | Ø | C | 40 | T | E |
| I | 15 | 15, L4 | T | C | Ø | C | 20 | T | C |

Once G's links are explored, the node H can clearly be reached via three different next-hops; these are those associated with L1, L2 and L4. In our example, at most two next-hops can be stored and the ties are broken in favor of the lower numbered links. Thus, the primary next-hops stored for H are L1 and L2. The fact that there was another primary next-hop is reflected in the stored potential primary neighbors. Even though L4 is not retained as a primary next-hop, C is retained as a potential primary neighbor along with A.

TABLE 7

Step 6: Exploring G's Links

| candidate-list before step start | (15, G), (15, I), (25, B), (35, H) |
|---|---|
| candidate-list at end of step | (15, I), (25, B), (35, H) |

| Node | candidate distance | Primary Distance, next-hop | changed | potential primary Nbr 1 | nbr 2 | neighbors visited | reverse distance | changed | penultimate node |
|---|---|---|---|---|---|---|---|---|---|
| S | ∞ | 0, Ø | F | Ø | Ø | Ø | 0 | F | Ø |
| A | ∞ | 5, {L1, L2} | F | A | Ø | A | 5 | F | S |
| B | 25 | 25, {L3, L4} | T | B | C | B, C | 25 | T | E |
| C | ∞ | 5, L4 | F | C | Ø | C | 10 | F | S |
| E | ∞ | 15, L4 | F | C | Ø | C | 20 | F | C |
| F | ∞ | 10, {L1, L2} | F | A | Ø | A | 10 | F | A |
| G | ∞ | 15, {L1, L2} | F | A | Ø | A | 15 | F | A |
| H | 35 | 35, {L1, L2} | T | C | A | A, C | 35 | T | G |
| I | 15 | 15, L4 | T | C | Ø | C | 20 | T | C |

TABLE 8

Step 7: Exploring I's Links

| candidate-list before step start | (15, I), (25, B), (35, H) |
|---|---|
| candidate-list at end of step | (25, B), (35, H) |

| Node | candidate distance | primary Distance, next-hop | changed | potential primary Nbr 1 | nbr 2 | neighbors visited | reverse distance | changed | penultimate node |
|---|---|---|---|---|---|---|---|---|---|
| S | ∞ | 0, Ø | F | Ø | Ø | Ø | 0 | F | Ø |
| A | ∞ | 5, {L1, L2} | F | A | Ø | A | 5 | F | S |
| B | 25 | 25, {L3, L4} | T | B | C | B, C | 25 | T | E |
| C | ∞ | 5, L4 | F | C | Ø | C | 10 | F | S |
| E | ∞ | 15, L4 | F | C | Ø | C | 20 | F | C |
| F | ∞ | 10, {L1, L2} | F | A | Ø | A | 10 | F | A |
| G | ∞ | 15, {L1, L2} | F | A | Ø | A | 15 | F | A |
| H | 35 | 35, {L1, L2} | T | C | A | A, C | 35 | T | G |
| I | ∞ | 15, L4 | F | C | Ø | C | 20 | F | C |

TABLE 9

Step 8: Exploring B's Links

| candidate-list before step start | (35, H) |
|---|---|
| candidate-list at end of step | (35, H) |

| Node | candidate distance | primary Distance, next-hop | changed | potential primary nbr 1 | nbr 2 | neighbors visited | reverse distance | changed | penultimate node |
|---|---|---|---|---|---|---|---|---|---|
| S | ∞ | 0, Ø | F | Ø | Ø | Ø | 0 | F | Ø |
| A | ∞ | 5, {L1, L2} | F | A | Ø | A | 5 | F | S |
| B | ∞ | 25, {L3, L4} | F | B | C | B, C | 25 | F | E |
| C | ∞ | 5, L4 | F | C | Ø | C | 10 | F | S |
| E | ∞ | 15, L4 | F | C | Ø | C | 20 | F | C |
| F | ∞ | 10, {L1, L2} | F | A | Ø | A | 10 | F | A |
| G | ∞ | 15, {L1, L2} | F | A | Ø | A | 15 | F | A |
| H | 35 | 35, {L1, L2} | T | C | A | A, C | 35 | T | G |
| I | ∞ | 15, L4 | F | C | Ø | C | 20 | F | C |

TABLE 10

Final Results after Step 9: Exploring H's Links candidate-list before step start     (35, H)
candidate-list at end of step     Ø

| Node | candidate distance | Distance, next-hop | primary changed | potential primary nbr 1 | nbr 2 | neighbors visited | reverse distance | changed | penultimate node |
|---|---|---|---|---|---|---|---|---|---|
| S | ∞ | 0, Ø | F | Ø | Ø | Ø | 0 | F | Ø |
| A | ∞ | 5, {L1, L2} | F | A | Ø | A | 5 | F | S |
| B | ∞ | 25, {L3, L4} | F | B | C | B, C | 25 | F | E |
| C | ∞ | 5, L4 | F | C | Ø | C | 10 | F | S |
| E | ∞ | 15, L4 | F | C | Ø | C | 20 | F | C |
| F | ∞ | 10, {L1, L2} | F | A | Ø | A | 10 | F | A |
| G | ∞ | 15, {L1, L2} | F | A | Ø | A | 15 | F | A |
| H | ∞ | 35, {L1, L2} | F | C | A | A, C | 35 | F | G |
| I | ∞ | 15, L4 | F | C | Ø | C | 20 | F | C |

After step 9, the candidate-list is empty; Table 10 provides the final primary and reverse path information.

8 Finding Potential Loop-Free and U-turn Paths

For the described approach, a neighbor $N_i$ can be considered for a loop-free alternate if there is at least one link between the root and $N_i$ which is configured for use as an alternate and whose reverse-cost is not the maximum. If the far-end of the link has indicated that it is overloaded, for ISIS, then the link's reverse-cost is considered to be the maximum.

A neighbor $N_i$ could only provide a U-turn alternate if the above condition is true and if the neighbor could be a U-turn neighbor. Based upon the results of the primary and reverse SPF, it is possible to determine if a neighbor cannot be a U-turn neighbor. A neighbor cannot be a U-turn neighbor if the penultimate-node associated with that node's reverse path is not the root.

The results of the primary and reverse SPF are used for the alternate SPF to look for potential U-turn alternates. If a neighbor $N_i$ cannot be a U-turn neighbor, then it is not necessary to store a potential U-turn alternate path; even if $N_i$ has a loop-free node-protecting alternate, that cannot be used by S because $N_i$ isn't a U-turn neighbor.

A potential loop-free alternate path is stored by every node for each neighbor which could provide a loop-free alternate. Similarly, every node stores a potential U-turn alternate path for each neighbor which could provide a U-turn alternate. A neighbor $N_i$ may be loop-free for a particular destination and a U-turn neighbor for another destination; this is not known until $\text{Distance}_{t,S}(N_i, D)$ is known for each destination D.

Since a neighbor being loop-free or U-turn is dependent upon the destination, there is little to no gain by first computing the potential loop-free paths and then the potential U-turn paths. Therefore, a single SPF is run to compute all the potential loop-free and potential U-turn paths simultaneously. This is a policy decision and not significant to the complete RAPID algorithm.

For the purposes of this discussion, the potential loop-free alternate path started by going via a neighbor $N_i$ will be stored in the ith potential loop-free path. Similarly, the potential U-turn alternate path started by going via a neighbor of neighbor $N_i$ will be stored in the ith potential U-turn path. In a practical implementation, there may be different indices used to minimize the storage and the examination of the paths to determine which have changed and may need to be passed across a link when the link is explored.

If S has a broadcast interface that connects S to neighbors, then the potential loop-free alternate paths are started at each of the neighbors of the pseudo-node associated with that broadcast interface. Similarly, the potential U-turn alternate paths are started by going to the neighbors of each neighbor reached via the pseudo-node. In other words, when paths are first started, any pseudo-nodes are transited and the operation is carried out for all the neighbors of that pseudo-node.

Consider the example in FIG. 3.7 that contains multiple broadcast links. There is a broadcast link from S that connects to J and K; it is represented in the logical topology as the pseudo-node pn1. There is also a broadcast link between L, K and M; this is represented in the logical topology as the pseudo-node pn2. To illustrate the earlier explanation, there will be a potential loop-free alternate path created for each of S's neighbors that are actual nodes; these are J, K and L. The potential U-turn alternate path via J will be started at J's neighbors, K and Q; although S is a neighbor, it starts with all paths at a distance of 0. The potential U-turn alternate path via K will be started at K's neighbors J, Q, L and M. The potential U-turn alternate path via L will be started at L's neighbors K and M.

8.1 Potential Loop-Free Alternate Paths

To start the set of potential loop-free alternate paths, acceptable links from the root are explored; an acceptable link can be used as an alternate and does not have a maximum reverse-cost. Each neighbor $N_i$ so reached stores its ith potential loop-free path with a distance of 1. Using a distance of 1 ensures that if a link cost from $N_i$ to the root is 0, as is possible with ISIS, no path inheritance back to the root will occur.

Once the potential loop-free paths have been started by exploring the root's links as described, the various paths are simply inherited and minimized as normal. When the SPF completes, the ith potential loop-free path's distance stored at node D will be $1+\text{Distance}_{t,S}(N_i, D)$, which is described as required in Section 1.6.

8.2 Potential U-Turn Alternate Paths

Before the potential U-turn paths can be started, the constant K discussed in Section 1.7 must be determined. This can be done by examining the far end node's reverse distance for every link connected to $N_i$ and storing the maximum plus 1. This will be referred to as $K_i$.

To start the set of potential U-turn alternates, appropriate links from the root are explored. A link is appropriate if it can be used as an alternate, its back-link can break U-turns, and it does not have a maximum reverse-cost. If the neighbor $N_i$ at the far end of the link could be a U-turn neighbor, then the acceptable links from $N_i$ are explored. If a link from $N_i$ can be used as an alternate and does not have a maximum reverse-cost, then the link is acceptable. The far-end node of each acceptable link from $N_i$ stores for the ith potential U-turn path a distance equal to $K_i$ minus the far end node's reverse distance. In addition, the far-end node sets the flag associated with $N_i$ in the neighbors-visited bitmap associated with the ith potential U-turn path. If the far-end node is also a neighbor, then the far-end sets the flag associated with itself in the ith potential U-turn path's neighbors-visited bitmap.

Once the potential U-turn paths are started, they are inherited and minimized as normal. The one complexity is from managing the neighbors-visited bitmap when an equal cost path is found. As described in Section 1.3, since it is not known which of the equal cost paths will be taken, the worst case assumption is that either could be. Therefore, the neighbors-visited bitmap is set to the union of the bitmap stored at the node and the neighbors-visited bitmap associated with the newly-learned equal-cost path.

When the SPF completes, the ith potential U-turn path at node D will store a distance equal to $\min_{\forall j \text{ which exist}}$ (Distance$_{tS}(R_{i,j}, D)$−Distance$_{opt}(R_{i,j}, S)$+$N_i$.maxReverseDistance+1). The associated neighbors-visited bitmap will indicate which neighbors were visited along that path. This gives the information specified in Sections 1.7 and 1.8.

8.3 Example Alternate SPF

This section will present an example for computing the potential loop-free alternates and U-turn alternates and the neighbors visited on the latter paths. The example assumes that all neighbors of S have indicated that U-turn breaking is supported. For reference, the example topology to be used is given yet again in FIG. 3.8.

The results of the primary and reverse SPF, which are given in Table 10, are used here. The first observation from those results is that the penultimate node associated with B is E and not S; therefore B cannot be a U-turn neighbor for any destination. Thus, no potential U-turn alternate path is investigated that starts with B. Second, the reverse distances computed will be used in combination with the constants $K_A$, $K_B$, and $K_C$ to initialize the potential U-turn alternate paths.

The initial state of the data structures stored before the alternate SPF is given in Table 11.

TABLE 11

| | | | | | | | | |
|---|---|---|---|---|---|---|---|---|
| Initial State for Alternate SPF | | | | | | | | |
| candidate-list before step start | | | | | Ø | | | |
| candidate-list at end of step | | | | | Ø | | | |
| | | loop-free alternate paths | | | U-turn alternate paths | | | |
| | | via A | via B | via C | via A | | via C | |
| Node | candidate distance | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | ∞ | ∞, F | ∞, F | ∞, F | ∞, F | Ø | ∞, F | Ø |
| B | ∞ | ∞, F | ∞, F | ∞, F | ∞, F | Ø | ∞, F | Ø |
| C | ∞ | ∞, F | ∞, F | ∞, F | ∞, F | Ø | ∞, F | Ø |
| E | ∞ | ∞, F | ∞, F | ∞, F | ∞, F | Ø | ∞, F | Ø |
| F | ∞ | ∞, F | ∞, F | ∞, F | ∞, F | Ø | ∞, F | Ø |
| G | ∞ | ∞, F | ∞, F | ∞, F | ∞, F | Ø | ∞, F | Ø |
| H | ∞ | ∞, F | ∞, F | ∞, F | ∞, F | Ø | ∞, F | Ø |
| I | ∞ | ∞, F | ∞, F | ∞, F | ∞, F | Ø | ∞, F | Ø |

The initial step is to create the different types of paths. The potential loop-free alternate paths are created by setting them to a distance of 1 at the neighbor that is the start for the potential alternate. The potential U-turn paths are created by populating the U-turn path associated with each particular neighbor $N_i$ with $K_i$-$D_{opt}(R_{i,j}, S)$ at each particular $R_{i,j}$. Naturally, if S is the $R_{i,j}$ in question, then S already has a shorter path stored and will not be changed.

To clarify this, first let us determine the $K_i$. The constant associated with neighbor A, $K_A$, is 16; this is 1 plus the maximum cost of a link from A to S (e.g. 5) plus the maximum cost of a link from a neighbor of A back to A; the two links of interest are cost 5 from F and cost 10 from G, so the latter's cost is used. With similar logic, the constant $K_B$ associated with neighbor B is determined to 36 and the constant $K_C$ associated with neighbor C is determined to be 23.

The results of this initial step are seen in Table 12. The loop-free alternate path via A has been started only in node A. Similarly, the loop-free alternate path via B is started only in node B and the loop-free alternate path via C is started only in node C.

The U-turn alternate path via A has been started in A's neighbors F & G. The U-turn alternate path via B has been started in B's neighbor E. The U-turn alternate path via C has been started in C's neighbors E, F and I.

TABLE 12

Step 1: Creating Paths for Alternate SPF

| | candidate-list before step start | Ø |
| --- | --- | --- |
| | candidate-list at end of step | (1, A), (1, B), (1, C), (1, G), (3, E), (3, I), (6, F) |

| | | loop-free alternate paths | | | U-turn alternate paths | | | |
| --- | --- | --- | --- | --- | --- | --- | --- | --- |
| | | via A | via B | via C | via A | | via C | |
| Node | candidate distance | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | 1 | 1, T | ∞, F | ∞, F | ∞, F | Ø | ∞, F | Ø |
| B | 1 | ∞, F | 1, T | ∞, F | ∞, F | Ø | ∞, F | Ø |
| C | 1 | ∞, F | ∞, F | 1, T | ∞, F | Ø | ∞, F | Ø |
| E | 3 | ∞, F | ∞, F | ∞, F | ∞, F | Ø | 3, T | C |
| F | 6 | ∞, F | ∞, F | ∞, F | 6, T | A | 13, T | C |
| G | 1 | ∞, F | ∞, F | ∞, F | 1, T | A | ∞, F | Ø |
| H | ∞ | ∞, F | ∞, F | ∞, F | ∞, F | Ø | ∞, F | Ø |
| I | 3 | ∞, F | ∞, F | ∞, F | ∞, F | Ø | 3, T | C |

Now that the paths have been created, it just remains to empty the candidate-list in the usual fashion.

TABLE 13

Step 2: Explore A's Links

| | candidate-list before step start | (1, A), (1, B), (1, C), (1, G), (3, E), (3, I), (6, F) |
| --- | --- | --- |
| | candidate-list at end of step | (1, B), (1, C), (1, G), (3, E), (3, I), (6, F) |

| | | loop-free alternate paths | | | U-turn alternate paths | | | |
| --- | --- | --- | --- | --- | --- | --- | --- | --- |
| | | via A | via B | via C | via A | | via C | |
| Node | candidate distance | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | ∞ | 1, F | ∞, F | ∞, F | ∞, F | Ø | ∞, F | Ø |
| B | 1 | ∞, F | 1, T | ∞, F | ∞, F | Ø | ∞, F | Ø |
| C | 1 | ∞, F | ∞, F | 1, T | ∞, F | Ø | ∞, F | Ø |
| E | 3 | ∞, F | ∞, F | ∞, F | ∞, F | Ø | 3, T | C |
| F | 6 | 6, T | ∞, F | ∞, F | 6, T | A | 13, T | C |
| G | 1 | 11, T | ∞, F | ∞, F | 1, T | A | ∞, F | Ø |
| H | ∞ | ∞, F | ∞, F | ∞, F | ∞, F | Ø | ∞, F | Ø |
| I | 3 | ∞, F | ∞, F | ∞, F | ∞, F | Ø | 3, T | C |

TABLE 14

Step 3: Explore B's Links

| | candidate-list before step start | (1, B), (1, C), (1, G), (3, E), (3, I), (6, F) |
| --- | --- | --- |
| | candidate-list at end of step | (1, C), (1, G), (3, E), (3, I), (6, F) |

| | | loop-free alternate paths | | | U-turn alternate paths | | | |
| --- | --- | --- | --- | --- | --- | --- | --- | --- |
| | | via A | via B | via C | via A | | via C | |
| Node | candidate distance | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | ∞ | 1, F | ∞, F | ∞, F | ∞, F | Ø | ∞, F | Ø |
| B | ∞ | ∞, F | 1, F | ∞, F | ∞, F | Ø | ∞, F | Ø |
| C | 1 | ∞, F | ∞, F | 1, T | ∞, F | Ø | ∞, F | Ø |
| E | 3 | ∞, F | 6, T | ∞, F | ∞, F | Ø | 3, T | C |
| F | 6 | 6, T | ∞, F | ∞, F | 6, T | A | 13, T | C |
| G | 1 | 11, T | ∞, F | ∞, F | 1, T | A | ∞, F | Ø |
| H | ∞ | ∞, F | ∞, F | ∞, F | ∞, F | Ø | ∞, F | Ø |
| I | 3 | ∞, F | ∞, F | ∞, F | ∞, F | Ø | 3, T | C |

TABLE 15

Step 4: Explore C's Links candidate-list before step start: (1, C), (1, G), (3, E), (3, I), (6, F)
candidate-list at end of step: (1, G), (3, E), (3, I), (6, F)

| Node | candidate distance | loop-free alternate paths | | | U-turn alternate paths | | | |
|---|---|---|---|---|---|---|---|---|
| | | via A | via B | via C | via A | | via C | |
| | | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | ∞ | 1, F | ∞, F | ∞, F | ∞, F | Ø | ∞, F | Ø |
| B | ∞ | ∞, F | 1, F | ∞, F | ∞, F | Ø | ∞, F | Ø |
| C | ∞ | ∞, F | ∞, F | 1, F | ∞, F | Ø | ∞, F | Ø |
| E | 3 | ∞, F | 6, T | 11, T | ∞, F | Ø | 3, T | C |
| F | 6 | 6, T | ∞, F | 13, T | 6, T | A | 13, T | C |
| G | 1 | 11, T | ∞, F | ∞, F | 1, T | A | ∞, F | Ø |
| H | ∞ | ∞, F | ∞, F | ∞, F | ∞, F | Ø | ∞, F | Ø |
| I | 3 | ∞, F | ∞, F | 11, T | ∞, F | Ø | 3, T | C |

TABLE 16

Step 5: Explore G's Links candidate-list before step start: (1, G), (3, E), (3, I), (6, F)
candidate-list at end of step: (3, E), (3, I), (6, F), (11, A), (21, H)

| Node | candidate distance | loop-free alternate paths | | | U-turn alternate paths | | | |
|---|---|---|---|---|---|---|---|---|
| | | via A | via B | via C | via A | | via C | |
| | | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | 11 | 1, F | ∞, F | ∞, F | 11, T | A | ∞, F | Ø |
| B | ∞ | ∞, F | 1, F | ∞, F | ∞, F | Ø | ∞, F | Ø |
| C | ∞ | ∞, F | ∞, F | 1, F | ∞, F | Ø | ∞, F | Ø |
| E | 3 | 31, T | 6, T | 11, T | 21, T | A | 3, T | C |
| F | 6 | 6, T | ∞, F | 13, T | 6, T | A | 13, T | C |
| G | ∞ | 11, F | ∞, F | ∞, F | 1, F | A | ∞, F | Ø |
| H | 21 | 31, T | ∞, F | ∞, F | 21, T | A | ∞, F | Ø |
| I | 3 | 26, T | ∞, F | 11, T | 16, T | A | 3, T | C |

TABLE 17

Step 6: Explore E's Links candidate-list before step start: (3, E), (3, I), (6, F), (11, A), (21, H)
candidate-list at end of step: (3, I), (6, F), (11, A), (13, B), (13, C), (21, H), (23, G)

| Node | candidate distance | loop-free alternate paths | | | U-turn alternate paths | | | |
|---|---|---|---|---|---|---|---|---|
| | | via A | via B | via C | via A | | via C | |
| | | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | 11 | 1, F | ∞, F | ∞, F | 11, T | A | ∞, F | Ø |
| B | 13 | 41, T | 1, F | 21, T | 31, T | A, B | 13, T | B, C |
| C | 13 | 41, T | 16, T | 1, F | 31, T | A, C | 13, T | B, C |
| E | ∞ | 31, F | 6, F | 11, F | 21, F | A | 3, F | C |
| F | 6 | 6, T | ∞, F | 13, T | 6, T | A | 13, T | C |
| G | 23 | 11, F | 26, T | ∞, F | 1, F | A | 23, T | C |
| H | 21 | 31, T | 26, T | 31, T | 21, T | A | 23, T | C |
| I | 3 | 26, T | ∞, F | 11, T | 16, T | A | 3, T | C |

TABLE 18

Step 7: Explore I's Links

| | candidate-list before step start | | (3, I), (6, F), (11, A), (13, B), (13, C), (21, H), (23, G) | | | | |
| | candidate-list at end of step | | (6, F), (11, A), (13, B), (13, C), (18, G), (21, H) | | | | |

| | | loop-free alternate paths | | | U-turn alternate paths | | | |
| | | via A | via B | via C | via A | | via C | |
| Node | candidate distance | distance, changed | distance, changed | distance, changed | distance, changed | neighbors visited | distance, changed | neighbors visited |
| --- | --- | --- | --- | --- | --- | --- | --- | --- |
| S | ∞ | 0, F | 0, F | 0, F | 0, F | Ø | 0, F | Ø |
| A | 11 | 1, F | ∞, F | ∞, F | 11, T | A | ∞, F | Ø |
| B | 13 | 41, T | 1, F | 21, T | 31, T | A, B | 13, T | B, C |
| C | 13 | 41, T | 16, T | 1, F | 26, T | A, C | 13, T | B, C |
| E | ∞ | 31, F | 6, F | 11, F | 21, F | A | 3, F | C |
| F | 6 | 6, T | ∞, F | 13, T | 6, T | A | 13, T | C |
| G | 18 | 11, F | 26, T | 26, T | 1, F | A | 18, T | C |
| H | 21 | 31, T | 26, T | 31, T | 21, T | A | 23, T | C |
| I | ∞ | 26, F | ∞, F | 11, F | 16, F | A | 3, F | C |

TABLE 19

Step 8: Explore F's Link

| | candidate-list before step start | | (6, F), (11, A), (13, B), (13, C), (18, G), (21, H) | | | | |
| | candidate-list at end of step | | (11, A), (13, B), (13, C), (18, G), (21, H) | | | | |

| | | loop-free alternate paths | | | U-turn alternate paths | | | |
| | | via A | Via B | via C | via A | | via C | |
| Node | candidate distance | distance, changed | distance, changed | distance, changed | distance, changed | neighbors visited | distance, changed | neighbors visited |
| --- | --- | --- | --- | --- | --- | --- | --- | --- |
| S | ∞ | 0, F | 0, F | 0, F | 0, F | Ø | 0, F | Ø |
| A | 11 | 1, F | ∞, F | 25, T | 11, T | A | 25, T | A, C |
| B | 13 | 41, T | 1, F | 21, T | 31, T | A, B | 13, T | B, C |
| C | 13 | 18, T | 16, T | 1, F | 18, T | A, C | 13, T | B, C |
| E | ∞ | 31, F | 6, F | 11, F | 21, F | A | 3, F | C |
| F | ∞ | 6, F | ∞, F | 13, F | 6, F | A | 13, F | C |
| G | 18 | 11, F | 26, T | 26, T | 1, F | A | 18, T | C |
| H | 21 | 31, T | 26, T | 31, T | 21, T | A | 23, T | C |
| I | ∞ | 26, F | ∞, F | 11, F | 16, F | A | 3, F | C |

TABLE 20

Step 9: Explore A's Links Again

| | candidate-list before step start | | (11, A), (13, B), (13, C), (18, G), (21, H) | | | | |
| | candidate-list at end of step | | (13, B), (13, C), (18, G), (21, H) | | | | |

| | | loop-free alternate paths | | | U-turn alternate paths | | | |
| | | via A | Via B | via C | via A | | via C | |
| Node | candidate distance | distance, changed | distance, changed | distance, changed | distance, changed | neighbors visited | distance, changed | neighbors visited |
| --- | --- | --- | --- | --- | --- | --- | --- | --- |
| S | ∞ | 0, F | 0, F | 0, F | 0, F | Ø | 0, F | Ø |
| A | ∞ | 1, F | ∞, F | 25, F | 11, F | A | 25, F | A, C |
| B | 13 | 41, T | 1, F | 21, T | 31, T | A, B | 13, T | B, C |
| C | 13 | 18, T | 16, T | 1, F | 18, T | A, C | 13, T | B, C |
| E | ∞ | 31, F | 6, F | 11, F | 21, F | A | 3, F | C |
| F | ∞ | 6, F | ∞, F | 13, F | 6, F | A | 13, F | C |
| G | 18 | 11, F | 26, T | 26, T | 1, F | A | 18, T | C |
| H | 21 | 31, T | 26, T | 31, T | 21, T | A | 23, T | C |
| I | ∞ | 26, F | ∞, F | 11, F | 16, F | A | 3, F | C |

TABLE 21

Step 10: Explore B's Links Again

| | candidate-list before step start | | | (13, B), (13, C), (18, G), (21, H) | | | |
|---|---|---|---|---|---|---|---|
| | candidate-list at end of step | | | (13, C), (18, G), (21, H) | | | |

| | | loop-free alternate paths | | | U-turn alternate paths | | |
|---|---|---|---|---|---|---|---|
| | | via A | Via B | via C | via A | | via C | |
| Node | candidate distance | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | ∞ | 1, F | ∞, F | 25, F | 11, F | A | 25, F | A, C |
| B | ∞ | 41, F | 1, F | 21, F | 31, F | A, B | 13, F | B, C |
| C | 13 | 18, T | 16, T | 1, F | 18, F | A, C | 13, T | B, C |
| E | ∞ | 31, F | 6, F | 11, F | 21, F | A | 3, F | C |
| F | ∞ | 6, F | ∞, F | 13, F | 6, F | A | 13, F | C |
| G | 18 | 11, F | 26, T | 26, T | 1, F | A | 18, T | C |
| H | 21 | 31, T | 26, T | 31, T | 21, T | A | 23, T | C |
| I | ∞ | 26, F | ∞, F | 11, F | 16, F | A | 3, F | C |

TABLE 22

Step 11: Explore C's Links Again

| | candidate-list before step start | | | (13, C), (18, G), (21, H) | | | |
|---|---|---|---|---|---|---|---|
| | candidate-list at end of step | | | (18, G), (21, H), (26, I), (28, E), (28, F) | | | |

| | | loop-free alternate paths | | | U-turn alternate paths | | |
|---|---|---|---|---|---|---|---|
| | | via A | Via B | via C | via A | | via C | |
| Node | candidate distance | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | ∞ | 1, F | ∞, F | 25, F | 11, F | A | 25, F | A, C |
| B | ∞ | 41, F | 1, F | 21, F | 31, F | A, B | 13, F | B, C |
| C | ∞ | 18, F | 16, F | 1, F | 18, F | A, C | 13, F | B, C |
| E | 28 | 28, T | 6, F | 11, F | 21, F | A | 3, F | C |
| F | 28 | 6, F | 28, T | 13, F | 6, F | A | 13, F | C |
| G | 18 | 11, F | 26, T | 26, T | 1, F | A | 18, T | C |
| H | 21 | 31, T | 26, T | 31, T | 21, T | A | 23, T | C |
| I | 26 | 26, F | 26, T | 11, F | 16, F | A | 3, F | C |

TABLE 23

Step 12: Explore G's Links Again

| | candidate-list before step start | | | (18, G), (21, H), (26, I), (28, E), (28, F) | | | |
|---|---|---|---|---|---|---|---|
| | candidate-list at end of step | | | (21, H), (26, I), (28, E), (28, F), (36, A) | | | |

| | | loop-free alternate paths | | | U-turn alternate paths | | |
|---|---|---|---|---|---|---|---|
| | | via A | Via B | via C | via A | | via C | |
| Node | candidate distance | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | 36 | 1, F | 36, T | 25, F | 11, F | A | 25, F | A, C |
| B | ∞ | 41, F | 1, F | 21, F | 31, F | A, B | 13, F | B, C |
| C | ∞ | 18, F | 16, F | 1, F | 18, F | A, C | 13, F | B, C |
| E | 28 | 28, T | 6, F | 11, F | 21, F | A | 3, F | C |
| F | 28 | 6, F | 28, T | 13, F | 6, F | A | 13, F | C |
| G | ∞ | 11, F | 26, T | 26, F | 1, F | A | 18, F | C |
| H | 21 | 31, T | 26, T | 31, T | 21, T | A | 23, T | C |
| I | 26 | 26, F | 26, T | 11, F | 16, F | A | 3, F | C |

TABLE 24

Step 13: Explore H's Links candidate-list before step start: (21, H), (26, I), (28, E), (28, F), (36, A)
candidate-list at end of step: (26, I), (28, E), (28, F), (36, A)

| Node | candidate distance | loop-free alternate paths | | | U-turn alternate paths | | | |
| --- | --- | --- | --- | --- | --- | --- | --- | --- |
| | | via A | via B | via C | via A | | via C | |
| | | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | 36 | 1, F | 36, T | 25, F | 11, F | A | 25, F | A, C |
| B | ∞ | 41, F | 1, F | 21, F | 31, F | A, B | 13, F | B, C |
| C | ∞ | 18, F | 16, F | 1, F | 18, F | A, C | 13, F | B, C |
| E | 28 | 28, T | 6, F | 11, F | 21, F | A | 3, F | C |
| F | 28 | 6, F | 28, T | 13, F | 6, F | A | 13, F | C |
| G | ∞ | 11, F | 26, F | 26, F | 1, F | A | 18, F | C |
| H | ∞ | 31, F | 26, F | 31, F | 21, F | A | 23, F | C |
| I | 26 | 26, F | 26, T | 11, F | 16, F | A | 3, F | C |

TABLE 25

Step 14: Explore I's Links Again candidate-list before step start: (26, I), (28, E), (28, F), (36, A)
candidate-list at end of step: (28, E), (28, F), (36, A)

| Node | candidate distance | loop-free alternate paths | | | U-turn alternate paths | | | |
| --- | --- | --- | --- | --- | --- | --- | --- | --- |
| | | via A | via B | via C | via A | | via C | |
| | | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | 36 | 1, F | 36, T | 25, F | 11, F | A | 25, F | A, C |
| B | ∞ | 41, F | 1, F | 21, F | 31, F | A, B | 13, F | B, C |
| C | ∞ | 18, F | 16, F | 1, F | 18, F | A, C | 13, F | B, C |
| E | 28 | 28, T | 6, F | 11, F | 21, F | A | 3, F | C |
| F | 28 | 6, F | 28, T | 13, F | 6, F | A | 13, F | C |
| G | ∞ | 11, F | 26, F | 26, F | 1, F | A | 18, F | C |
| H | ∞ | 31, F | 26, F | 31, F | 21, F | A | 23, F | C |
| I | ∞ | 26, F | 26, F | 11, F | 16, F | A | 3, F | C |

TABLE 26

Step 15: Explore E's Links Again candidate-list before step start: (28, E), (28, F), (36, A)
candidate-list at end of step: (28, F), (36, A), (38, B)

| Node | candidate distance | loop-free alternate paths | | | U-turn alternate paths | | | |
| --- | --- | --- | --- | --- | --- | --- | --- | --- |
| | | via A | via B | via C | via A | | via C | |
| | | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | 36 | 1, F | 36, T | 25, F | 11, F | A | 25, F | A, C |
| B | 38 | 38, T | 1, F | 21, F | 31, F | A, B | 13, F | B, C |
| C | ∞ | 18, F | 16, F | 1, F | 18, F | A, C | 13, F | B, C |
| E | ∞ | 28, F | 6, F | 11, F | 21, F | A | 3, F | C |
| F | 28 | 6, F | 28, T | 13, F | 6, F | A | 13, F | C |
| G | ∞ | 11, F | 26, F | 26, F | 1, F | A | 18, F | C |
| H | ∞ | 31, F | 26, F | 31, F | 21, F | A | 23, F | C |
| I | ∞ | 26, F | 26, F | 11, F | 16, F | A | 3, F | C |

TABLE 27

Step 16: Explore F's Links Again

| | candidate-list before step start | | | (28, F), (36, A), (38, B) | | | |
|---|---|---|---|---|---|---|---|
| | candidate-list at end of step | | | (33, A), (38, B) | | | |

| | | loop-free alternate paths | | | U-turn alternate paths | | |
|---|---|---|---|---|---|---|---|
| | | via A | via B | via C | via A | | via C |
| Node | candidate distance | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | 33 | 1, F | 33, T | 25, F | 11, F | A | 25, F | A, C |
| B | 38 | 38, T | 1, F | 21, F | 31, F | A, B | 13, F | B, C |
| C | ∞ | 18, F | 16, F | 1, F | 18, F | A, C | 13, F | B, C |
| E | ∞ | 28, F | 6, F | 11, F | 21, F | A | 3, F | C |
| F | ∞ | 6, F | 28, F | 13, F | 6, F | A | 13, F | C |
| G | ∞ | 11, F | 26, F | 26, F | 1, F | A | 18, F | C |
| H | ∞ | 31, F | 26, F | 31, F | 21, F | A | 23, F | C |
| I | ∞ | 26, F | 26, F | 11, F | 16, F | A | 3, F | C |

TABLE 28

Step 17: Explore A's Links Yet Again

| | candidate-list before step start | | | (33, A), (38, B) | | | |
|---|---|---|---|---|---|---|---|
| | candidate-list at end of step | | | (38, B) | | | |

| | | loop-free alternate paths | | | U-turn alternate paths | | |
|---|---|---|---|---|---|---|---|
| | | via A | via B | via C | via A | | via C |
| Node | candidate distance | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | ∞ | 1, F | 33, F | 25, F | 11, F | A | 25, F | A, C |
| B | 38 | 38, T | 1, F | 21, F | 31, F | A, B | 13, F | B, C |
| C | ∞ | 18, F | 16, F | 1, F | 18, F | A, C | 13, F | B, C |
| E | ∞ | 28, F | 6, F | 11, F | 21, F | A | 3, F | C |
| F | ∞ | 6, F | 28, F | 13, F | 6, F | A | 13, F | C |
| G | ∞ | 11, F | 26, F | 26, F | 1, F | A | 18, F | C |
| H | ∞ | 31, F | 26, F | 31, F | 21, F | A | 23, F | C |
| I | ∞ | 26, F | 26, F | 11, F | 16, F | A | 3, F | C |

TABLE 29

Final Results after Step 18: Explore B's Links Yet Again

| | candidate-list before step start | | | (38, B) | | | |
|---|---|---|---|---|---|---|---|
| | candidate-list at end of step | | | | | | |

| | | loop-free alternate paths | | | U-turn alternate paths | | |
|---|---|---|---|---|---|---|---|
| | | via A | via B | via C | via A | | via C |
| Node | candidate distance | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | ∞ | 1, F | 33, F | 25, F | 11, F | A | 25, F | A, C |
| B | ∞ | 38, F | 1, F | 21, F | 31, F | A, B | 13, F | B, C |
| C | ∞ | 18, F | 16, F | 1, F | 18, F | A, C | 13, F | B, C |
| E | ∞ | 28, F | 6, F | 11, F | 21, F | A | 3, F | C |
| F | ∞ | 6, F | 28, F | 13, F | 6, F | A | 13, F | C |
| G | ∞ | 11, F | 26, F | 26, F | 1, F | A | 18, F | C |
| H | ∞ | 31, F | 26, F | 31, F | 21, F | A | 23, F | C |
| I | ∞ | 26, F | 26, F | 11, F | 16, F | A | 3, F | C |

In this example, a node was removed from the candidate-list 17 times. Since the topology has 9 nodes, the minimum possible was 8 times. Clearly 17 times is substantially less than the worst-case of 5 paths*8 nodes or 40. While there is additional overhead for inheriting multiple paths, the primary time complexity in the Dijkstra algorithm comes from the manipulation of the candidate-list such that the closest candidate is selected.

9 Selecting an Alternate

Once the information described in Section 1 has been obtained, an alternate can be selected for each node in the network. This section describes a procedure for doing so. Other procedures are possible.

9.1 Node with a Single Potential Primary Neighbor

If S has only a single potential primary neighbor to reach a node D, then this procedure can be followed to determine an alternate. This procedure is followed for each node in the network, except for S, is considered in turn to be the destination D. In our example topology, this method will apply for all destinations except B and H (Refer to Table 10 which has the primary and reverse SPF results).

9.11 Selection Pseudo-Code and Rationale

As described in Section 1.1, S knows the primary next-hops to reach the destination D. Those primary next-hops all go to a single primary neighbor, which will be referred to as $N_p$.

Conceptually, the selection algorithm does the following for each destination D. As an alternate is searched for, the best candidate is stored along with the type of alternate. S looks at each neighbor $N_i$ to see if that neighbor is loop-free. If that neighbor is loop-free, then S checks if the neighbor offers a node-protecting alternate. If the neighbor is loop-free and offers a better alternate than what is currently stored for that destination, then the neighbor is stored as the alternate with its associated type. A neighbor gives a better alternate if that neighbor provides node-protection and the alternate stored does not; if both can offer node-protection, then the better alternate is the neighbor for which it is most expensive to reach the destination D via $N_p$.

If a neighbor $N_i$ is not loop-free, then it is seen if that neighbor $N_i$ can provide a better U-turn alternate. A neighbor can provide a U-turn alternate if the neighbor is a U-turn neighbor and the neighbor has a loop-free node-protecting alternate that protects against the failure of a link from S to $N_p$. The former is determined by checking if the stored penultimate node is S and if the neighbor is not loop-free with respect to S and D and that the neighbor has indicated the sufficient capabilities. If the neighbor can provide a U-turn alternate, then the neighbors visited information is checked to see if $N_p$ was visited; if not, then the U-turn alternate is node-protecting and if so, then the U-turn alternate is only link-protecting. If the neighbor offers a U-turn alternate, then a selection is made between it and the currently stored alternate, where node-protecting is preferred over link-protecting and then loop-free over U-turn.

There are broadcast link considerations in the above. First, if a loop-free node-protecting alternate exists which also provides link-protection, by avoiding the link's pseudo-node, then that is preferable. As a policy decision, it can be decided whether alternates which provide node-protection and not link-protection are interesting. The procedure described here does not detail the selection of an alternate that is node-protection and not link-protecting, but the extension to do is straightforward.

Second, for an alternate to provide link-protection for a broadcast link, that alternate must avoid the associated pseudo-node. For a loop-free alternate, this involves a distance check comparison to determine if the path avoided the pseudo-node. For a U-turn alternate, this involves checking the neighbors visited on the path to see if the pseudo-node appeared. The description of the pseudo-code does not include this case for simplicity; the above details what is necessary.

Logically, the procedure that S runs is as follows:

```
alternate ← Ø
alternateType ← NONE
  foreach N_i
if N_i can be used as an alternate by S
        if ( Distance_iS(N_i, D) < Distance_opt(S, D) +
             Distance_opt(N_i, S) )
        if (Distance_iS(N_i, N_p) < Distance_opt(N_i, S) + Distance_opt(S, N_p))
           Distance_opt(N_i, N_p) ← Distance_iS(N_i, N_p)
        Else Distance_opt(N_i, N_p) ← Distance_opt(N_i, S) + Distance_opt(S, N_p)
        If (Distance_opt(N_i,D) < Distance_opt(N_i, N_p) + Distance_opt(N_p, D)) {
           If (alternateType ≠ LOOP-FREE-NODE-PROTECTING)
              alternateType ← LOOP-FREE-NODE-PROTECTING
              alternate ← N_i
           else if (Distance_opt(N_i, D) − Distance_opt(N_i, N_p) <
                   Distance_opt(alternate, D) − Distance_opt(alternate, N_p))
              alternate ← N_i
        } else if ((alternateType ≠ LOOP-FREE-NODE-
                    PROTECTING) and
                   (alternateType ≠ U-TURN-NODE-PROTECTING))
              if (alternateType = LOOP-FREE-LINK-PROTECTING)
                 select between N_i and alternate based on
                    Distance_opt(N_i, D),
Distance_opt(alternate, D),
              breaking ties with link ID, and store the selected
              else alternateType ← LOOP-FREE-LINK-PROTECTING
                 alternate ← N_i
        Else if (alternateType ≠ LOOP-FREE-NODE-PROTECTING) and
              N_i can be used as a U-turn alternate
           If min_∀j which exist (Distance_iS(R_i,j, D) − Distance_opt(R_i,j, S)) <
Distance_opt(S, D)
              if the neighbors visited on potential U-turn path from N_j
does not include N_p
              if (alternateType ≠ U-TURN-NODE-PROTECTING)
                 alternateType ← U-TURN-NODE-
                    PROTECTING
                 alternate ← N_i
              else select between N_i and alternate, based on which is
"most likely to be loop-free",
                 breaking ties with link ID, and
                 store the selected as U-TURN-LINK-PROTECTING
if ((alternateType ≠ LOOP-FREE-NODE-PROTECTING) and
    (alternateType ≠ U-TURN-NODE-PROTECTING)
  if there is more than one next-hop
     alternateType ← LOOP-FREE-LINK-PROTECTING
     alternate ← Ø
     for each primary next-hop
        select and store a different next-hop to use as an alternate
  else if there is a link from S to N_p that can be used as an alternate
and is not used for the primary next-hop
     alternate ← the lowest-cost capable non-primary link from S to N_p
```

9.1.1.1 Loop-Free Check for Classification

A neighbor of S could be used as a loop-free alternate if such a capability is indicated for at least one link to that neighbor. The neighbor of S must also not be the primary neighbor. The multiple parallel links to the primary neighbor is handled when it is seen that no node-protecting alternate is available.

For each neighbor of S that could be used as a loop-free alternate, indicated individually as $N_i$, it is known if the following equation is true.

$$Distance_{iS}(N_i,D) < Distance_{opt}(N_i,S) + Distance_{opt}(S,D)$$

means $Distance_{opt}(N_i,D) = Distance_{iS}(N_i,D)$

If so, then that $N_i$ is a loop-free neighbor with respect to S and D. Let this set of every loop-free neighbor that is not $N_p$ be indicated individually as $N_f$ and indexed from $N_1$ to $N_F$.

9.1.1.2 Link Protecting and Node Protecting Check for Classification $N_p$ is another possible destination, and therefore $\text{Distance}_{opt}(N_f, N_p)$ can be determined as follows.

if $(\text{Distance}_{iS}(N_f, N_p) < \text{Distance}_{opt}(N_f, S) + \text{Distance}_{opt}(S, N_p))$ $\text{Distance}_{opt}(N_f, N_p) = \text{Distance}_{iS}(N_f, N_p)$ Else $\text{Distance}_{opt}(N_f, N_p) = \text{Distance}_{opt}(N_f, S) + \text{Distance}_{opt}(S, N_p)$ Once $\text{Distance}_{opt}(N_f, N_p)$ is known, it can be determined via the following equation if a particular $N_f$ offers a loop-free node-protecting alternate.

$\text{Distance}_{opt}(N_f, D) < \text{Distance}_{opt}(N_f, N_p) + \text{Distance}_{opt}(N_p, D)$ If the link from S to $N_p$ is a broadcast link, then the above logic can be used to determine if a particular $N_f$ offers a loop-free link-protecting alternate by replacing $N_p$ in the above equations in this section with the pseudo-node.

9.1.1.3 Selection of a Loop-Free Node-Protecting Alternate

Once the set of loop-free node-protecting alternates has been identified, indicated individually as $N_t$ and indexed from $N_1$ to $N_T$, one or more members of the set, identified as $N_x$, are selected such that:

$\text{Distance}_{opt}(N_x, D) - \text{Distance}_{opt}(N_x, N_p) = \min_{\forall t \in T}(D_{opt}(N_t, D) - D_{opt}(N_t, N_p))$

9.1.1.4 Identification of U-turn Neighbors

If the set of loop-free node-protecting alternates is empty, then a U-turn node-protecting alternate can be selected.

For each neighbor of S that could be used as a U-turn alternate, first S must determine if that neighbor is a U-turn neighbor for S and the destination. A neighbor $N_i$ is a U-turn neighbor if the penultimate node on the reverse path from $N_i$ to S is S, the neighbor has indicated the appropriate capabilities, and the following equation is true.

$\text{Distance}_{iS}(N_i, D) \geq \text{Distance}_{opt}(N_i, S) + \text{Distance}_{opt}(S, D)$ If a neighbor $N_i$ is a U-turn neighbor and could provide a U-turn alternate, as described in Section 1.7, then it must be seen if there is a U-turn alternate available.

9.1.1.5 Classification & Selection of U-turn Node-Protecting Alternates

A U-turn alternate is available if at least one neighbor of $N_i$, indicated as has a loop-free alternate that does not go through S. This is the case if the following equation is true.

$\min_{\forall j \text{ which exist}}(\text{Distance}_{iS}(R_{i,j}, D) - \text{Distance}_{opt}(R_{i,j}, S)) + K_i < \text{Distance}_{opt}(S, D) + K_i$ If $N_i$ can provide a U-turn alternate, it must be determined if that U-turn alternate is node-protecting by checking the stored neighbors visited along the "most loop-free" path from $N_i$ and seeing if $N_p$ is among those visited. This is the information described in Section 1.8. If $N_p$ was not visited on the "most loop-free" path from an acceptable alternate neighbor of $N_i$ to D, then $N_i$ has a U-turn node-protecting alternate.

If there are multiple neighbors which offer U-turn node-protecting alternates, which will be referred to individually as $N_r$, indexed from $N_1$ to $N_R$, then S selects an $N_y$ such that $\min_{\forall j \text{ which exist}}(\text{Distance}_{iS}(R_{y,j}, D) - \text{Distance}_{opt}(R_{y,j}, S)) = \min_{\forall r \in R}(\min_{\forall j \text{ which exist}}(\text{Distance}_{iS}(R_{r,j}, D) - \text{Distance}_{opt}(R_{r,j}, S)))$

9.1.1.6 Selection of Link-Protecting Alternate

If there is neither a loop-free node-protecting alternate nor a U-turn node-protecting alternate, then a loop-free link-protecting alternate may be selected. In addition to the set of neighbors previously indicated as $N_f$, this could include $N_p$ itself, if there is an acceptable link between S and $N_p$ that is not a primary next-hop. If there are multiple links between S and $N_p$, that are used for next-hops, then each link can serve as an alternate for the other. In our example topology, S reaches A via both L1 and L2. The alternate to protect against the failure of L1 will be L2 and vice versa.

If there is also no loop-free link-protecting alternate, then a U-turn link-protecting alternate may be selected, with decisions between multiple neighbors made based upon "most loop-free".

9.1.1.7 Use of Alternate to Redirect U-turn Traffic

A router needs to be able to redirect U-turn traffic onto its loop-free node-protecting alternate, if such a one exists. U-turn traffic can be identified because it is received from the primary neighbor for that traffic and, if appropriate, is so marked. This redirection is also referred to as break U-turns. The same alternate may be used to break U-turns and to protect against a failure. If an alternate is loop-free and provides node-protection, then it can be used to break U-turns on traffic from its primary neighbor. Such an alternate is referred to as a U-turn breaking alternate.

9.1.1.8 Additional Aspects

Although the process above describes the selection of a single alternate, it is possible to have more than one alternate when load balancing across multiple paths is desirable.

The selection procedure given does not describe the considerations for SRLG or local SRLG protection. One method is to not have path distances that consider using links sharing a common local SRLG or SRLG; another option is to determine which type of failure is most important to protect against. This is not an exhaustive list of the possibilities.

9.1.2 Example Selection

The exact details of the procedure were given in the previous section, but it is useful to see this as applied to our example. The same topology as shown in FIG. 3.1 will be used and only the results stored in Table 10 and Table 29 will be used. For simplicity, these tables will be replicated here.

Duplicate of Table 10: Final Results from Primary & Reverse SPF

| Node | candidate distance | primary Distance, next-hop | changed | potential primary nbr 1 | nbr 2 | neighbors visited | Reverse distance | changed | penultimate node |
|---|---|---|---|---|---|---|---|---|---|
| S | ∞ | 0, Ø | F | Ø | Ø | Ø | 0 | F | Ø |
| A | ∞ | 5, {L1, L2} | F | A | Ø | A | 5 | F | S |
| B | ∞ | 25, {L3, L4} | F | B | C | B, C | 25 | F | E |
| C | ∞ | 5, L4 | F | C | Ø | C | 10 | F | S |
| E | ∞ | 15, L4 | F | C | Ø | C | 20 | F | C |
| F | ∞ | 10, {L1, L2} | F | A | Ø | A | 10 | F | A |

-continued

Duplicate of Table 10: Final Results from Primary & Reverse SPF

| Node | candidate distance | primary Distance, next-hop | primary changed | potential primary nbr 1 | neighbors nbr 2 | visited | Reverse distance | changed | penultimate node |
|---|---|---|---|---|---|---|---|---|---|
| G | ∞ | 15, {L1, L2} | F | A | Ø | A | 15 | F | A |
| H | ∞ | 35, {L1, L2} | F | C | A | A, C | 35 | F | G |
| I | ∞ | 15, L4 | F | C | Ø | C | 20 | F | C |

Duplicate of Table 29: Final Results of Alternate SPF

| | | loop-free alternate paths | | | U-turn alternate paths | | | |
|---|---|---|---|---|---|---|---|---|
| | | via A | Via B | via C | via A | | via C | |
| Node | candidate distance | distance, changed | distance, changed | distance, changed | distance, changed | neighbors visited | distance, changed | neighbors visited |
| S | ∞ | 0, F | 0, F | 0, F | 0, F | Ø | 0, F | Ø |
| A | ∞ | 1, F | 33, F | 25, F | 11, F | A | 25, F | A, C |
| B | ∞ | 38, F | 1, F | 21, F | 31, F | A, B | 13, F | B, C |
| C | ∞ | 18, F | 16, F | 1, F | 18, F | A, C | 13, F | B, C |
| E | ∞ | 28, F | 6, F | 11, F | 21, F | A | 3, F | C |
| F | ∞ | 6, F | 28, F | 13, F | 6, F | A | 13, F | C |
| G | ∞ | 11, F | 26, F | 26, F | 1, F | A | 18, F | C |
| H | ∞ | 31, F | 26, F | 31, F | 21, F | A | 23, F | C |
| I | ∞ | 26, F | 26, F | 11, F | 16, F | A | 3, F | C |

The distances stored for the potential loop-free alternate paths are one larger than the desired value. The distance stored in column 3 of the above table is $D_{tS}(A, D)+1$. Similarly, the distance stored in column 4 is $D_{tS}(B, D)+1$ and the distance stored in column 5 is $D_{tS}(C, D)+1$.

The data from the above two tables is collected and organized in Table 30 in a way that makes it a bit easier to understand the alternate selection procedure.

TABLE 30

Information Usage for Determining Alternates

| | | | Destination Node | | | | | |
|---|---|---|---|---|---|---|---|---|
| Row | | | A | C | E | F | G | I |
| 1 | Primary Path | $D_{opt}(S, D)$ | 5 | 5 | 15 | 10 | 15 | 15 |
| 2 | Information | Next-hops & Primary Neighbor | L1 & L2, A | L4, C | L4, C | L1 & L2, A | L1 & L2, A | L4, C |
| 3 | Potential | $D_{tS}(A, D)$ | NA | 17 | 27 | NA | NA | 25 |
| 4 | Loop-free | $D_{opt}(A, S)$ | 5 | | | | | |
| 5 | Alternate | $D_{tS}(A, D) - D_{opt}(A, S) <? D_{opt}(S, D)$ | NA | 12 <? 5 | 22 <? 15 | NA | NA | 20 <? 15 |
| 6 | from A | is loop-free? | NA | No | No | NA | NA | No |
| 7 | | $D_{tS}(A, D) - D_{opt}(A, P) < D_{opt}(P, D)$ | NA | 17 – 10 <? 0 | 27 – 10 <? 0 | NA | NA | 25 – 10 <? 0 |
| 8 | | is node-protecting for P? | NA | No | No | NA | NA | No |
| 9 | Potential | $D_{tS}(B, D)$ | 32 | 15 | 5 | 27 | 26 | 25 |
| 10 | Loop-free | $D_{opt}(B, S)$ | 25 | | | | | |
| 11 | Alternate | $D_{tS}(B, D) - D_{opt}(B, S) <? D_{opt}(S, D)$ | 32 – 25 | 15 – 25 | 5 – 25 <? | 27 – 25 | 26 – 25 | 25 – 25 <? |
| | from B | is Loop-free? | <? 5 | <? 5 | 15 | <? 10 | <? 15 | 15 |
| 12 | | | No | Yes | Yes | Yes | Yes | Yes |
| 13 | | $D_{tS}(B, D) - D_{opt}(B, P) < D_{opt}(P, D)$ is node-protecting for P? | 32 – 30 <? 0 | 15 – 15 <? 0 | 5 – 15 <? 10 | 27 – 30 <? 5 | 26 – 30 <? 10 | 25 – 15 <? 10 |
| 14 | | | No | No | Yes | Yes | Yes | No |
| 15 | Potential | $D_{tS}(C, D)$ | 24 | NA | NA | 12 | 25 | NA |
| 16 | Loop-free | $D_{opt}(C, S)$ | 10 | | | | | |
| 17 | Alternate | $D_{tS}(C, D) - D_{opt}(C, S) <? D_{opt}(S, D)$ | 24 – 10 | NA | NA | 12 – 10 | 25 – 10 | NA |
| | from C | is Loop-free? | <? 5 | | | <? 10 | <? 15 | |
| 18 | | | No | NA | NA | Yes | No | NA |
| 19 | | $D_{tS}(C, D) - D_{opt}(C, P) < D_{opt}(P, D)$ is node-protecting for P? | 24 – 10 <? 0 | NA | NA | 12 – 10 <? 5 | 25 – 10 <? 10 | NA |

TABLE 30-continued

Information Usage for Determining Alternates

| Row | | | A | C | E | F | G | I |
|---|---|---|---|---|---|---|---|---|
| 20 | | | No | NA | NA | Yes | No | NA |
| 21 | Potential U-turn Alternate from A | $\min_{\forall j} (D_{tS}(R_{i,j}, D) - D_{opt}(R_{i,j}, S))$ | NA | 18 − 16 | 21 − 16 | NA | NA | 16 − 16 |
| 22 | | has loop-free node-protecting alternate? | NA | 2 < 5 Yes | 5 < 15 Yes | NA | NA | 0 < 15 Yes |
| 23 | | is A loop-free with ref to S & D? | NA | No | No | NA | NA | No |
| 24 | | node-protecting for P? (i.e. P not visited on path?) | NA | No | Yes | NA | NA | Yes |
| 25 | Potential U-turn Alternate from C | $\min_{\forall j} (D_{tS}(R_{i,j}, D) - D_{opt}(R_{i,j}, S))$ | 25 − 36 | NA | NA | 13 − 36 | 18 − 36 | NA |
| 26 | | has loop-free node-protecting alternate? | −11 <? 5 Yes | NA | NA | −23 <? 10 Yes | −18 <? 15 Yes | NA |
| 27 | | is C loop-free with ref to S & D? | No | NA | NA | Yes | No | NA |
| 28 | | node-protecting for P? (i.e. P not visited on path?) | No | NA | NA | Yes | Yes | NA |
| 29 | Final Alternate Selection | selected alternate for next-hop 1 | A via L2 | B via L3 | B via L3 | B via L3 | B via L3 | A via L1 |
| 30 | | alternate type for next-hop 1 | Loop-free link-protecting (ECMP) | Loop-free link-protecting | Loop-free node-protecting | Loop-free node-protecting | Loop-free node-protecting | Loop-free U-turn node-protecting |
| 31 | | selected alternate for next-hop 2 | A via L1 | NA | NA | B via L3 | B via L3 | NA |
| 32 | | alternate type for next-hop 2 | Loop-free link-protecting (ECMP) | NA | NA | Loop-free node-protecting | Loop-free node-protecting | NA |

First, consider the process of looking for an alternate to destination A. The shortest path to A is via L1 and L2 with a cost of 5; the primary neighbor is A itself. Therefore, a loop-free alternate via A is not considered; A also does not qualify as a U-turn neighbor and cannot provide a U-turn alternate.

Next, it can be determined if B can provide a better alternate. In Rows 9-14, the information to determine if B can give a loop-free node-protecting path appears. To look at that information more closely, as is recorded in Row 9, the shortest path from B to A that doesn't go through S is 32; this information comes from the value stored for the potential loop-free alternate via B (minus the 1 with which the path starts) as seen in Table 29. The shortest path from B to S is 25; this is found in Table 10 and stored in Row 10. Now, the loop-free equation can be checked in Row 11 (e.g. is 32-25 less than 5) and the outcome is reported in Row 12. B does not offer a loop-free alternate. Because B is not a U-turn neighbor, B cannot provide a U-turn alternate. There is as of yet no alternate found.

The necessary information is recorded for the potential loop-free alternate from C in Rows 15-20; C also cannot offer a loop-free alternate. Rows 25-28 contain the information organized to see if C can provide a U-turn alternate. C is a U-turn neighbor with regard to S and A; C is not loop-free, as seen from Row 18, the penultimate node associated with C's reverse path is S, and, for this example, all nodes are presumed to be capable of supporting U-turn alternates. Row 25 provides the left side of Equation 3. This is 25, which is the value stored for the potential U-turn alternate path via C to A, as found in Table 29, minus the $K_C$ of 36 which was added to ensure that the path didn't become negative. In Row 26, this value is compared with the shortest distance from S to A; since −11 is less than 5, it is determined that C can provide a U-turn alternate to reach A. In Row 28, the result of checking to see if A, in its role as primary neighbor, is indicated in the neighbors visited for the U-turn path via C; since A was visited, the U-turn alternate offered by C is not node-protecting. The U-turn alternate via C is stored as a valid alternate and the type is U-turn link-protecting.

The best alternate so far is only link-protecting and there are two primary next-hops to reach A. Rather than using a U-turn alternate, as an optional policy, a parallel link is preferred. The use of another primary next-hop is even more preferable. The alternate type is changed to loop-free link-protecting; L1 is stored as the alternate to protect L2 and vice versa.

The results for alternate selection from S to destinations C, E, F, G and I can be seen in Table 30. This table is an aid to show the results of checking the various conditions; all the information except the final alternate selection and type is found in the results from the two enhanced SPF results.

9.2 Node with Multiple Potential Primary Neighbors

If S has multiple potential primary neighbors to reach a node D, then this procedure can be followed to determine alternates to use for breaking U-turns and to determine alternates to use in the event that a primary next-hop fails. In our example, S has multiple potential primary neighbors to reach both B and H; the process described in this section will be illustrated in reference to this example.

The alternates need not be the same for a particular primary next-hop. Different alternates may be selected for redirecting U-turn traffic (the U-turn breaking alternate) and for redirecting traffic in the event of a local failure of the primary next-hop (failure-protecting alternate). It is always necessary that the U-turn breaking alternate is node-protecting; the U-turn breaking alternate need not be SRLG-protecting. The failure-protecting alternate may be link-protecting, node-protecting, SRLG-protecting, or a combination, as indicated by the operator to be desirable. This allows operator policy to resolve questions such as whether it is better to fail over to an equal cost primary next-hop for link protection or to a more expensive path to obtain better protection.

For each primary next-hop, S must determine the U-turn breaking alternates and the failure protecting alternates. The following procedure can be followed to find the U-turn breaking alternates.

```
Foreach nextHop n
    UturnBreaking_n ← ∅
    Foreach nextHop h
        If (h ≠ n)
            If neighbors visited on h's path do not include
n's primary neighbor
                UturnBreaking_n ← {h} ∪
                UturnBreaking_n
    If UturnBreaking_n = ∅
        UturnBreaking_n ← lowest cost alternate-capable link to
potential primary neighbor which isn't the primary neighbor for n
```

The above gives, for each primary next-hop, a set of next-hops that can be used for breaking U-turns on traffic received from the primary neighbor associated with that primary next-hop. A U-turn alternate needs to loop-free and node-protecting only.

To determine the set of next-hops to use for failure protection alternates, the type of protection desired should be determined. If the desired protection is simply link-protection, then the set of failure protection alternates for a primary next-hop is the set of all other primary next-hops that don't use the same link. This is an issue for broadcast links. If a primary next-hop n uses a broadcast link, the neighbors visited associated with each other next-hop h can be checked for the relevant pseudo-node; if that pseudo-node is not found, then the next-hop h can be used to protect against failures for next-hop n.

9.2.1 Example with Multiple Potential Primary Neighbors

The example topology (see FIG. 3.1) has two destinations from S that were found to have multiple potential primary neighbors (see Table 10). One such destination is B, which uses L3 and L4; in this case there are two primary neighbors, B and C. The second such destination is H, which uses L1 and L2; in this case there is a single primary neighbor, A, but C is another potential primary neighbor. Most of the details necessary for making the alternate selection and the results are shown in Table 31.

First, consider finding the alternates used for breaking U-turns for destination H. Because both next-hops L1 and L2 have the same primary neighbor, they cannot provide U-turn alternates for each other. Therefore, the potential primary neighbors are checked to determine if one could provide a U-turn alternate. The first potential primary neighbor is A; clearly it cannot provide node-protection for itself. The second potential primary neighbor is C. According to Table 10, the only neighbor visited on the path to A, which is H's primary neighbor for both next-hops, is A itself. Since C is not visited and C is a potential primary neighbor, C can provides a U-turn breaking alternate; C is reached by L3. For a policy where node-protection is desired, L3 can also be used as the failure protecting alternate. For a policy where only link-protection is desired, L1 and L2 could be used as failure-protecting alternates for each other.

TABLE 31

Example Selection for Multiple Potential Primary Neighbors

| Destination Node | | Primary | Neighbors on Path to Primary | Potential Primaries | U-turn Breaking Alternates | Failure Protecting Alternate | Failure Protecting Alternate Type |
|---|---|---|---|---|---|---|---|
| B | Next-hop 1 | B | B, C | B, C | None | L4 to C | Loop-Free Link-Protecting |
|   | Next-hop 2 | C | C |     | L3 to B | L3 to B | Loop-Free Node-Protecting |
| H | Next-hop 1 | A | A | A, C | L3 to C | L4 to C | Loop-Free Node-Protecting |
|   | Next-hop 2 | A | A |     | L3 to C | L4 to C | Loop-Free Node-Protecting |

If the desired protection is node-protection, then the subset of U-turn breaking alternates set that are also link-protecting can be used. The set of U-turn breaking alternates is already determined to be loop-free and provide node-protection; therefore they can also provide against the failure of the primary next-hop. Link protection for a primary next-hop that uses a broadcast or NBMA link can be verified as described above.

If there are no acceptable U-turn breaking alternates, then a loop-free node-protecting or U-turn node-protecting alternate can be searched for with respect to a particular next-hop's primary neighbor, as described in Section 8.1. It may be preferable to minimize the number of alternate next-hops used and to search for an alternate next-hop that can provide the desired protection for the greatest number of unprotected primary next-hops.

If SRLG protection is a consideration, then the set of failure protecting alternates can include only those U-turn breaking alternates which meet that criteria and, if there are no acceptable U-turn breaking alternates, a suitable alternate among non-primary neighbors can be searched for.

The destination B is a bit different. For the first next-hop of L3, the primary neighbor is B itself. The shortest path to B can visit B or C. The second next-hop of L4 uses a primary neighbor of C. Because C may be visited on the shortest path to B, L4 cannot provide a U-turn breaking alternate for the first next-hop. Both of the potential primary neighbors B and C are visited on the shortest path to the primary neighbor B. There is no acceptable U-turn breaking alternate for the first next-hop. Next is to determine the U-turn breaking alternate for the second next-hop. Only C is visited on the shortest path to C. This means that the first next-hop can serve as a U-turn breaking alternate for the second next-hop. Regardless of whether the policy is for link-protection or node-protection, then L3 to B also provides a failure protecting alternate for the second next-hop. There is no node-protection available for the first next-hop because the primary neighbor is the destination, which can't be avoided; this can also be determined by looking at the potential loop-free and U-turn alternates as described in Section 8.1.2. In the absence of node-protection, L3 will provide a loop-free link-protecting alternate for the first next-hop.

This particular example does not illustrate the process of searching for a neighbor to provide a failure protecting alternate, which occurs when no primary neighbor or stored potential primary neighbor can provide the desired type of protection. That process is the same as looking for an alternate in the case where there is only a single potential primary neighbor.

10 Local SRLG Considerations

A local shared risk link group (SRLG) is a group of links that are all connected to the same router. Two different local SRLGs are illustrated in FIG. 3.9.

Local SRLGs need to be considered primarily when searching for potential loop-free alternates and potential U-turn alternates. If local SRLGs are considered, the algorithm is affected as follows.

There is no pruning done based on S's local SRLGs during the search; the pruning occurs when the alternate selection is done. At that point, no next-hop, which is in a local SRLG with the primary next-hop to be protected, can be considered for use an alternate.

For a potential U-turn neighbor $N_1$, no links from $N_1$ to one of its neighbors that are in a local SRLG with the link from $N_i$ to S that is being considered for the alternate next-hop, can be considered. Those links should not be explored. If $N_i$ is an ECMP U-turn neighbor, then the local SRLGs of $N_i$ need not be considered when looking for $N_i$ to provide a U-turn alternate; this is because S does not know which potential primary neighbors $N_i$ has selected as its primary neighbors. Therefore, $N_i$ will not prune based upon local SRLGs the set of next-hops used to break U-turns.

For local SRLGs associated with P, those must be tracked in the same way in which neighbors visited are. Therefore, whenever a path encounters a neighbor, it is desirable to store not merely that the neighbor was visited, but any local SRLGs of that neighbor that were used.

Local SRLGs can be considered in other ways as well to provide the desired protection.

General SRLGs, where the membership is not restricted to links connected to the same router, can also be considered. The SRLGs encountered on each path can be tracked in the same way in which neighbors visited are. It is necessary to track the SRLGs associated with each path. Any potential loop-free paths that use a link in an SRLG, whose failure must be protected against, can be removed from consideration. Any potential U-turn paths, which use a link in an SRLG, whose failure must be protected against, or which use a link in an SRLG whose membership includes a lowest cost link from the U-turn neighbor to S, can be removed from consideration. The alternates are selected from those that remain.

This particular mechanism will provide SRLG protection at the cost of tracking SRLG usage. There are optimizations to make this process more efficient, such as pre-determining the set of interesting SRLGs and tracking only those.

A router of FIG. 4.0 may include a means 101 for pre-storing a link to a primary neighbor and a link to an alternate neighbor; a means 103 for forwarding, by a network node, a data packet to a primary path through the primary neighbor, the primary neighbor being one or more primary next-hops directly from a source node to a destination node; and a means 105 for forwarding, upon failure of the primary path, the data packet to the alternate neighbor, the alternate neighbor being a loop-free neighbor, other than the primary neighbor and whose shortest path to the destination node does not go through the source node.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for forwarding an Internet Protocol (IP) unicast data packet, the method comprising, at a network node:
   using, by the network node, destination based shortest path routing algorithms for the network node to determine and pre-store a link to a primary neighbor in a primary path to a destination node and a link to an alternate neighbor in an alternate path to the destination node, wherein the alternate path to the destination node is longer than or equal to the primary path to the destination node, wherein the alternate neighbor is a loop-free neighbor other than the primary neighbor and whose shortest path to the destination node does not go through the network node that determined the alternate path, and wherein the shortest path between the alternate neighbor and the destination node satisfies:

$$\text{Distance}_{opt}(N, D) < \text{Distance}_{opt}(N, S) + \text{Distance}_{opt}(S, D),$$

where $\text{Distance}_{opt}(N, D)$ is the shortest path between the alternate neighbor and the destination node, $\text{Distance}_{opt}(N, S)$ is a shortest path between the alternate neighbor and the network node, and $\text{Distance}_{opt}(S,D)$ is a shortest path between the network node and the destination node;

forwarding, by the network node, the IP unicast data packet to the primary path through the primary neighbor, wherein the primary neighbor is one or more primary next-hops directly from the network node to the destination node;

switching over from the primary path to the alternate path upon failure of the primary path; and forwarding the IP unicast data packet to the alternate neighbor whose shortest path to the destination node does not go through the network node that determined the alternate path.

2. The method of claim 1, wherein for an Equal Cost Multi-Path primary path, the primary path is an alternate path for another primary path.

3. The method of claim 1, further comprising determining the alternate neighbor with a Dijkstra algorithm.

4. The method of claim 1, further comprising determining an acceptable loop-free alternate based on a plurality of failure situations to protect against.

5. The method of claim 1, further comprising determining the alternate neighbor from a group of classes consisting of:
   loop-free alternate neighbors that do not forward through the primary neighbor;
   loop-free alternate neighbors that do forward through the primary neighbor;
   U-turn neighbors with a loop-free alternate neighbor that does not forward through the primary neighbor; and
   U-turn neighbors with a loop-free alternate neighbor that does forward through the primary neighbor.

6. The method of claim 5, wherein a priority is assigned to each of the alternate neighbors within each of the group of classes.

7. The method of claim 1, further comprising maintaining a label distribution protocol (LDP) having labels available for the loop-free alternate for installing out-segments in hardware prior to a failure occurrence.

8. The method of claim 1, further comprising forwarding, upon receipt of the data packet at the alternate neighbor, the data packet to an alternate neighbor of the alternate neighbor.

9. A network node for forwarding an Internet Protocol (IP) unicast data packet, comprising:
   a processor configured with destination based shortest path routing algorithms to determine and pre-store a link to a primary neighbor in a primary path to a destination node and a link to an alternate neighbor in an alternate path to the destination node, wherein the alternate path to the destination node is longer than or equal to the primary path to the destination node, wherein the alternate neighbor is a loop-free neighbor other than the primary neighbor and whose shortest path to the destination node does not go through the network node that determined the alternate path; and path, and wherein the shortest path between the alternate neighbor and the destination node satisfies:

$$Distance_{opt}(N, D) < Distance_{opt}(N, S) + Distance_{opt}(S, D),$$

where $Distance_{opt}(N, D)$ is the shortest path between the alternate neighbor and the destination node, $Distance_{opt}(N, S)$ is a shortest path between the alternate neighbor and the network node, and $Distance_{opt}(S,D)$ is a shortest path between the network node and the destination node; and
   an interface configured to forward the IP unicast data packet,
   wherein the interface is further configured to forward the IP unicast data packet to the primary path through the primary neighbor, wherein the primary neighbor is one or more primary next-hops directly from the network node to the destination node,
   wherein the interface is further configured to switchover from the primary path to the alternate path upon failure of the primary path, and
   wherein the interface is further configured to forward the IP unicast data packet to the alternate neighbor whose shortest path to the destination node does not go through the network node that determined the alternate path.

10. The network node of claim 9, wherein the primary path is an alternate path for another primary path for an Equal Cost Multi-Path primary path.

11. The network node of claim 9, wherein the alternate neighbor is determined using a Dijkstra algorithm.

12. The network node of claim 9, wherein an acceptable loop-free alternate is determined based on a plurality of failure situations.

13. The network node of claim 9, wherein the alternate neighbor is determined from a group of classes consisting of:
   loop-free alternate neighbors that do not forward through the primary neighbor;
   loop-free alternate neighbors that do forward through the primary neighbor;
   U-turn neighbors with a loop-free alternate neighbor that does not forward through the primary neighbor; and
   U-turn neighbors with a loop-free alternate neighbor that does forward through the primary neighbor.

14. The network node of claim 13, wherein each of the alternate neighbors within each of the group of classes is assigned a priority.

15. The network node of claim 9, wherein a label distribution protocol (LDP) is maintained that has labels available for the loop-free alternate for installing out-segments in hardware prior to a failure occurrence.

16. The network node of claim 9, wherein upon receipt of the data packet at the alternate neighbor, the data packet is forwarded to an alternate neighbor of the alternate neighbor.

17. A routing apparatus for forwarding an Internet Protocol (IP) unicast data packet, comprising:
   means for pre-storing a link to a primary neighbor in a primary path to a destination node and a link to an alternate neighbor in an alternate path to the destination node using destination based shortest path routing algorithms, wherein the alternate path to the destination node is longer than or equal to the primary path to the destination node, and wherein the alternate neighbor is a loop-free neighbor other than the primary neighbor and whose shortest path to the destination node does not go through the routing apparatus, and wherein the shortest path between the alternate neighbor and the destination node satisfies:

$$Distance_{opt}(N, D) < Distance_{opt}(N, S) + Distance_{opt}(S, D),$$

where $Distance_{opt}(N, D)$ is the shortest path between the alternate neighbor and the destination node, $Distance_{opt}N, S)$ is a shortest path between the alternate neighbor and the routing apparatus, and $Distance_{opt}(S,D)$ is a shortest path between the routing apparatus and the destination node;
   means for forwarding the IP unicast data packet to the primary path through the primary neighbor, wherein the primary neighbor is one or more primary next-hops directly from the routing apparatus to the destination node; and
   means for switching over from the primary path to the alternate path and for forwarding the IP unicast data packet to the alternate neighbor whose shortest path to the destination node does not go through the routing apparatus that determined the alternate path.

* * * * *